(12) United States Patent
Nair et al.

(10) Patent No.: US 7,792,040 B2
(45) Date of Patent: Sep. 7, 2010

(54) BANDWIDTH AND COST MANAGEMENT FOR AD HOC NETWORKS

(75) Inventors: Rahul Nair, Sunnyvale, CA (US);
Christopher W. Higgins, Portland, OR (US); Marc E. Davis, San Francisco, CA (US); Joseph J. O'Sullivan, Sunnyvale, CA (US); Christopher T. Paretti, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 112 days.

(21) Appl. No.: 12/182,878

(22) Filed: Jul. 30, 2008

(65) Prior Publication Data

US 2010/0027426 A1 Feb. 4, 2010

(51) Int. Cl.
*H04L 12/28* (2006.01)
*G01R 31/08* (2006.01)
(52) U.S. Cl. .................. 370/238; 370/254; 370/338
(58) Field of Classification Search .................. 370/238, 370/254, 328, 338, 252
See application file for complete search history.

(56) References Cited

U.S. PATENT DOCUMENTS

| | | | |
|---|---|---|---|
| 2003/0033394 A1* | 2/2003 | Stine | 709/222 |
| 2004/0010492 A1* | 1/2004 | Zhao et al. | 707/3 |
| 2009/0323519 A1* | 12/2009 | Pun | 370/225 |
| 2010/0002635 A1* | 1/2010 | Eklund | 370/329 |
| 2010/0014444 A1* | 1/2010 | Ghanadan et al. | 370/310 |

* cited by examiner

*Primary Examiner*—Brian D Nguyen
(74) *Attorney, Agent, or Firm*—James J. DeCarlo; Greenberg Traurig, LLP

(57) ABSTRACT

A system and method is described herein for managing bandwidth and cost in connection with a plurality of sensors in an ad hoc network. The system and method receives sensor data that is provided from a plurality of sensors and constructs an ad hoc network among the plurality of sensors based on the sensor data. The system and method also receives and analyzes bandwidth information from each sensor in a group of sensors in the ad hoc network. Based on the analysis, the system and method then modifies a manner in which at least one sensor in the group exchanges data, including sensor data and multimedia content.

49 Claims, 24 Drawing Sheets

BANDWIDTH AND COST MANAGEMENT FOR AD HOC NETWORKS

FIELD OF THE DISCLOSURE

The present disclosure generally relates to systems and methods for managing bandwidth and transmission costs associated with devices in a network, such as devices in an ad hoc network of sensors.

BACKGROUND

Communication networks typically are cost-based, such that communication services, e.g., voice, data, etc. communication services, are provided by one or more service providers for a fee. A service provider typically offers various "plans," which dictate the cost of each plan, e.g., fees associated with specialized and/or recurring uses, as well as the limits, e.g., minimum and/or maximum limits, of network use and additional fees for overages associated with the plan. For example, a voice plan is typically measured in minutes, a data plan in data packets or total data transferred, etc. While some plans are unlimited, e.g., unlimited data transfer, most plans impose some limits.

Bandwidth is a metric that is typically used in communications. For example, in digital data transfer, bandwidth provides a measure of the rate at which a unit of data, e.g., bit, byte, kilobyte, gigabyte, etc., is transferred in a unit of time, e.g., nanosecond, second, minute, etc. Bandwidth can also be used as an umbrella term to refer to communication network access and availability. By way of a non-limiting example, in the case of mobile voice communication, bandwidth can be used as a measure of a number of minutes, e.g., anytime minutes, night/weekend minutes, family/friends minutes, nationwide (i.e., long distance) minutes, etc. Mobile voice communication network providers typically offer a number of mobile voice plans, each of which typically has a certain number of minutes for a set monthly fee, with additional minutes being charged at a higher fee. By way of another non-limiting example, in a case of mobile data communications, bandwidth can be measured by the amount of data transferred, e.g., "n" megabits, or megabytes, gigabits, or gigabytes, etc. By way of another non-limiting example, an instant messaging plan can impose limits on the number of messages or the amount of data transferred. A similar approach can be taken for other types of communication, and communication networks, including WiFi, Bluetooth™, etc.

A bandwidth limitation is typically set for a specific time period, e.g., a monthly limit. It is likely that a user will either exceed the plan's bandwidth, which results in additional cost to the user, or the user will have an amount of unused bandwidth, which results in an unnecessary cost to the user. While a minority of plans may allow unused bandwidth to rollover to the next month, this feature is typically not offered, and there is no way for users to share or exchange bandwidth in real-time on an ad hoc basis.

SUMMARY

Bandwidth limitations, such as those imposed by bandwidth/plan providers, can constrain the capacity to exchange data. In addition, while multiple different paths may exist to exchange data, no analysis is performed to determine the one or more optimal paths for the data exchange. By way of a non-limiting example, there is no capacity to pool available, unused bandwidth resources and determine and compare costs associated with the various alternatives available from such a pooling, so as to select the one or more optimal paths for specific data exchange at specific times.

The present disclosure addresses such failings and provides a system and method that can leverage bandwidth information provided by a variety of sensors, sensor-enabled devices and/or objects (a sensor-enabled device and/or object is referred to hereinafter for simplicity as a "sensor"), including sensors associated with different types of networks, and network frequencies and carriers, to generate a database of real-time bandwidth availability that can be used for the provisioning of available bandwidth allocation services. Additionally, a system and method is also needed that intelligently manages the manner in which bandwidth is allocated to sensors so that bandwidth can be optimized and cost can be minimized, at a device/object level, a group level, and/or at a system level.

Advantageously, bandwidth limitations that can constrain data exchanges, such as that imposed by bandwidth/plan providers, can be overcome by pooling available, unused bandwidth resources, associating a cost with each of the various bandwidth resource alternatives, e.g., voice, data, instant messaging, Bluetooth, WiFi, broadband access, etc., in the pool, and allocating the available bandwidth taking into account the associated costs. The various bandwidth resource alternatives can be analyzed, e.g., a cost analysis, to determine one or more optimal paths for the data exchange. By way of a non-limiting example, the costs associated with using a given one or more available, unused bandwidth resources for data exchange can be determined and compared with other alternatives available from such a pooling, so as to select the one or more optimal paths for data exchange, e.g., one or more paths that provide the greatest cost efficiencies. By way of another non-limiting example, analysis and comparison of various alternatives can be based on other criteria in addition to or in place of cost associated with use of a bandwidth resource, such as a rate at which data is to be exchanged, a sensor's available power, importance of the data and/or data exchange, data security, reliability, proximity/location, etc. The data that is exchanged using the one or more optimal paths can comprise, without limitation, analog or digital, voice, multimedia content, sensor, as well as other types of data.

In addition and advantageously, pooling of bandwidth resources and selection of optimal bandwidth resource alternatives can encourage a commoditization of the provision of bandwidth, thus driving the cost of bandwidth resources down and disassociating the exchange of data from the value-added services that are actually requesting the exchange. Pooling of bandwidth also supports the donation or regular allocation of bandwidth by users to non-profit, school, church, community, artist or other entity considered deserving of bandwidth sharing/donation by the user.

A system and method is described herein for managing bandwidth for a plurality of sensors in an ad hoc network. The system and method leverages information concerning bandwidth requirements and constraints of a group of sensors, e.g., spatially-, temporally-, socially- or topically-proximate sensors, in the network to make decisions concerning bandwidth on a sensor, group, or network level. By continuously monitoring the bandwidth needs and status of sensors in the ad hoc network, the system and method can balance the bandwidth needs of the sensors by dynamically and adaptively determining and/or changing the manner in which one or more sensors exchange data, e.g., sensor or multimedia content data, via the ad hoc network.

In particular, a method for managing bandwidth in an ad hoc network is described herein. In accordance with the method, sensor data is provided for a plurality of sensors. Sensor data can include, without limitation, bandwidth information, location information, power available, power consumption rates and history, user profile, path or other analytics data, social connection, association and topic to person, place, event or thing relation data as produced by users carrying devices and sensors as they move through space and time in their daily lives. An ad hoc network is then constructed among the plurality of sensors based on some or all of the received sensor data. In accordance with one or more embodiments, construction of the ad hoc network is further based on user-specified preferences and requirements. Bandwidth information, e.g., availability, cost, transfer rate, security, amount of available bandwidth, usage, etc., associated with each sensor in the group, in the ad hoc network is then analyzed. Based on the analysis, a manner in which at least one sensor in the group exchanges data is determined. In accordance with one or more embodiments, the manner in which data is exchanged is determined to be the least cost and fastest data exchange route given available bandwidth.

In accordance with the foregoing method, determining the manner in which at least one sensor in the group exchanges data may include determining a route by which at least one sensor in the group exchanges data, determining a rate at which at least one sensor in the group exchanges data, and/or allocating an amount of bandwidth of one or more sensors in the group to another sensor in the group, wherein the allocated bandwidth is used in a data exchange for the other sensor in the group. Determining the manner in which at least one sensor in the group exchanges data may also include causing a first sensor in the group to collect data from a second sensor in the group over a local network connection and to provide the collected data on behalf of the second sensor.

The foregoing method may further include taking additional actions based on the analysis of the bandwidth information. These additional actions may include causing a first sensor in the group to disseminate data received from a bandwidth and cost optimization system to a second sensor in the group over a local network connection based on the analysis of the bandwidth information, modifying a frequency in which at least one sensor in the group provides bandwidth information based on the analysis of the bandwidth information, and/or modifying a frequency in which at least one sensor in the group provides bandwidth information based on an analysis of the bandwidth information and power consumption information associated with the at least one sensor.

In addition to determining the manner in which at least one sensor in the group exchanges data based on the analysis of the bandwidth information, the foregoing method may also take into account other factors, including a capacity of each sensor in the group to provide available bandwidth, a cost associated with the available bandwidth, a bandwidth donation or allocation, e.g., a user-specified donation or allocation, a user-defined hierarchy of data exchange networks or paths, and/or a user-defined hierarchy associated with the sensors in a group of sensors, e.g., an actual or potential group of sensors.

A system is also described herein. The system includes a sensor interface manager, a bandwidth tracking manager, and a bandwidth management manager. The sensor interface manager is configured to receive sensor data provided from a plurality of sensors. The bandwidth tracking manager is configured to construct an ad hoc network among the plurality of sensors based on some or all of the received sensor data. In accordance with one or more embodiments, the bandwidth tracking manager is configured to construct the ad hoc network based further on user-specified preferences and requirements. The bandwidth management manager is configured to analyze bandwidth information associated with each sensor in a group in the ad hoc network and to determine a manner in which at least one sensor in the group exchanges data based on the analysis of the bandwidth information. In accordance with one or more embodiments, the manner in which data is exchanged is determined to be the least cost and fastest data exchange route given available bandwidth.

In the foregoing system, the bandwidth management manager may be configured to determine the manner in which at least one sensor in the group exchanges data by determining a rate at which at least one sensor in the group exchanges data, by determining a route by which at least one sensor in the group exchanges data, and/or by allocating an amount of bandwidth of one or more sensors in the group to another sensor in the group, wherein the allocated bandwidth is used in a data exchange for the other sensor in the group. The bandwidth management manager may also be configured to determine the manner in which at least one sensor in the group exchanges data by causing a first sensor in the group to collect data from a second sensor in the group over a local network connection and to provide the collected data on behalf of the second sensor.

The bandwidth management manager may be further configured to perform a variety of other actions based on the analysis of the bandwidth information, including causing a first sensor in the group to disseminate data received from a bandwidth cost optimization system to a second sensor in the group over a local network connection, modifying a frequency in which at least one sensor in the group provides the bandwidth information based on the analysis of the bandwidth information, and/or modifying a frequency in which at least one sensor in the group provides bandwidth information based on the analysis of the bandwidth information and power consumption information associated with the at least one sensor.

The bandwidth management manager configured to determine a manner in which at least one sensor in the group exchanges data based on an analysis of the bandwidth information can be based on other factors in addition to the analysis of bandwidth information. These additional factors may include a capacity of each sensor in the group to provide available bandwidth, a cost associated with the available bandwidth, a bandwidth donation or allocation, e.g., a user-specified bandwidth donation or allocation, a user-defined hierarchy of data exchange networks or paths, and/or a user-defined hierarchy associated with the sensors in a group of sensors, e.g., an actual or potential group of sensors.

A computer program product is also described herein. The computer program product includes a computer-readable medium having computer program code recorded thereon for enabling a processing unit to manage bandwidth in an ad hoc network. The computer program code includes code to enable the processing unit to receive sensor data provided from a plurality of sensors, construct an ad hoc network among the plurality of sensors based on some or all of the received sensor data, analyze bandwidth information associated with each sensor in a group of sensors in the ad hoc network, and determine the manner in which at least one sensor in the group exchanges data based on the analysis of the bandwidth information. In accordance with one or more embodiments, the manner in which data is exchanged is determined to be the least cost and fastest data exchange route given the available bandwidth. In accordance with one or more embodiments, construction of the ad hoc network can be further based on user-specified preferences and requirements.

In the foregoing computer program product, the code to determine a manner in which at least one sensor exchanges data includes code to determine a route by which at least one sensor exchanges data, code to change a rate at which at least one sensor in the group exchanges data, and/or code to allocate an amount of bandwidth of one or more sensors in the group to another of the sensors in the group, wherein the allocated bandwidth is used in a data exchange for the other sensor in the group. The code to determine a manner in which at least one sensor exchanges data may also comprise code to enable a processing unit to cause a first sensor in the group to collect data from a second sensor in the group over a local network connection and to provide the collected data on behalf of the second sensor.

In the foregoing computer program product, the computer program code may further include code to enable a processing unit to cause a first sensor in the group to disseminate information received from a bandwidth cost optimization system to a second sensor in the group over a local network connection based on the analysis of the bandwidth information, code to enable the processing unit to modify a frequency in which at least one sensor in the group provides the bandwidth information based on the analysis of the bandwidth information, and/or code to enable the processing unit to modify a frequency in which at least one sensor in the group provides bandwidth information based on the analysis of the bandwidth information and power consumption information associated with the at least one sensor.

In the foregoing computer program product, the code to determine a manner in which at least one sensor exchanges data may comprise code to enable the processing unit to determine the manner in which at least one sensor in the group provides sensor data based on the analysis of the bandwidth information and based on additional factors. These additional factors may include a capacity of each sensor in the group to provide available bandwidth, a cost associated with the available bandwidth, a bandwidth donation or allocation, e.g., a user-specified donation or allocation, a user-defined hierarchy of data exchange networks or paths, and/or a user-defined hierarchy associated with the sensors in a group of sensors, e.g., an actual or potential group of sensors.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code, or logic, to implement functionality in accordance with one or more such embodiments is embodied in, by and/or on a computer-readable medium.

Further features and advantages of the embodiments of the present disclosure, as well as the structure and operation of various embodiments of the disclosure, are described in detail below with reference to the accompanying drawings. It is noted that embodiments of the present disclosure are not limited to the specific embodiments described herein. Such embodiments are presented herein for illustrative purposes only. Additional embodiments will be apparent to persons skilled in the relevant art(s) based on the teachings contained herein.

DRAWINGS

The accompanying drawings, which are incorporated herein and form part of the specification, illustrate embodiments of the present disclosure and, together with the description, further serve to explain the principles of embodiments of the present disclosure and to enable a person skilled in the relevant art(s) to make and use such embodiments.

Figure 1:
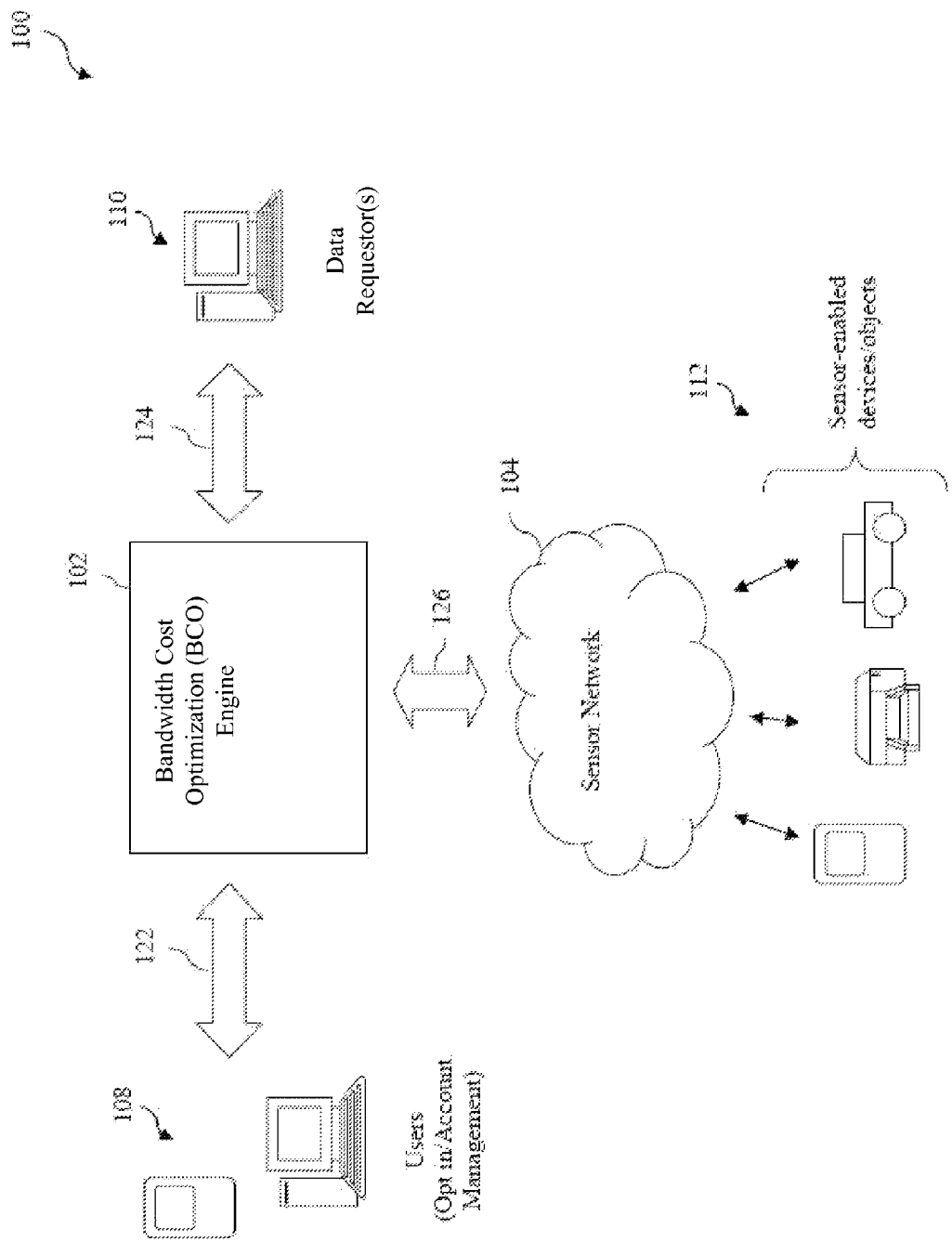
FIG. 1 is a high-level block diagram of a system for constructing an ad hoc network and using the same for providing bandwidth cost optimization (BCO) services in accordance with an embodiment of the present disclosure.

The features and advantages of embodiments of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

A. Example System Architecture

FIG. 1 is a high-level block diagram of an exemplary system 100 for identifying an ad hoc network and using the same for providing bandwidth and cost optimization (BCO) services in accordance with an embodiment of the present disclosure. An ad hoc network can be formed using one or more bases, or a combination thereof. Some non-limiting examples include spatial proximity, temporal proximity, topical proximity, e.g., knowledge regarding user interests such as that collected from express and/or implicit input, available bandwidth, connectivity, etc. As shown in FIG. 1, system 100 includes a BCO engine, or system, 102 that is communicatively connected to users via devices 108 and a first interface 122, to data requesters via devices 10 and a second interface 124, and to a sensor network 104 via a third interface 126. Each of the elements of system 100 will now be briefly described, with additional details to be provided in subsequent sections.

First interface 122 is configured to allow users of devices 108 to interact with BCO engine 102 for the purpose of specifying whether or not they wish to "opt in" to receive BCO services from BCO engine 102. First interface 122 may be further configured to allow a user to specify which BCO services should be provided to the user and to specify preferences concerning how such services should be delivered. First interface 122 may be still further configured to allow a user to specify preferences concerning the manner in which one or more sensors associated with the user are to be tracked by BCO engine 102, the manner in which available bandwidth associated with the one or more sensors are allocated, and/or the manner in which available bandwidth is allocated for use by the user. In one embodiment of the present disclosure, first interface 122 comprises an application programming interface (API) that can be used to build applications by which user systems/devices may interact with BCO engine 102, although embodiments are not so limited.

Second interface 124 is configured to allow data requesters 110 to interact with BCO engine 102 for the purpose of requesting bandwidth for use in accessing a communications network, e.g., requesting optimal network bandwidth allocation to exchange data via the network, the bandwidth being provided by one or more sensors of one or more registered users of BCO engine 102. By way of a non-limiting example, a data request can be generated by a user of a device 110, which can be a sensor, or an application or process executing on device 110, an information object, a real world entity, a proxy, etc. Second interface 124 may also be configured to perform other functions to be described in more detail herein. In one embodiment of the present disclosure, second interface 124 comprises an API that can be used to build applications by which systems owned or operated by data requesters may interact with BCO engine 102, e.g., request bandwidth for data exchange, although the embodiments of the present disclosure are not so limited.

In accordance with one or more embodiments, BCO engine 102 is a system that is configured to track, overtime, available bandwidth and associated costs, as well as sensors that can provide the available bandwidth. BCO engine 102 is further configured to use the information, including information concerning available bandwidth and costs, to support the provisioning of BCO services. In accordance with one or more embodiments, BCO engine 102 can be configured to track the location of sensors over time, so that such location information can be used in conjunction with bandwidth information in support of the provisioning of BCO services. As will be described in more detail herein, in accordance with embodiments, BCO engine 102 is configured to perform a location tracking function, the BCO engine 102 is configured to perform the location tracking function in part by receiving sensor data from sensors 112 over sensor network 104. BCO engine 102 is further configured to track bandwidth, which is made available via bandwidth resources of the sensors, based on received and/or derived information. BCO engine 102 is further configured to identify an ad hoc network among the sensors 112 in sensor network 104, e.g., from the sensors 112 that provide sensor data to the BCO engine 102.

In accordance with one or more embodiments, the one or more sensors in the ad hoc network have available bandwidth and associated cost information. Optionally, location information for the sensors in the ad hoc network can be collected based on the information that is received from the sensors, retrieved from stored information and/or derived from other information. In embodiments of the present disclosure, the BCO services provided by BCO engine 102 identify one or more optimal paths by which data is exchanged using one or more sensors. An optimal path can be determined based on such factors as cost associated with use of a sensor's available bandwidth, a rate at which data is to be exchanged, a sensor's available power, importance of the data and/or data exchange, data security, reliability, proximity/location, etc. In accordance with one or more embodiments, the BCO engine 102 identifies an optimal path for data exchange based on peering real-time spacio-temporal connections and routes, social relationships among users/devices and/or the type and sensitivity of the data that is to be exchanged. By way of a non-limiting example, a route can comprise a communication channel with a server via a one or more connections established using one or more bandwidth resources associated with one or more sensors. Bandwidth resources can be relative to one or more networks, which can include, without limitation, Bluetooth™, wireless (in data or voice frequencies), infrared, acoustic coupling, cable or other terrestrial fiber network.

Sensors 112 are intended to represent any device or object that can include sensing technology, including but not limited to handheld user devices (e.g., mobile telephones, personal digital assistants, handheld computers, media players, handheld navigation devices, handheld scanners, cameras), vehicles (e.g., automobiles, airplanes, trucks, trains), office equipment (e.g., computers, printers, copiers), appliances, inventory, freight, parcels, or commercial products, to name only a few. The sensing technology may include but is not limited to WiFi sensing technology, cellular telephone sensing technology, Bluetooth™ sensing technology, or radio frequency identification (RFID) sensing technology.

Communication between BCO engine 102 and sensor network 104 takes place over third interface 126. In one embodiment of the present disclosure, third interface 126 comprises an APT that can be used to build applications by which sensors 112 can communicate with BCO engine 102, although the embodiment is not so limited.

In accordance with one or more embodiments, the BCO engine 102 allows users to either automatically or manually trade-off between cost and speed or rate of data exchange. By way of a non-limiting example, data can be exchanged using one or more available bandwidth resources that minimize the time it takes for the data to be communicated, or data can be exchanged using available bandwidth resources that require more time for the data to be communicated, with the first alternative having a greater associated cost than the second alternative. In addition and in accordance with one or more embodiments, the sensitivity of the data being exchanged can be taken into account, such that sensitive information is routed through secure connections and can be encrypted or split into sub-portions in order to optimize secure delivery.

BCO engine 102 may also take into account the amount of bandwidth that must be allocated to one or more sensors in a group of sensors in order exchange sensor or other data. BCO engine 102 may determine that allocating bandwidth to a first type of sensor will yield more bandwidth and cost efficiencies at some level, e.g., sensor, group or system level, than allocating bandwidth to a second type of sensor in the same group. In this situation, BCO engine 102 may increase the bandwidth allocation to the first type of sensor while maintaining or reducing the bandwidth allocated to the second type of sensor, thereby achieving bandwidth and/or cost efficiencies/optimization with respect to the first and second types of sensor.

In accordance with one or more embodiments, the BCO engine 102 is provided by one entity that controls disparate networks, carriers and sources of data requests. In such a case, the BCO engine 102 is configured to provide BCO services to users as part of an overall optimization profile intended to minimize actual data transfers and maximize leveraging logical structures and processing of sensor and beacon data to make data routing decisions. In accordance with one or more alternative embodiments, the BCO engine 102 is configured to provide a multi-network aggregating service, which aggregates bandwidth resources of disparate networks, carriers and sources of network data requests. The BCO services provided by the BCO engine 102 in connection with such alternate embodiments can be funded by the networks, carriers and/or users, and compensation could be in the form of money, bandwidth allocation or other non-monetary means, e.g. certification, endorsement, co-branding, etc.

Figure 2:
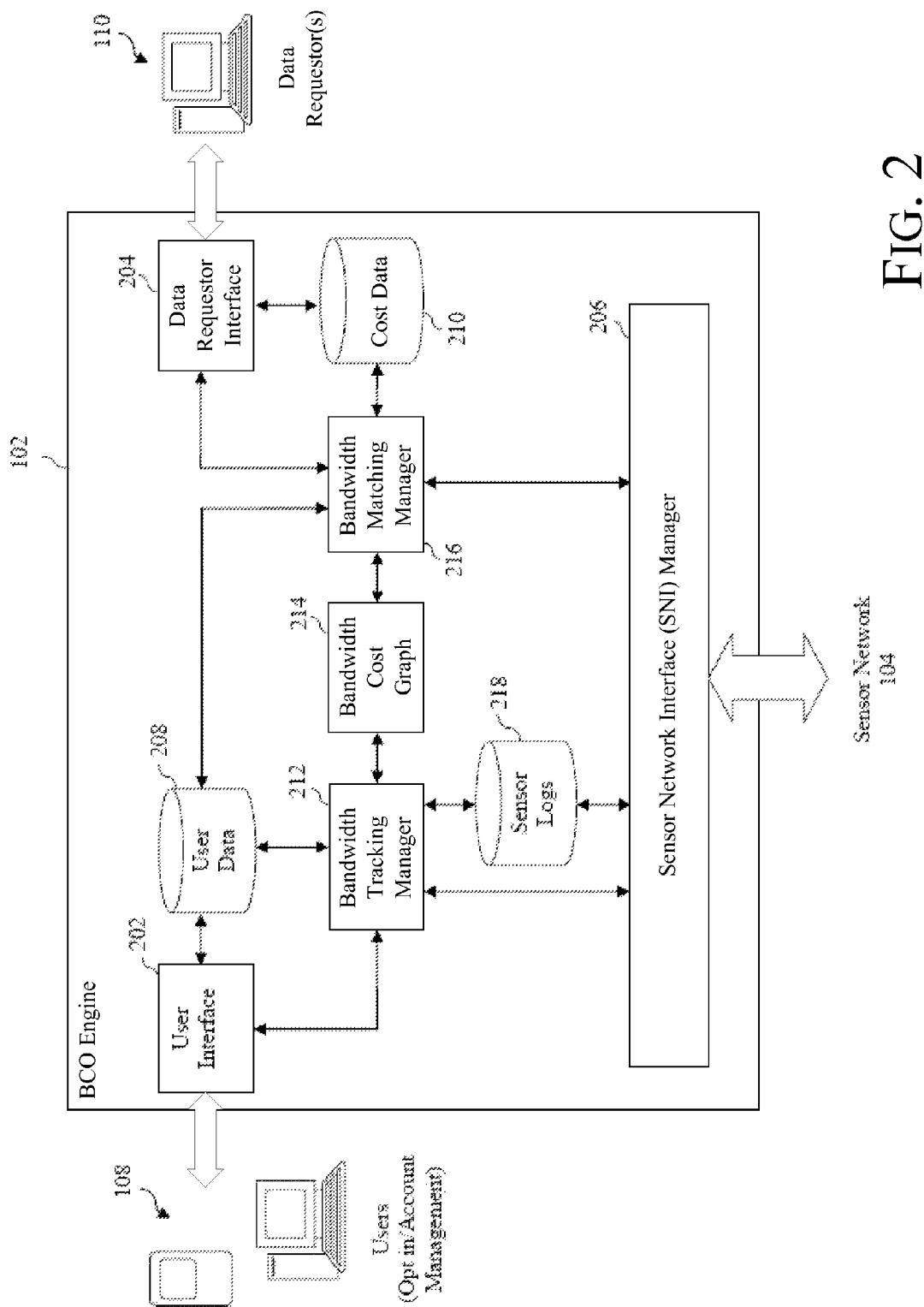
FIG. 2 is a block diagram of a BCO engine in accordance with an embodiment of the present disclosure.

FIG. 2 depicts BCO engine 102 in more detail. As shown in FIG. 2, BCO engine 102 includes a number of communicatively-connected elements including a user interface 202, a data requestor interface 204, a sensor network interface (SNI) manager 206, a user data database 208, a cost data database 210, a bandwidth tracking manager 212, a bandwidth cost graph 214, a bandwidth matching manager 216, and a sensor logs database 218. Each of these elements will now be described.

1. User Interface 202

User interface 202 is a component that is configured to allow a user to interact with BCO engine 102 from a remote location for the purpose of specifying whether or not the consumer wishes to receive BCO services from BCO engine 102 and to optionally specify preferences concerning the manner in which such services are to be delivered. User interface 202 may also be used to allow the user to register the user's devices, e.g., sensors and/or other devices with available bandwidth, such as a computing device that has Internet connectivity via a high-speed connection. In addition, user interface 202 may be used to allow the user to identify the bandwidth capabilities and costs of plans associated with each of the sensors and/or other devices. In accordance with one or more embodiments, as a part of terms of use or service, users agree to share available bandwidth and bandwidth resources to pool bandwidth and bandwidth resources in order to save costs and/or optimize delivery.

User interface 202 may also be configured to allow a user to provide information relating to the manner in which one or more devices or objects associated with the user are to be tracked by BCO engine 102. Information provided by a user via user interface 202 is stored in user data database 208. User interface 202 may be implemented using a Web service and a standard set of Web APIs for utilizing the Web service. Web applications built upon the Web service may be published by an entity that owns and/or operates BCO engine 102 or by other entities. Such Web applications are accessed by users using Web browsers in a well-known fashion.

The system/device used by the user to interact with user interface 202 may be one of sensors 112 depicted in FIG. 1 or some other system/device. In one embodiment, communication between users and user interface 202 occurs over the Internet. However, the embodiment is not so limited, and communication between users and user interface 202 may occur over any type of network or combination of networks including wide area networks, local area networks, private networks, public networks, packet networks, circuit-switched networks, and wired or wireless networks.

2. User Data Database 208

User data database 208 is configured to store data associated with particular users that is used by BCO engine 102 to determine which BCO services should be provided to a particular user and the manner in which such services should be provided. To this end, user data database 208 includes such information as, without limitation, a list of sensors of the bandwidth resources associated with each sensor that a user has registered with the BCO engine 102, and plan, cost and usage information associated with each registered bandwidth resource, and associated user preference information regarding how BCO services are to be delivered.

User data database 208 is also configured to store user-provided information regarding one or more sensors that are to be tracked, e.g., tracking of bandwidth and/or location, by BCO engine 102 for the purposes of determining a manner in which a user's device/object is to used for purposes of provisioning bandwidth based on an analysis of bandwidth information. User data database 208 may also be configured to store user preferences concerning how and when such sensors are to be tracked.

User data database 208 may also be configured to store other data about a user that can be used to perform BCO services for the user, such as data relating to a user's identity, activities, interests, preferences, and/or social network. This data may be actively provided by a user (such as via user interface 202), collected from sensors 112 via sensor network 104 or some other channel, provided to BCO engine 102 from some other network, system or database that aggregates such data, or by any combination of the foregoing.

3. Data Requestor Interface 204

Data requester interface 204 is a component that is configured to allow a requester or offeror, and their systems, to interact with BCO engine 102 to obtain, e.g., to request or purchase, bandwidth, and/or to offer bandwidth, e.g., for sale, donation, trade, etc., in accordance with associated or desired terms. A data requestor can be, without limitation, a user having one or more sensors/bandwidth resources registered with the BCO engine 102, or some other entity, such as a user of a device 110, which can be a sensor, or an application or process executing on device 110, an information object, a real world entity, a proxy, etc. Other functions of the data requestor interface 204 may include specifying the associated or desired terms of the offer/request, which can be used to match bandwidth needs with available bandwidth. Information provided by a requester or offeror through interaction with data requester interface 204 is stored in cost data database 210.

In accordance with one or more embodiments, BCO services and data requester interface 204 provide a mechanism for an entity, e.g., user, network, cooperative, collective, etc., to post a request for, or an offer of, bandwidth and the associated or desired terms of the request, or offer. BCO engine 102 is configured to compare bandwidth resources and associated bandwidth availability to determine one or more matches, and to maintain a dynamic prioritized list of currently available bandwidth resources associated with each request or offer. The bandwidth resources, requests, and/or offers, as well as the terms associated with any or all of these, can be posted, or otherwise communicated, to one or more requesters and/or offerors, in full or in some limited manner. For example, in one embodiment, a user can submit a request to either transmit or receive a large file to BCO engine 102 via data requester interface 204, receive options of varying cost and speed, and then select appropriately based upon the user's current needs and the options that are currently available for the user. Alternatively, matches can be automatically determined based on user-specified negotiation terms and/or limits set by the user or the user's proxy. A match can comprise more than one type of bandwidth resource, e.g., instant messaging, voice, etc., and can be identified as a single, summarized data exchange circuit, or the match can be identified with some or all of the bandwidth resource segments being exposed.

In one embodiment of the present disclosure, requesters and/or offerors and their systems communicate with data requester interface 204 using applications built upon a predefined API. Such applications may be published by an entity that owns and/or operates BCO engine 102 or by other entities. Communication between the requesters and/or offerors and data requester interface 204 may occur over the Internet. However, the embodiment is not so limited, and communication between the requesters and/or offerors and data requestor interface 204 may occur over any type of network or combination of networks including wide area networks, local area networks, private networks, public networks, packet networks, circuit-switched networks, and wired or wireless networks.

In accordance with one or more embodiments, an offer can comprise a donation, e.g., a charitable donation, which can be matched with a recipient, e.g., a requester requesting a donation. The donation can comprise a transfer of available bandwidth from one entity to another. The donor and/or recipient can be anonymous. In accordance with one or more embodiments, the offer can comprise a loan, e.g., a microloan, of available bandwidth, with the intention that the loaned bandwidth is "paid back", e.g., in the form of available bandwidth, or other currency.

4. Cost Data Database 210

As noted above, certain information provided by a requester or offeror through interaction with data requester interface 204 is stored in cost data database 210. This information may include, for example, data about each requester, requestee, offeror, offeree, request, offer, request/offer terms, etc.

5. SNI Manager 206

SNI manager 206 is a component that is configured to manage the interface, and communication, between BCO engine 102 and sensors 112 residing on or currently connected to sensor network 104. In accordance with one or more embodiments, SNI manager 206 is configured to facilitate an exchange of data, e.g., multimedia content, sensor data, configuration commands, etc., associated with BCO services to sensors 112 over sensor network 104. In accordance with one or more embodiments, SNI manager 206 is configured to establish an actual or logical peer to peer, or p2p, network among users, devices, sensors and beacons, which network can be used in the exchange of data in order to facilitate bandwidth and cost optimization. In accordance with one or more such embodiments, the bandwidth tracking manager 212 is configured to use a p2p network among users, devices, sensors and beacons to construct and/or update a bandwidth cost graph for sensors in an ad hoc network and their associated available bandwidth resources and costs. A bandwidth cost graph provides a real-time map of available bandwidth and associated costs. In addition, the bandwidth cost graph can be used to identify a nexus of users and their relationships, topics and movements through space and time. Depending upon the implementation, SNI manager 206 may also be configured to interoperate with third party carriers and networks to affect the exchange of multimedia content and/or other data, such as sensor data.

6. Sensor Logs Database 218

As noted above, sensor data received from sensors 112 is stored in sensor logs database 218. This sensor data is then used by bandwidth tracking manager 212 to identify an ad hoc network, and bandwidth, and optionally location, information of the sensors 112 is obtained, and a corresponding bandwidth cost graph is constructed for the ad network using the obtained information.

As will be described in more detail herein, this sensor data may include a unique identifier (ID) of the reporting sensor 112, one or more unique IDs corresponding respectively to one or more beacons sensed by the reporting sensor and one or more time codes indicating when each of the one or more beacons was respectively sensed by the reporting sensor. In accordance with one or more embodiments, a bandwidth and cost profile exists, or can be determined based on received and/or stored information, for each of the beacons sensed. In accordance with one or more embodiments, the sensor data includes bandwidth resource usage data, which can be used to update bandwidth availability information.

Other information that may be provided as part of the sensor data may include a signal strength associated with each of the one or more beacons and a time of transmission of the sensor data from the reporting sensor to BCO engine 102. The sensor data may still further include metadata associated with the reporting sensor, such as location information or other information associated with the reporting sensor.

7. Bandwidth Tracking Manager 212

Bandwidth tracking manager 212 is a component that is configured to use sensor data from sensor logs database 218 to identify one or more of the sensors 112 for an ad hoc network, to track the bandwidth of the sensors 112, and to construct and/or update a bandwidth cost graph 214. The manner in which bandwidth tracking manager 212 operates to perform this function will be described in detail below. Once bandwidth tracking manager 212 has determined the current relative or actual bandwidth of a sensor of the ad hoc network, it uses that information for a bandwidth cost graph 214 that represents all sensors in a network, e.g., an ad hoc network or sensor network 104, being tracked by BCO engine 102 and their current available bandwidths and the cost(s) associated with each of the available bandwidths. In accordance with one or more embodiments, the bandwidth cost graph 214 is used to identify a data exchange path comprising one or more data exchange segments that can be used to exchange data between one or more entities, where a segment can be provided using a bandwidth resource and corresponding available bandwidth of a sensor 112. In accordance with one or more embodiments, the graph also takes account a location of some or all of the sensors, and relative proximities.

8. Bandwidth Matching Manager 216

Bandwidth matching manager 216 is a component that is configured to match information concerning available bandwidth of bandwidth resources provided by one or more sensors 112, determined using bandwidth cost graph 214, to a request or offer made by a data requestor 110, e.g., stored in a cost data database 210. In a case of a request for bandwidth, bandwidth matching manager 216 is configured to facilitate identification of one or more bandwidth resources from available bandwidth resource selections using bandwidth cost graph 214. Other factors may be used in addition to cost and availability to match a request with one or more bandwidth resources, such as, without limitation, a rate at which data is to be exchanged, a sensor's available power, importance of the data and/or data exchange, data security, reliability, proximity/location, etc. In accordance with one or more embodiments, some or all of such other factors can be associated with each sensor 112 represented in the bandwidth cost graph 214, together with bandwidth and cost information. In a case of an offer of bandwidth, bandwidth matching manager 216 is configured to facilitate identification of one or more entities, e.g., one or more data requesters that wish to make use of the offer of available bandwidth.

The bandwidth cost graph 214 can be used to identify multiple available bandwidth alternatives, from which an alternative can be automatically selected for the requester. In accordance with one or more embodiments, bandwidth matching manager 216 can facilitate identification by automatically making the selection based on one or more predetermined criteria, which can include user-specified criteria. Alternatively, the multiple alternatives can be presented to the requester for selection by the requester, or some other entity on behalf of the requester.

In accordance with one or more embodiments, bandwidth matching manager 216 is further configured to compare available bandwidth, e.g., in connection with an offer, and at least one request for available bandwidth, and maintains a dynamic prioritized list of currently available resources of the sensor network 104 to satisfy each request or offer. As discussed above, one or more optimal matches can be automatically selected. Alternatively, the one or more optimal matches can be presented in the order of the priority assigned by bandwidth matching manager 216, so that the requester can make the selection with knowledge of the assigned priorities. A match can be presented a single communication circuit, which may comprise more than one segment, or each match can be identified by the one or more segments that are to be used for the data exchange.

In accordance with one or more embodiments, bandwidth matching manager 216 is configured to facilitate resale of bandwidth. In accordance with one or more embodiments, the resale of bandwidth could be an add-on service or a third-party run service. In either case, bandwidth needs are matched with available bandwidth. A match, e.g., a match between a bandwidth request and an offer, is packaged and priced, and a transaction involving a packaged bandwidth match can be billed and payment can be collected and allocated.

Bandwidth matching manager 216 may also be configured to take into account user information, other than bandwidth information, when determining whether or not to match a bandwidth request with a bandwidth offer. This information may include, for example, data relating to a user's identity, activities, interests, preferences, or social network. Bandwidth matching manager 216 may access this data from user data database 208.

In accordance with one or more embodiments, bandwidth matching manager 216 is configured to form bandwidth cooperatives or collectives using social relationships (explicitly defined or implicitly derived based upon association/past actions) between users, so as to facilitate the pooling of resources and distribution channels to minimize cost and maximize speed/efficiency of data movements among pooled users/devices. In accordance with one or more embodiments, bandwidth pooling can be used to enable, or benefit, public safety, charitable, or other, donations. By way of some non-limiting examples, a 911 service can be given highest priority by bandwidth matching manager 216, and/or a non-profit entity can be given a digital credit for a certain total or rates of transfer. In accordance with one or more embodiments, bandwidth can be pooled to support donation or regular allocation of bandwidth by users to non-profit, school, church, community, artist or other entity considered deserving of bandwidth sharing/donation by the user.

B. Tracking in Accordance with an Embodiment of the Present Disclosure

As users and devices move through the real-world and come on and off the sensor network 104, they always have dynamic bandwidth profiles that change based upon bandwidth usage, which can be determined based on initial allocation and usage information. In accordance with one or more embodiments, BCO engine 102 is configured to take account of bandwidth and one or more other conditions used to define a profile. In addition to a bandwidth profile associated with a sensor, other factors/criteria associated with the data exchange, e.g., a rate at which data is to be exchanged, a sensor's available power, importance of the data and/or data exchange, data security, reliability, proximity/location, etc., can also be taken into account, and information related to one or more of these factors can be included in a bandwidth profile.

As discussed above, in accordance with one or more embodiments, bandwidth tracking manager 212 within BCO engine 102 is configured to identify an ad hoc network comprising a plurality of sensors, track the bandwidth, and optionally other information such as location, of such sensors, and construct and/or update a bandwidth cost graph 214. In particular, bandwidth tracking manager 212 uses time-coded sensor data received from each of the sensors to identify the ad hoc network. In a case that the sensor data includes bandwidth/cost information, e.g., time remaining or usage information, bandwidth tracking manager 212 can use the received bandwidth/cost information, and can further use stored and/or derived bandwidth/cost information. The bandwidth and cost information for each of the sensors identified for an ad hoc network can then used to construct and/or update a bandwidth cost graph 214 for use in providing BCO services.

In accordance with one or more embodiments, the sensor data can be used to determine a current location of each of the sensors relative to one or more beacons. As used herein, the term beacon broadly refers to any unique device or object that is discoverable or detectable by a sensor. Information received from sensors can include location information. Alternatively, bandwidth tracking manager 212 can leverage information relating to the effective transmission ranges of the beacons to determine the relative location of each of the plurality of sensors with respect to other sensors within the plurality of sensors. Where actual (as opposed to relative) location information is available for a particular sensor, it can then be used to generate or augment location information associated with other sensors known to be spatially and temporally proximate to the particular sensor.

Figure 3:
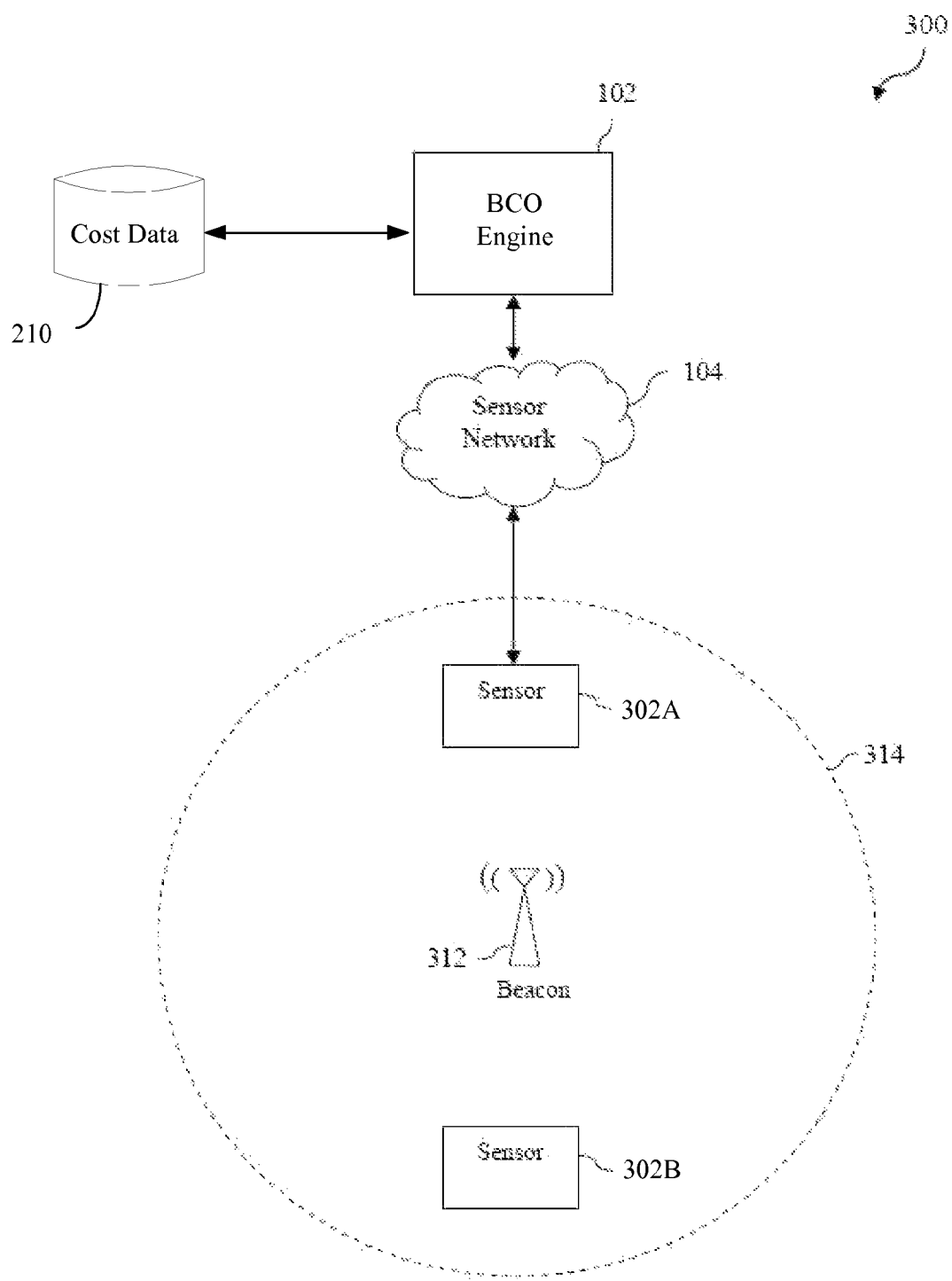
FIG. 3 is a block diagram of a scenario in which a sensor transmits sensor data associated with the detection of a single beacon to a BCO engine in accordance with an embodiment of the present disclosure.

FIG. 3 is a block diagram 300 of a scenario in which a sensor 302A transmits sensor data associated with the detection of a single beacon 312 to BCO engine 102. As shown in FIG. 3, sensor 302A has entered into or resides in a current transmission range 314 of beacon 312 and is therefore capable of detecting transmissions from beacon 312. Responsive to detecting beacon 312, sensor 302A sends sensor data to BCO engine 102 via sensor network 104. In an embodiment, this sensor data includes: a unique ID of sensor 302A, a unique ID of beacon 312 and a time code indicating when beacon 312 was sensed by sensor 302A. The sensor data may also include the signal strength of beacon 312 as detected by sensor 302A, if such information is available, and a time code indicating when the sensor information was transmitted from sensor 302A to BCO engine 102. The sensor data may still further include metadata associated with sensor 302, such as bandwidth information (e.g. bandwidth information provided by sensor 302A, a provider, such as a wireless network access provider, or user-entered bandwidth information), location information (e.g., location information provided by sensor 302A, a provider, or user-entered location information) or other information associated with sensor 302A. In accordance with one or more embodiments, such bandwidth information can be determined, or retrieved, from information stored in user data 208 and/or cost data 210. The bandwidth information comprises information regarding bandwidth resources of the sensor. The bandwidth information can further include information identifying other devices, to which the sensor has an established connection, or is able to establish a connection, such as a computer system that has available bandwidth, e.g., a computer system with a high-speed wired network, e.g., Internet, connection, e.g., via a digital subscriber line (DSL), T1, etc. connection.

Sensor 302A and beacon 312 may comprise any of a wide variety of well-known sensor and beacon types. For example, sensor 302A may comprise a first WiFI device and beacon 312 may comprise a second WiFi device, wherein the first WiFi device is capable of detecting the second WiFi device in a well-known manner. Each of the first and second WiFi devices may comprise, for example, a WiFi user device or access point. As will be appreciated by persons skilled in the relevant art(s), WiFi refers to wireless networking technology built around the family of IEEE 802.11 standards. Conventional WiFi devices typically have a transmission range from 0 up to approximately 100 meters. A typical WiFi device can act as both a sensor and a beacon, so it is possible that beacon 312 is also capable of detecting other WiFi devices and of reporting related sensing information to BCO engine 102. WiFi devices can be either stationary or mobile, so sensor 302A and beacon 312 may also be stationary or mobile in this case.

As another example, sensor 302A may comprise a cellular telephone and beacon 312 may comprise a cellular tower, wherein the cellular telephone is capable of detecting the cellular tower in a well-known manner. A conventional cellular tower has a transmission range from 0 up to approximately 10,000 meters. Cellular telephones are capable of being carried from location to location by a user while cellular towers are stationary, so in this case sensor 302A may be stationary or mobile while beacon 312 will be stationary.

As a further example, sensor 302A may comprise a first Bluetooth™ device and beacon 312 may comprise a second Bluetooth™ device, wherein the first Bluetooth™ device is capable of detecting the second Bluetooth™ device in a well-known manner. As will be appreciated by persons skilled in the relevant art(s), Bluetooth™ refers to an industrial standard for wireless personal area networks (PANs) that is based on specifications developed and licensed by the Bluetooth™ Special Interest Group. Conventional Bluetooth™ devices typically have a transmission range from 0 up to approximately 10 meters. A typical Bluetooth™ device can act as both a sensor and a beacon, so it is possible that beacon 312 is also capable of detecting other Bluetooth™ devices and of reporting related sensing information to BCO engine 102. Bluetooth™ devices can be either stationary or mobile, so sensor 302A and beacon 312 may also be stationary or mobile in this case.

Sensor 302B can comprise any of the sensor types discussed above with regard to sensor 302A. Like sensor 302A, sensor 302B is located within transmission range 314. Sensor 302B is capable of detecting beacon 312. In addition, sensor 302B is capable of detecting and/or communicating with sensor 302A and/or beacon 312, e.g., via a Bluetooth PAN. Sensor 302B can request an available source of bandwidth, e.g., sensor 302A, to exchange sensor or other data.

Table 1 below shows various sensor and beacon mobility use cases that may be supported by an embodiment of the present disclosure. In particular, each entry in Table 1 describes a sensor-beacon combination that can result in the generation and reporting of sensor data to BCO engine 102.

TABLE 1

| Sensor and Beacon Mobility Use Cases | |
|---|---|
| Stationary Sensor detects Stationary Beacon | Mobile Sensor detects Stationary Beacon |
| Stationary Sensor detects Mobile Beacon | Mobile Sensor detects Mobile Beacon |

In accordance with one embodiment of the present disclosure, BCO engine 102 maintains information indicating whether one or more sensors or beacons are mobile or stationary, and uses such information to enhance the manner in which bandwidth tracking manager 212 identifies the ad hoc network. As discussed herein, depending upon the implementation, bandwidth information may be obtained through manual user input and/or is automatically determined by BCO engine 102, e.g., using bandwidth information supplied by the sensors, plan/bandwidth providers, users, etc. The bandwidth information automatically determined can be periodically audited to ensure that an accounting of available bandwidth, and a bandwidth and cost profile associated with a sensor and/or beacon, is current and accurate, and modifications to one or more of the premises used to automatically determine the bandwidth can be made based on the outcome of the audit. A similar audit can be performed on any technique used to a location, and/or a degree of mobility, of a sensor or beacon.

Depending on the sensor-beacon type, the unique IDs associated with sensor 302 and beacon 304 may be MAC addresses respectively associated with sensor 302 and beacon 312. This approach may be used, for example, whether sensor 302 and beacon 304 are WiFi or Bluetooth™ devices. However, other methods of assigning unique IDs to sensor 302 and beacon 312 may be used. In accordance with one or more embodiments, BCO engine 102 can use sensor network 104 to ping an available bandwidth source, e.g., sensor 302, to determine whether or not the source and the associated bandwidth remain available via sensor network 104.

Figure 4:
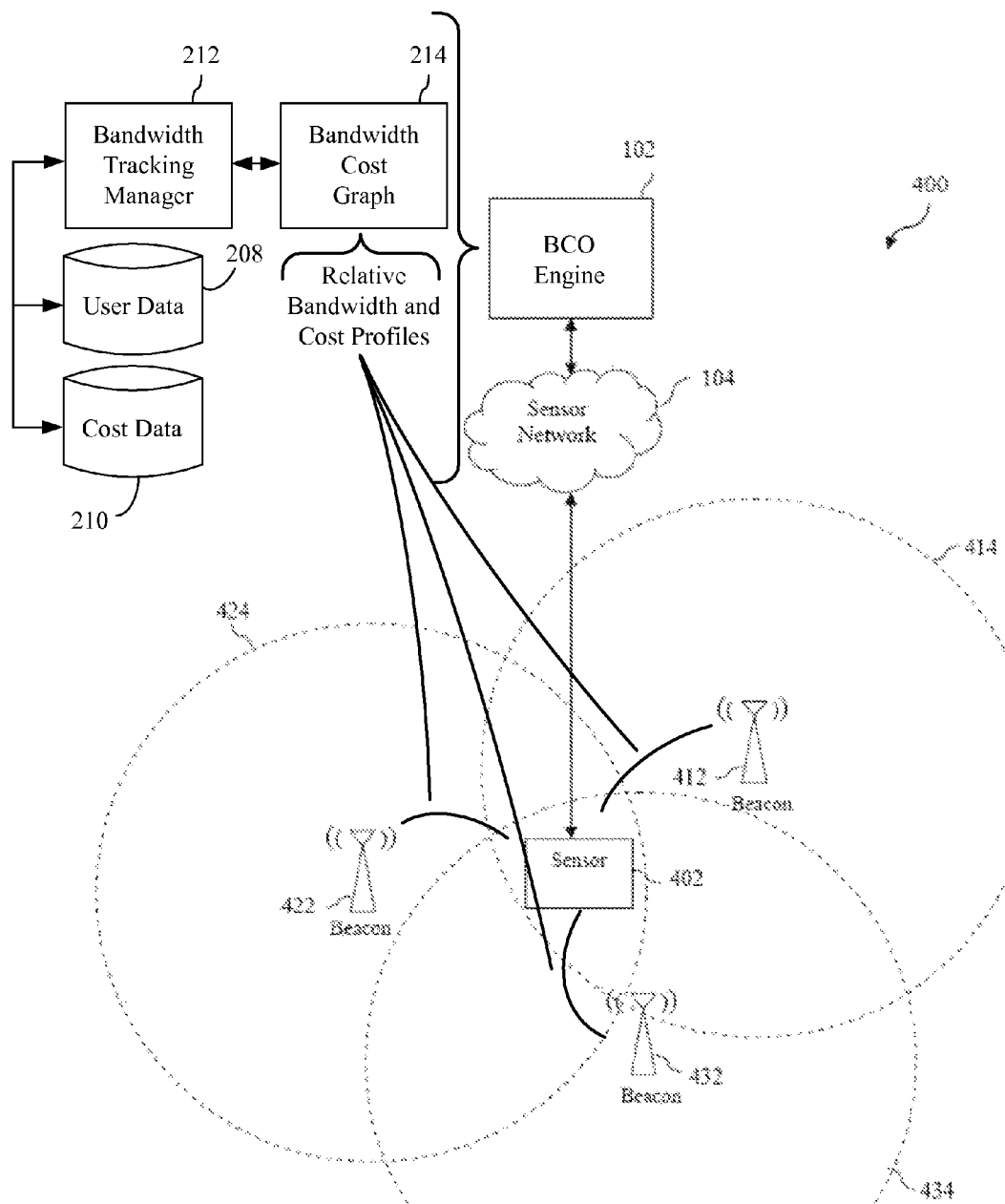
FIG. 4 is a block diagram of a scenario in which a sensor transmits sensor data associated with the detection of a plurality of beacons to a BCO engine in accordance with an embodiment of the present disclosure.

FIG. 4 is a block diagram 400 of a scenario in which a sensor 402 transmits sensing information associated with the detection of a plurality of beacons to BCO engine 102. As shown in FIG. 4, sensor 402 has entered into or resides in a current transmission range 414 of a first beacon 412, a current transmission range 424 of a second beacon 422, and a current transmission range 434 of a third beacon 432, and is therefore capable of detecting transmissions from all three beacons. Responsive to detecting all three beacons, sensor 402 sends sensor data to BCO engine 102. In an embodiment, this sensor data includes: a unique ID of sensor 402, unique IDs respectively associated with each of first beacon 412, second beacon 422 and third beacon 432, and time codes indicating when each beacon was respectively sensed by sensor 402. The sensor data may also include the signal strength of each of the three beacons as detected by sensor 402, if such information is available, and a time code indicating when the sensor information was transmitted from sensor 402 to BCO engine 102. The sensor data may still further include metadata associated with sensor 402, such as bandwidth information, e.g., time remaining or usage information, location information (e.g. GPS location information) and/or other information associated with sensor 402.

Bandwidth tracking manager 212 determines the relative location of sensor 402 with respect to other sensors within the plurality of sensors using the location information. A relative bandwidth and cost profile can be established for sensor 402, which comprises an actual or estimate of the bandwidth and cost associated with each of beacons 412, 422 and 432, with respect to other sensors. The relative bandwidth and cost profiles associated with sensor 402 and the sensed beacons 412, 422 and 432 determined by bandwidth tracking manager 212 are a part of the bandwidth cost graph 214 for the one or more sensors identified in the ad hoc network and/or sensor network 104, or some portion thereof, which includes sensor 402. The bandwidth cost graph 214 is used by BCO engine 102 to provide BCO services, e.g., allocate bandwidth, in accordance with one or more embodiments.

Figure 5:
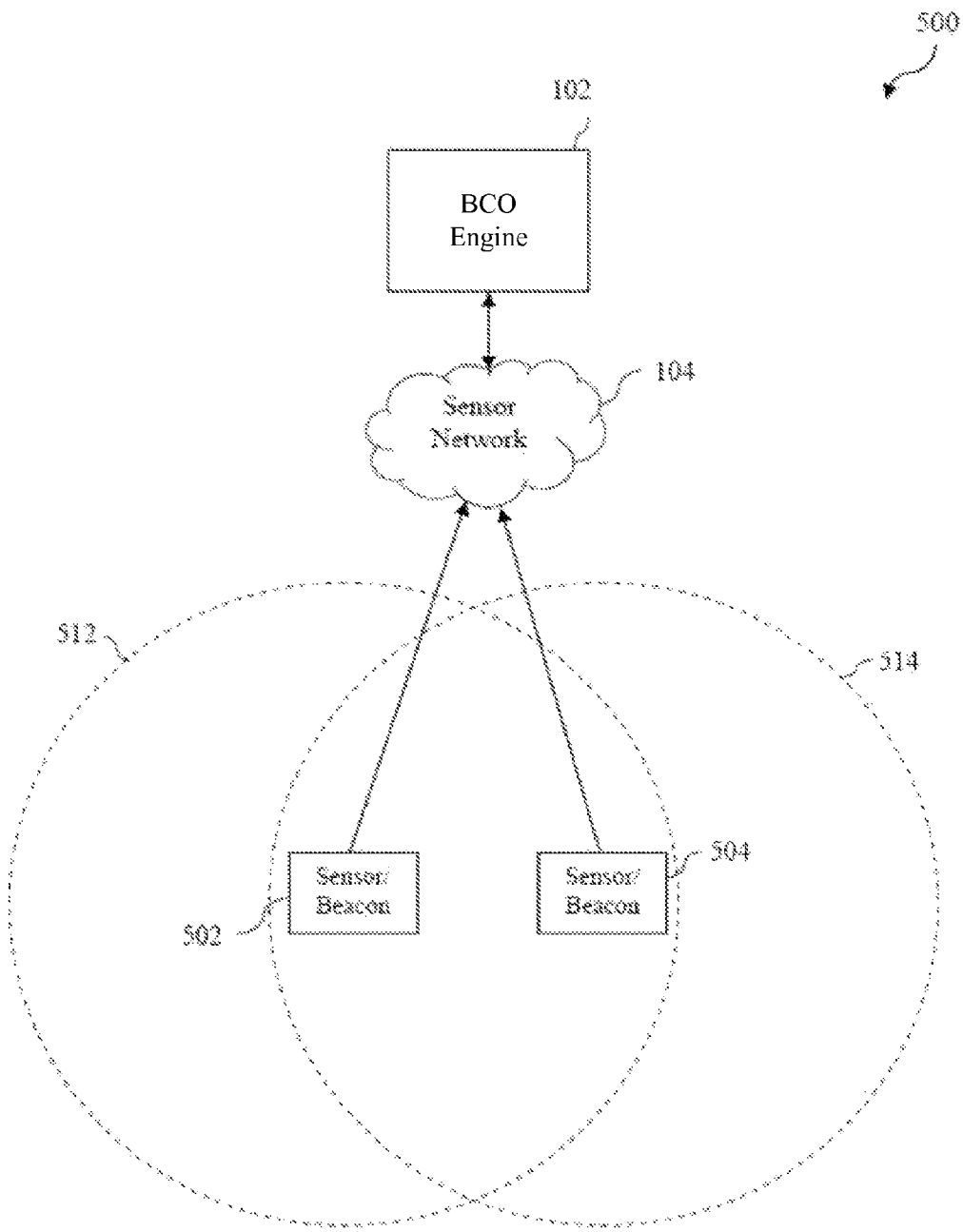
FIG. 5 is a block diagram of a scenario in which two devices/objects that act as both sensors and beacons detect each other and send sensor data to a BCO engine responsive to such detection in accordance with an embodiment of the present disclosure.

FIG. 5 is a block diagram of a scenario in which devices or objects that are configured to act as both sensors and beacons detect each other and send sensor information to BCO engine 102 responsive to such detection. As discussed above, WiFi devices and Bluetooth™ devices are examples of devices that can act both as sensors and beacons.

As shown in FIG. 5, sensor/beacon 502 has entered into or resides in a current transmission range of sensor/beacon 504 and is therefore capable of detecting sensor/beacon 504 and/or exchanging data with sensor/beacon 504. Likewise, sensor/beacon 504 has entered into or resides in a current transmission range of sensor/beacon 502 and is therefore capable of detecting, and/or exchanged data with, sensor/beacon 502. Responsive to detecting sensor/beacon 504, sensor/beacon 502 sends sensor data to BCO engine 102 via sensor network 104 that includes a unique ID of sensor/beacon 502, a unique ID associated with sensor/beacon 504, and a time code indicating when sensor/beacon 504 was sensed by sensor/beacon 502, as well as other information as discussed in previous examples. Likewise, responsive to detecting sensor/beacon 502, sensor/beacon 504 sends sensor data to BCO engine 102 via sensor network 104 that includes the unique ID of sensor/beacon 504, the unique ID of sensor/beacon 502, and a time code indicating when sensor/beacon 502 was sensed by sensor/beacon 504, as well as other information as discussed in previous examples. Sensors/beacons 502 and 504 are capable of exchanging data via sensor network 104. In accordance with one or more embodiments, as discussed above, bandwidth tracking manager 212 is configured to use relative bandwidth and cost profiles associated with sensor/beacon 502 and sensor/beacon 504 to generate a bandwidth and cost graph 214 of an ad hoc network of sensors, e.g., sensors that have provided sensor data to BCO engine 102, which includes sensor/beacon 502 and sensor/beacon 504, and which can be used by BCO engine 102 to provide BCO services, such as allocating available bandwidth of one or both of sensors/beacons 502 and 504.

Figure 6:
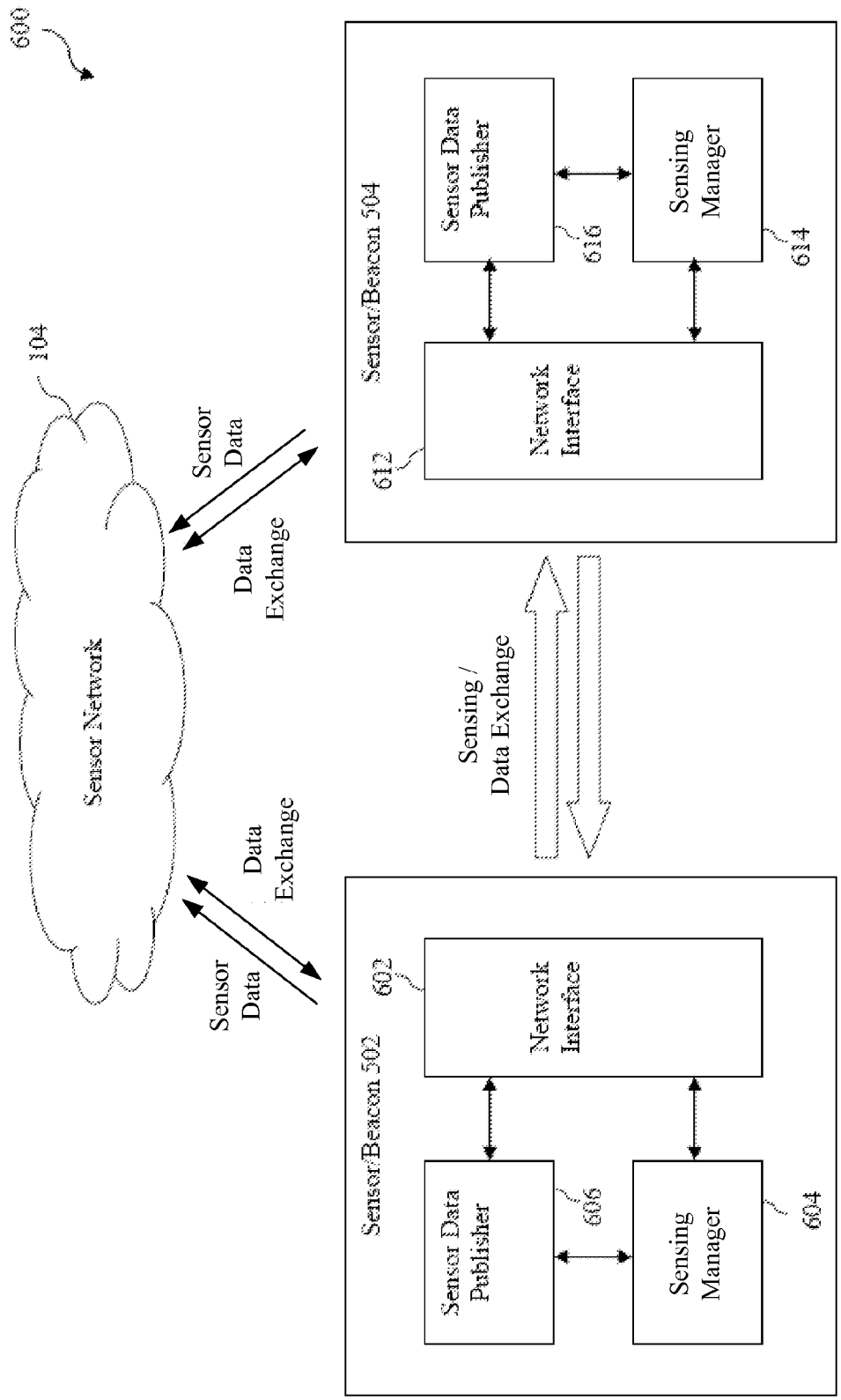
FIG. 6 is a block diagram that shows the two devices/objects of FIG. 5 in more detail.

FIG. 6 is a block diagram 600 that shows sensor/beacon 502 and sensor/beacon 504 in more detail. As shown in FIG. 6, sensor/beacon 502 includes a number of communicatively-connected components, including a network interface 602, a sensing manager 604, and a sensor data publisher 606. Network interface 602 is configured to allow sensor/beacon 502 to transmit signals for detection by other entities as well as to detect signals transmitted by other entities. Network interface 602 is also configured to transmit sensor data to BCO engine 102 (not shown in FIG. 6) via sensor network 104 and to exchange, e.g., transmit and/or receive, data with BCO engine 102, and/or sensor/beacon 504. In an alternate embodiment, network interface 602 is used for sensing while an additional network interface (not shown in FIG. 6) is used for communication with BCO engine 102 over sensor network 104.

Sensing manager 604 is configured to scan one or more wireless channels via network interface 602 in order to detect the transmissions of any beacons. If a beacon is detected, sensing manager 604 obtains a unique ID associated with the beacon (either from the originally-received beacon transmission or via a subsequent exchange of messages with the beacon) and optionally measures or otherwise obtains a signal strength associated with transmissions from the beacon. Sensing manager 606 is also configured to generate a time code indicating a time at which the beacon was detected. Sensing manager 606 is further configured to provide the IDs of the currently-sensed beacons, the associated time codes, and (optionally) the signal strength data to sensor data publisher 604. Sensing manager 604 is configured to perform this scanning function, which is also referred to herein as "polling," on a periodic basis. In an embodiment, the frequency at which polling is performed may be controlled by modifying a configurable polling frequency parameter.

Depending upon the implementation sensing manager 604 may also provide additional information to sensor data publisher 606 concerning the currently-sensed beacons, such as the channel on which a beacon was sensed, an indication of beacon type, or an indication of directionality of a currently-sensed beacon. In addition and in accordance with one or more embodiments, sensing manager 604 provides bandwidth-related information associated with the currently-sensed beacons, e.g., beacon type, provider information, data transfer rate, usage/cost information, etc.

Sensor data publisher 606 receives the foregoing information from sensing manager 604 and accumulates it in a buffer for subsequent transmission to BCO engine 102. Sensor data publisher 606 may add additional metadata to the information before sending it to BCO engine 102. This additional metadata may include, for example, bandwidth-related information and/or location information associated with sensor/beacon 502. Bandwidth-related information may be provided by a bandwidth manager, as discussed below. The location information may include, for example, location information provided by a GPS module or other positioning module within sensor/beacon 502. Alternatively, such location information may include location information (e.g., a zip code, street address, or the like) manually provided by a user of sensor/beacon 502 via a user interface of sensor/beacon 502 (not shown in FIG. 6). Such location information may further include event information manually provided by a user of sensor/beacon 502 from which a location may be inferred. Additionally, such location information may be obtained by mapping a user to a particular event (e.g., by accessing a user calendar or by some other means), wherein the event is associated with a particular location. Still further, such location information may include location information received by sensor/beacon 502 from another device via a local connection, wherein the local connection may be for example a Bluetooth™ link, an infrared link, or some other wired or wireless link.

Sensor data publisher 606 is configured to transmit this accumulated sensor data on a periodic basis to BCO engine 102. In an embodiment, the frequency at which such reporting is performed may be controlled by modifying a configurable reporting frequency parameter.

Like sensor/beacon 502, sensor/beacon 504 also includes a number of communicatively-connected components, including a network interface 612, a sensing manager 614, and a sensor data publisher 616. These components perform similar functions to network interface 602, sensing manager 604 and sensor data publisher 606, respectively, as described above in reference to sensor/beacon 502.

As discussed above, sensor/beacon 502 and sensor/beacon 504 can exchange data with each other and/or sensor network 104, e.g., using available bandwidth allocated by BCO engine 102.

Although FIG. 6 depicts two sensor/beacons 502 and 504 each of which is capable of sensing the other, it is noted that such sensing need not be bi-directional. In other words, in alternate embodiments, sensor/beacon 502 may be capable of detecting sensor/beacon 504 or sensor/beacon 504 may be capable of detecting sensor/beacon 502, but not both. It is also noted that the foregoing functions of sensing and reporting of sensor data as performed by each sensor/beacon 502 and 504 may advantageously be performed without pairing with the other device.

Figure 7:
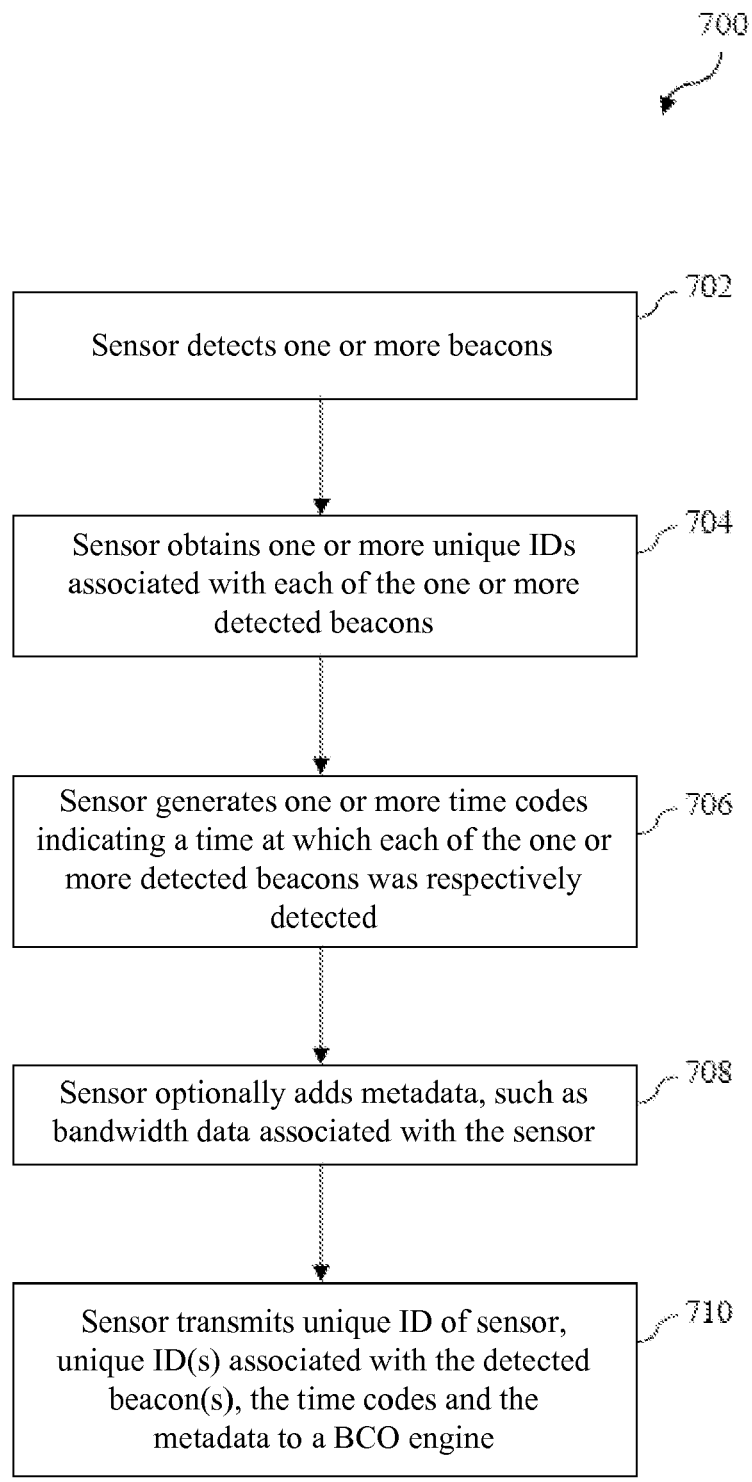
FIG. 7 illustrates a flowchart of an example method for reporting sensor data associated with the sensing one or more proximally-located beacons in accordance with an embodiment of the present disclosure.

FIG. 7 illustrates a flowchart 700 of an example method for reporting sensor data associated with the sensing one or more detected beacons in accordance with an embodiment of the present disclosure. The method of flowchart 700 may be performed by any type of sensor or sensor/beacon including but not limited to any of the various types of sensors and sensor/beacons described herein and therefore should not limited to a particular structure or implementation.

As shown in FIG. 7, the method of flowchart 700 begins at step 702 in which a sensor detects one or more beacons. Step 702 may occur responsive to the performance of a periodic polling function by the sensor as described above. At step 704, the sensor obtains one or more unique IDs respectively associated with each of the one or more detected beacons. Step 704 may also include obtaining other information associated with each of the one or more detected beacons, including but not limited to a signal strength associated with each of the one or more detected beacons, a channel on which each beacon was sensed, an indication of each beacon type, or an indication of directionality of each currently-sensed beacon. At step 706, the sensor generates one or more time codes indicating a time at which each of the detected beacons was respectively detected. At step 708, the sensor optionally adds metadata (including but not limited to location information and provider-generated, sensor-generated or user-provided bandwidth information) to the foregoing sensor data. At step 710, the sensor transmits a unique ID of the sensor, the unique ID(s) and other information associated with the detected beacon(s), the time codes and the metadata to a BCO engine, e.g., BCO engine 102. Step 710 may occur responsive to the performance of a periodic reporting function by the sensor as described above.

Figure 8:
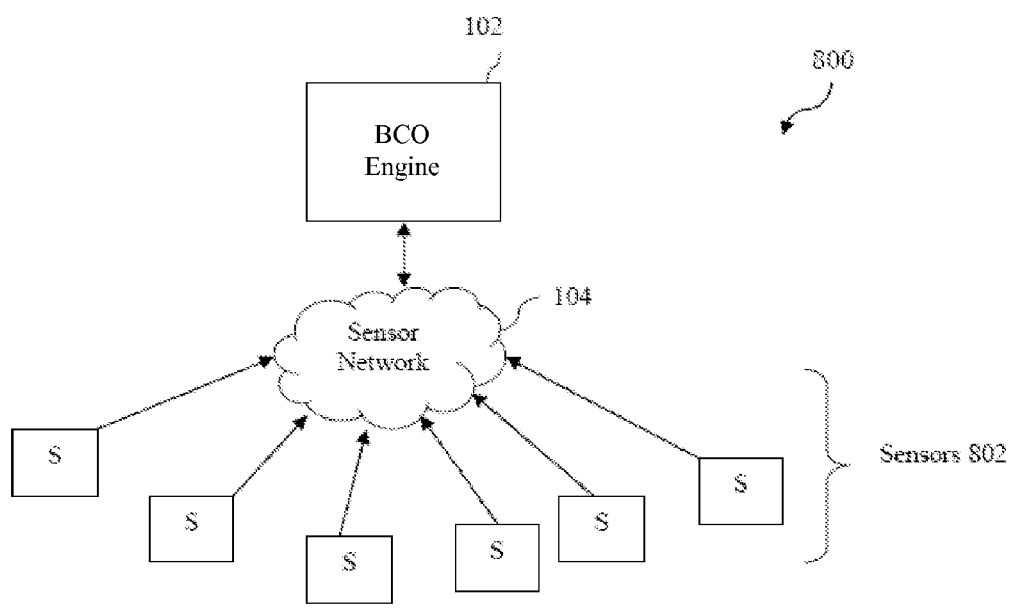
FIG. 8 is a block diagram of a system in accordance with an embodiment of the present disclosure in which a plurality of sensors periodically report sensor data to a BCO engine.

Thus, in accordance with an embodiment of the present disclosure, numerous sensors (including sensors that also operate as beacons) provide sensor data to BCO engine 102, wherein such sensor data identifies beacons that are currently detectable by each sensor and sensor/beacon. This is illustrated in FIG. 8, which shows a plurality of sensors 802 (shown as boxes labeled with an "S"), wherein each sensor reports sensor data to BCO engine 102 via sensor network 104. BCO engine 102 uses such sensor data to determine the bandwidth information, and optionally the relative proximity, for each sensor in a plurality of sensors 802 with respect to the other sensors in the plurality of sensors 802 and to identify an ad hoc network comprising the plurality of sensors 802, and to construct and/or update a bandwidth cost graph 214 based on such bandwidth information, and optional proximity information. BCO engine 102 may advantageously perform this function by obtaining sensor data from a variety of different sensor types (e.g., WiFi, cellular, or Bluetooth™) and from sensors associated with different networks or telecommunications carriers.

Figure 9:
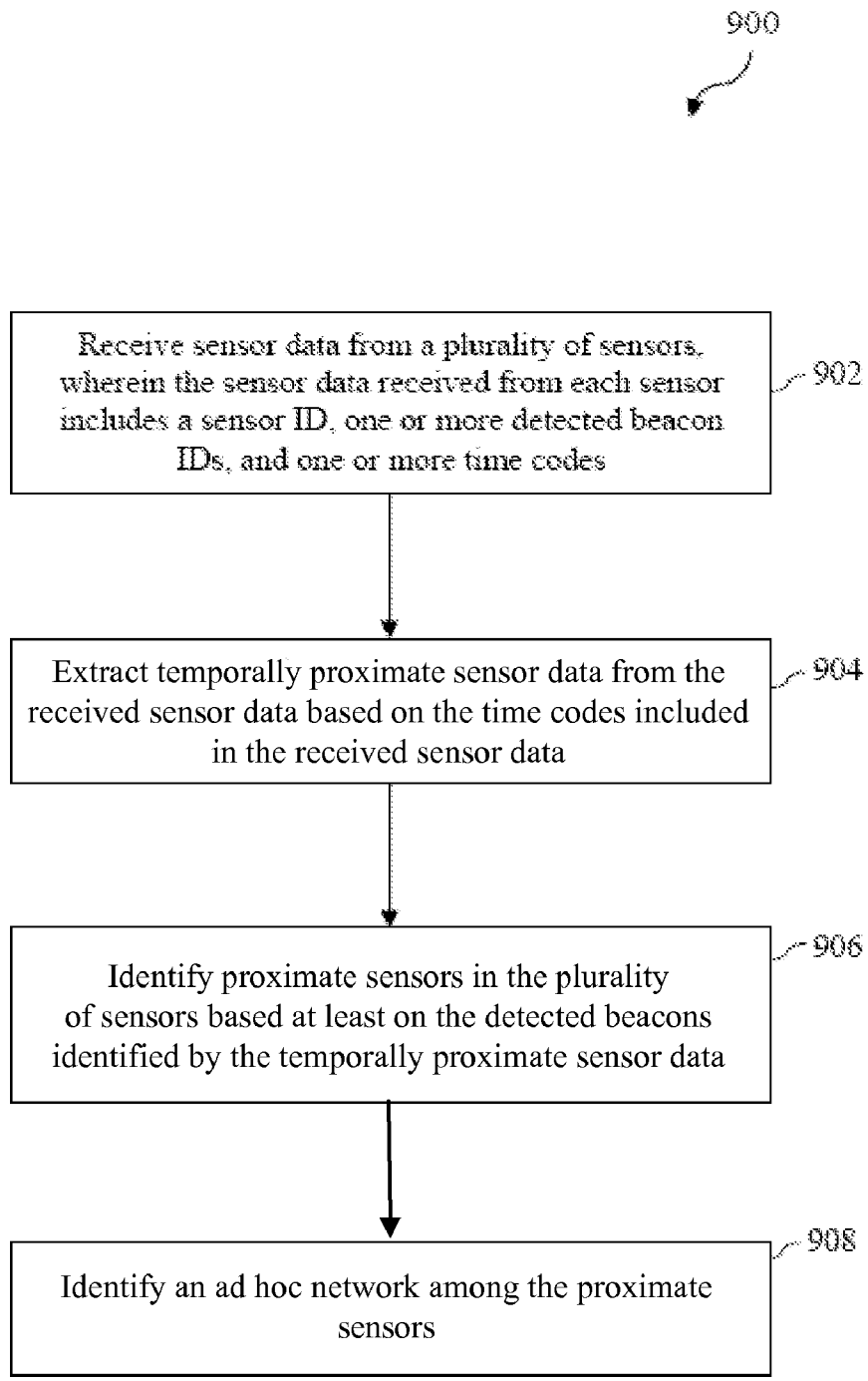
FIG. 9 illustrates a flowchart of a method for constructing an ad hoc network in accordance with an embodiment of the present disclosure.

The manner in which BCO engine 102 operates to identify an ad hoc network based on the sensor data will now be described with reference to flowchart 900 of FIG. 9. As shown in FIG. 9, the method begins at step 902, in which SNI manager 206 receives sensor data from a plurality of sensors, wherein the sensor data received from each of the plurality of sensors includes at least: a unique ID associated with the sensor, one or more unique IDs associated respectively with one or more beacons detected by the sensor, and one or more time codes indicating when each of the one or more beacons was respectively detected by the sensor, and optionally bandwidth information and/or location information. SNI manager 206 stores this sensor data in sensor logs database 218, where it is accessible by bandwidth tracking manager 212.

At step 904, bandwidth tracking manager 212 accesses sensor logs database 218 and extracts temporally proximate sensor data from the sensor data that was received in step 902. Bandwidth tracking manager 212 performs this function by extracting sensor data that corresponds to a unique detection time or detection time period. By identifying sensor data corresponding to a unique detection time or detection time period, bandwidth tracking manager 212 is able to obtain a subset of the received sensor data corresponding to a particular instance in time or to a particular time window. In an embodiment, this step is performed by analyzing the time codes associated with each set of sensor data, wherein each time code indicates a time that a particular beacon was identified by a particular sensor. Because the time codes may be generated by sensors using local sensor time, this step may also include normalizing the time codes. Normalizing the time codes may include, for example, converting each of the time codes to a system time.

At step 906, bandwidth tracking manager 212 identifies temporally, and optionally spatially, proximate sensors in the plurality of sensors based on the detected beacons identified by the temporally proximate sensor data. This step may include, for example, comparing the beacons detected by each of the sensors at the same time or during the same time period to determine which sensors are proximate to each other. For example, if two sensors detect the same beacon as the same time or during the same time period, it can be assumed that the two sensors are temporally, as well as spatially, proximate. As another example, if two sensors that can also act as beacons detect each other at the same time or during the same time period, it can be assumed that the two sensors are temporally and spatially proximate.

The manner in which the temporally proximate sensor data is analyzed by bandwidth tracking manager 212 to perform the function of step 906 may vary depending on the implementation and the amount of sensor data available for each sensor. For example, the analysis performed by bandwidth tracking manager 212 may take into account other information provided as part of the sensor data in determining whether sensors are temporally and spatially proximate, such as the signal strength associated with each detected beacon, a beacon type, or an indication of directionality associated with each detected beacon. In determining temporal and spatial proximity, bandwidth tracking manager 212 may also utilize known information concerning the maximum transmission ranges associated with certain beacon types.

At step 908, bandwidth tracking manager 212 identifies an ad hoc network that comprises the sensors identified in step 906. The ad hoc network may be considered virtual in the sense that the sensors included in the network may not be physically connected to each other, but can be capable of being, or are, communicatively connected to each other. Bandwidth tracking manager 212 is configured to maintain the ad hoc network. In accordance with one or more embodiments, bandwidth tracking manager 212 uses bandwidth information provided via the sensor network 104 and/or bandwidth information retrieved from user data 208 to construct or update a bandwidth cost graph 214 associated with the identified ad hoc network.

Figure 10:
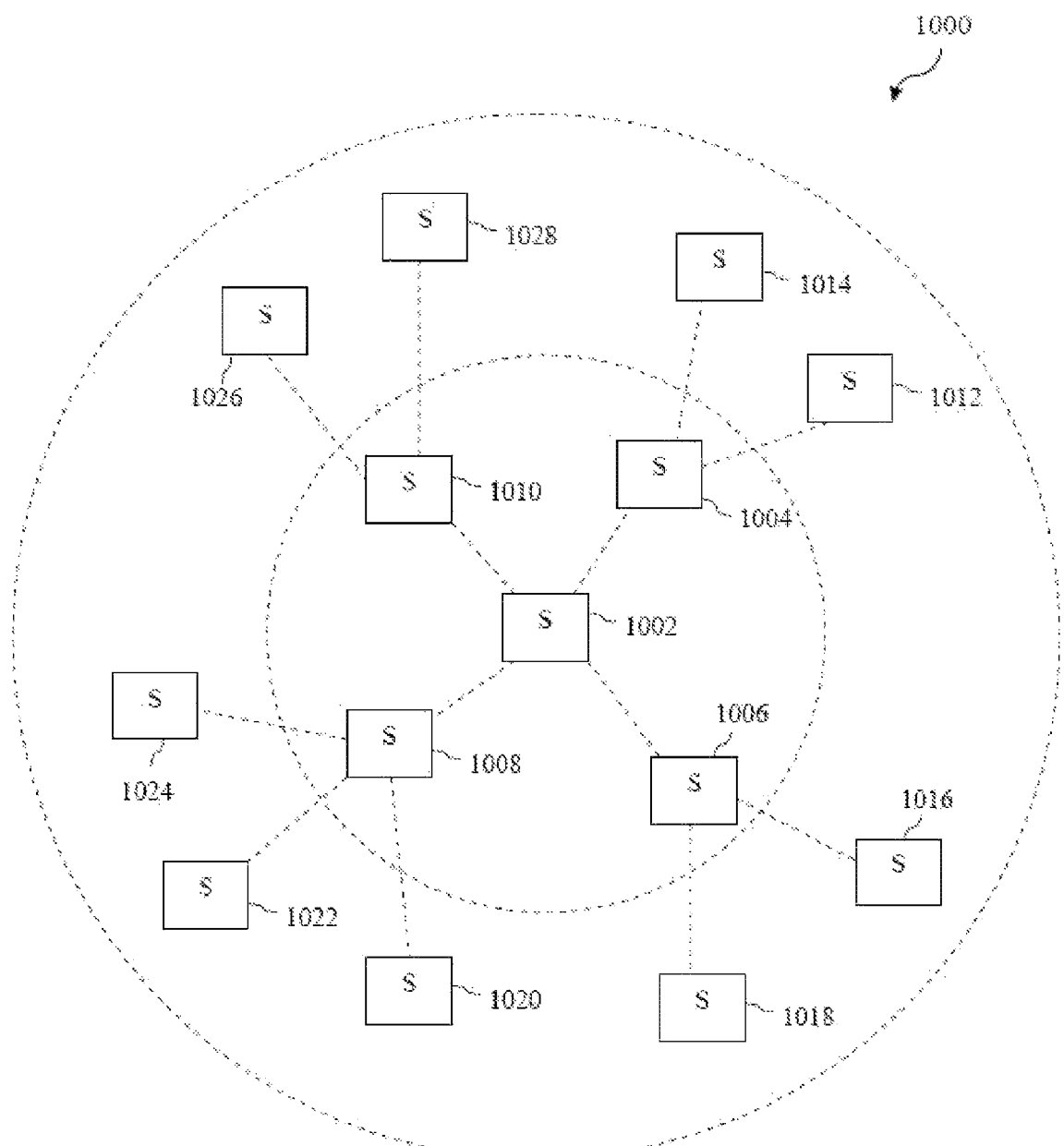
FIG. 10 is a conceptual illustration of how an ad hoc network may be constructed in accordance with an embodiment of the present disclosure.

FIG. 10 is a conceptual illustration 1000 of how such an ad hoc network may be constructed. With reference to that figure, assume that bandwidth tracking manager 212 has determined that a sensor 1002 is proximate, e.g., temporally and/or spatially, to sensors 1004, 1006 and 1008 at a given point in time or during a given period of time. This relationship is represented by the dashed lines connecting those sensors as shown in FIG. 10. Assume also that bandwidth tracking manager has further determined that sensors 1004, 1006 and 1008 are each also proximate to a plurality of other sensors (to which sensor 1002 is not connected) at that same point in time or during the same period of time. Then these relationships may also be represented by dashed lines connecting those sensors to further sets of sensors as shown in FIG. 10.

By analyzing the relationships in FIG. 10, it can be seen that sensor 1002 may also be spatially and/or temporally proximate to an additional number of sensors other than sensors 1004, 1006 and 1008 (i.e., any of sensors 1012, 1014, 1016, 1018, 1020, 1022, 1024, 1026 and 1028). In an embodiment of the present disclosure, bandwidth tracking manager 212 can leverage information concerning the transmission ranges of the beacons detected by each of these sensors (as well as other information such as beacon signal strength if available), to estimate the distance between sensor 1002 and the sensors to which it is connected only by virtue of its connections to sensors 1004, 1006 and 1008. The foregoing analysis may be repeated to identify sensors that are even further removed from sensor 1002 and to estimate the distance between sensor 1002 and such sensors. By applying this analysis to sensor 1002 and other sensors, an ad hoc network may be logically constructed. Analysis performed by bandwidth tracking manager 212 further includes analysis of the bandwidth available from the ad hoc network.

Once an ad hoc network has been identified (or updated if one version of the ad hoc network is being modified to generate a more current one), the bandwidth tracking manager 212 can advantageously use the ad hoc network to propagate location information among spatially and temporally proximate sensors. This feature will now be described in reference to flowchart 1100 of FIG. 11.

Figure 11:
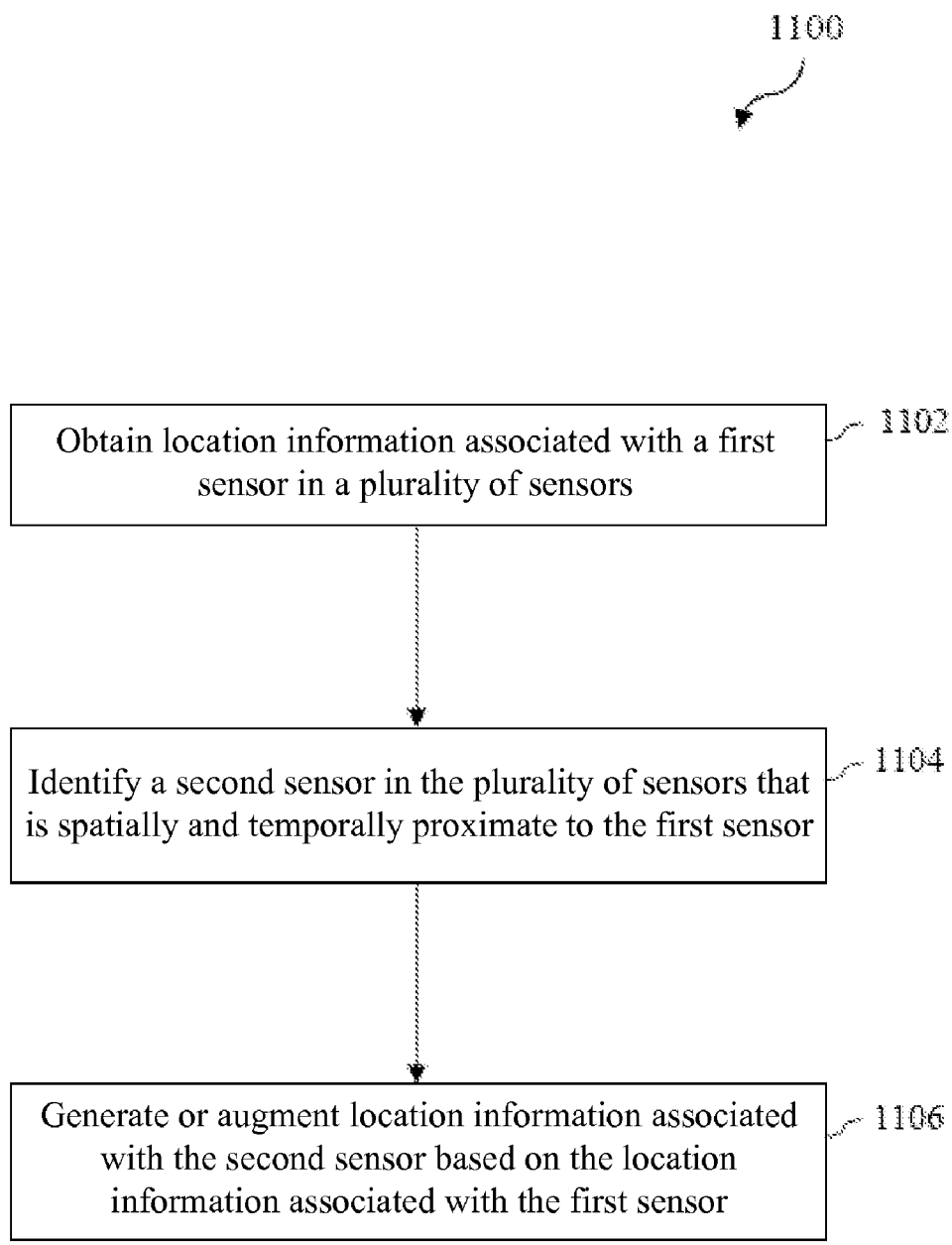
FIG. 11 illustrates a flowchart of a method for using an ad hoc network to propagate bandwidth information among spatially and temporally proximate sensors in accordance with an embodiment of the present disclosure.

As shown in FIG. 11, the method of flowchart 1100 begins at step 1102 in which bandwidth tracking manager 212 obtains location information associated with a first sensor in a plurality of sensors represented in the ad hoc network. The location information associated with the first sensor may include an estimate or indication of the location of the first sensor determined using sensor data transmitted by the first sensor to BCO engine 102, and/or using stored information, such as that stored in user data 208. An estimate or indication of the actual location of the first sensor may be generated by a positioning module or service present on the first sensor, such as but not limited to a GPS positioning module or service, a WiFi-based positioning module or service, a cellular telephone based positioning module or service, or a Bluetooth™-based positioning module or service. This estimate or indication of the actual location of the first sensor may also be provided by a user of the first sensor via a user interface of the first sensor. For example, the estimate or indication of the actual location of the first sensor may be a zip code or street address provided by the user of the first sensor.

Alternatively, bandwidth tracking manager 212 may obtain the location information associated with the first sensor by generating or augmenting location information associated with the first sensor based on location information associated with one or more other sensors in the plurality of sensors that have been determined to be spatially and temporally proximate to the first sensor. In other words, the location information associated with the first sensor may be propagated to the first sensor from one or more other spatially and temporally proximate sensors.

As yet another example, bandwidth tracking manager 212 may obtain the location information associated with the first sensor by accessing location information associated with a network gateway used by the first sensor. For example, as will be appreciated by persons skilled in the relevant art(s), IP addresses associated with geo-coded network gateways can be mapped to corresponding geographic areas.

Still further, bandwidth tracking manager 212 may obtain the location information associated with the first sensor by calculating the location of the first sensor by virtue of its proximity to a plurality of beacons. For example, triangulation may be used to calculate the location of the first sensor by virtue of its proximity to a plurality of beacons. The proximity of the first sensor to each of the beacons may be determined based on sensor data provided by the first sensor or by one or more sensors that have been determined to be spatially and temporally proximate to the first sensor.

At step 1104, bandwidth tracking manager 212 identifies a second sensor in the plurality of sensors that is spatially and temporally proximate to the first sensor. One manner by which bandwidth tracking manager 212 may identify spatially and temporally proximate sensors was described above in reference to flowchart 900 of FIG. 9.

At step 1106, bandwidth tracking manager 212 generates or augments location information associated with the second sensor based on the location information associated with the first sensor. Bandwidth tracking manager 212 may perform this step, for example, by using an estimate or indication of the actual location of the first sensor as an estimate or indication of the actual location of the second sensor. For example, if a zip code has previously been associated with the first sensor, then bandwidth tracking manager 212 may also associate the zip code with the second sensor based on the spatial and temporal proximity of the two sensors. The same approach may be used, for example, to assign geographic coordinates, a street address, or any other representation of a location associated with the first device to the second device.

Bandwidth tracking manager 212 may also perform step 1106 by modifying an estimate or indication of the actual location of the first sensor by an offset, wherein the offset is intended to represent a location difference between the two sensors. As discussed above, the relative distance between sensors may be determined by leveraging sensor data, such as beacon IDs, beacon types, and signal strengths, provided by the plurality of sensors in the ad hoc network.

Bandwidth tracking manager 212 may also perform step 1106 by augmenting location information previously-associated with the second sensor based on the location information associated with the first sensor. For example, the location information previously-associated with the second sensor may be limited or may lack the same granularity as the location information associated with the first sensor. In this case, location manager 212 may use the location information associated with the first sensor to render the location information associated with the second sensor more complete or granular. Thus, an embodiment of the present disclosure can combine location information from a plurality of spatially and temporally proximate sensors to generate refined location information.

The foregoing examples of the manner in which bandwidth tracking manager 212 may perform step 1106 were provided by way of example only and are not intended to limit the present disclosure. Persons skilled in the relevant art(s) will readily appreciate that other methods may be used to generate or augment location information associated with the second sensor based on the location information associated with the first sensor.

By way of a non-limiting example, the location of a requestor's sensor relative to one or more other sensors with available bandwidth can be used to make a selection between bandwidth resource alternatives, and/or to prioritize the bandwidth resource alternatives. A sensor that has available bandwidth for use in exchanging multimedia content, or other data, can be selected, or given higher priority, over another sensor with available bandwidth based on each sensor's relative spatial proximity to the requestor's sensor. By way of a further non-limiting example, a sensor with available bandwidth could be selected to exchange data using available bandwidth, e.g., digital data exchange using a bandwidth available via a cellular data plan, because the selected sensor is able to exchange data with the intended recipient of the data, e.g., the bandwidth requestor, using another method, e.g., Bluetooth, WIFI, removable storage media, etc., which is available based on the requester sensor's spatial proximity to the selected sensor.

Figure 12:
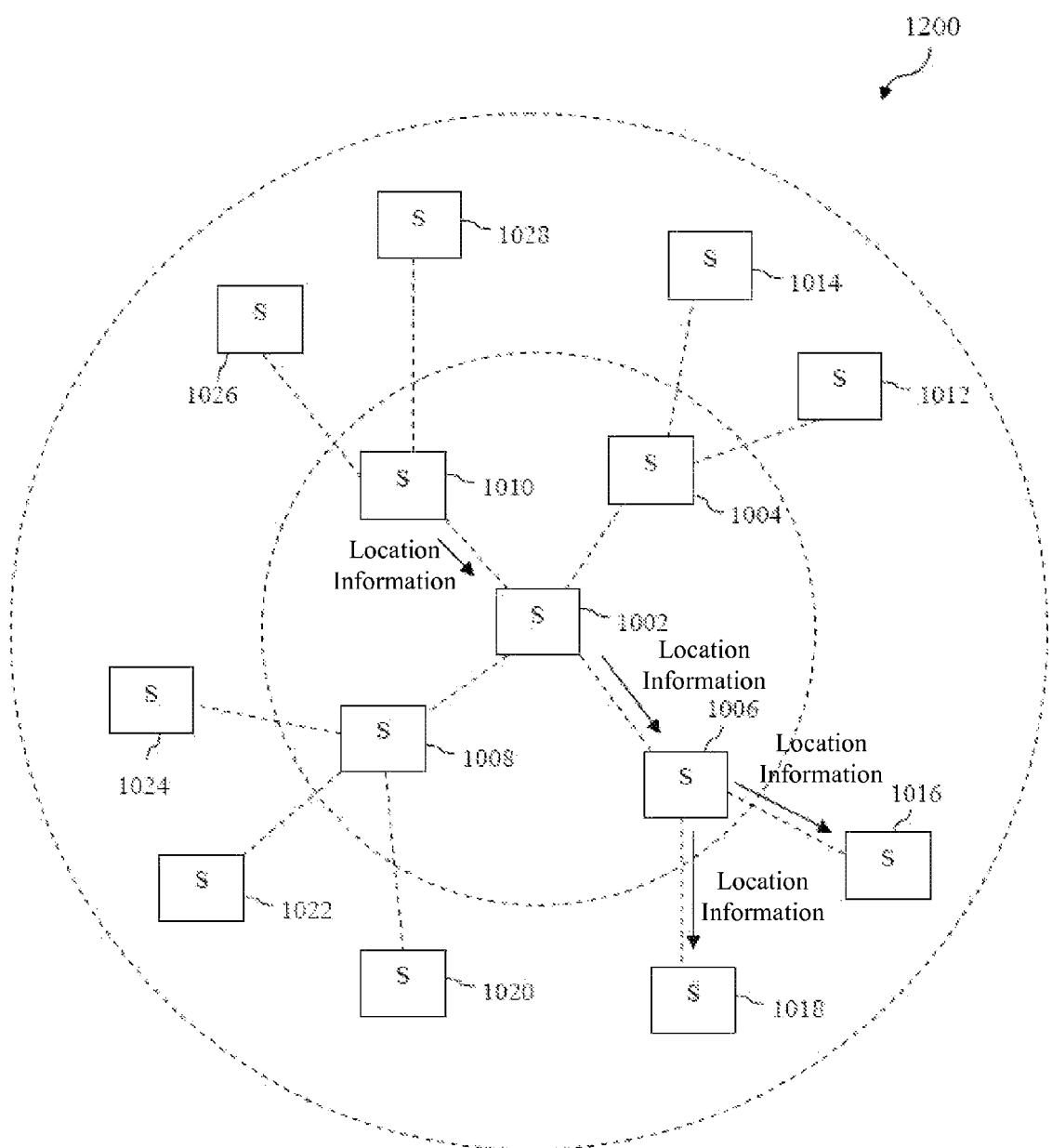
FIG. 12 is a conceptual illustration of how bandwidth information may be propagated among spatially and temporally proximate sensors in an ad hoc network in accordance with an embodiment of the present disclosure.

FIG. 12 is a conceptual illustration 1200 of how location information may be propagated among spatially and temporally proximate sensors in an ad hoc network. FIG. 12 represents the same portion of an ad hoc network that was illustrated in FIG. 10. However, FIG. 12 also shows that location information associated with sensor 1002 may be propagated to sensor 1006 by virtue of their known spatial and temporal proximity. The propagation of this location information may encompass the generation of new location information associated with sensor 1006 or the augmentation of existing location information associated with sensor 1006. The new or augmented location information associated with sensor 1006 may then be further propagated to sensors 1016 and 1018 by virtue of their known spatial and temporal proximity. Furthermore, the location information associated with sensor 1002 may itself have been propagated from spatially and temporally proximate sensor 1010.

Where actual location information is available for a number of spatially and temporally proximate sensors in the ad hoc network, an embodiment of the present disclosure can advantageously select the best available location information for propagation among surrounding sensors. The determination of what constitutes the best available location information may be based, for example, on the granularity of the location information or some other indicia of the accuracy of the location information. Such other indicia may include the type of sensor that reported the location information, the conditions under which the location information was reported, the accuracy of previously-reported location information from the same sensor, or the similarity or difference between location information being reported by a particular sensor as compared to other spatially and temporally proximate sensors.

Furthermore, where actual location information is available for a number of spatially and temporally proximate sensors in the ad hoc network, an embodiment of the present disclosure can advantageously use the multiple instances of actual location information to detect bad sensor readings. For example, where a majority of a group of spatially and temporally proximate sensors are reporting actual location information corresponding to a first location or area and a minority of the same group is reporting actual location information corresponding to a second location or area that is geographically remote from the first area, an embodiment of the present disclosure can determine that the actual location information being reported by the minority is incorrect. Such an embodiment can also attempt to correct or override the bad location information with an estimated location based on the good location information being provided by surrounding sensors.

The foregoing approach to location tracking is advantageous for a number of reasons. For example, the foregoing approach enables sophisticated BCO services to be delivered to users across multiple networks, carriers, signal types and protocols. As described above, it can be used to unify multiple sources and formats of bandwidth and location information into a real-time graph, or mesh, of sensors. It can also be used to deliver BCO services of multiple divergent granularities through a single ad hoc network.

Furthermore, because the foregoing approach utilizes propagation of location information among spatially and temporally proximate sensors, it optimizes the value of available location information and enables all sensors in the ad hoc network to be positioned with great accuracy, regardless of sensor type, and further enables the BCO engine 102 to take proximity information into account for purposes of allocating available bandwidth resources. This approach also permits data that has heretofore been spread among different information silos to be recreated in a single database through location metadata analysis and optimization, thereby minimizing information bottlenecks and gate-keepers.

Additionally, in accordance with an embodiment of the disclosure, user devices may be utilized as sensors and beacons to produce a recurring optimized location-tracking model instead of as simple dumb terminals that are only relevant when engaged with a user.

Although the foregoing section describes a method for tracking the relative and actual location of sensors within the context of an ad hoc network, it is noted that the foregoing approach can advantageously be used to track the relative and actual locations of devices and objects that are configured to or capable of acting as beacons only. So long as such beacons are detected by at least one sensor that is currently reporting sensor data to BCO engine 102, those beacons can also be located within the ad hoc network by bandwidth tracking manager 212. Consequently, bandwidth tracking manager 212 can determine the relative and actual location of beacons in a like manner to that described above for sensors, and such beacons can then also receive location-based services or other services based on this functionality.

Furthermore, although the foregoing section describes a method of location tracking that is premised, in part, on the sensing of signals transmitted or broadcast by beacons, the disclosure is not limited to that approach. For example, additional methods may be used to determine that users are proximally located to each other. In one embodiment, a camera acts a sensor by capturing an image of a user's face, and BCO engine 102 uses facial recognition technology to match the user's face to an online user identity, thereby placing the photographed user in proximity to the bearer of the camera. In another embodiment, a user manually enters personal identification information about a proximally-located user (e.g., a user name, e-mail address, telephone number, or the like) into a user device. Upon receipt of such information, BCO engine 102 is then able to place the user identified by the personal identification information in proximity to the bearer of the user device.

C. Bandwidth Cost Graph

Once bandwidth tracking manager 212 has created/updated the ad hoc network of all or some portion of the sensors of network 104 as discussed above, bandwidth tracking manager 212 creates/updates bandwidth graph 214, which represents all the sensors currently being tracked by BCO engine 102 and their current relative or actual bandwidths and locations. Bandwidth matching manager 216 then uses bandwidth graph 214 to allocate available bandwidth as needed, e.g., to match bandwidth requests and bandwidth offers.

As is discussed herein, in accordance with one or more embodiments, the location information can be used by BCO engine 102 to construct and/or update a bandwidth cost graph 214, which can be used to identify one or more resources to provide bandwidth to satisfy a bandwidth request. In accordance with one or more embodiments, the sensors in the ad hoc network, together with the proximity relationships can be used to form a graph of the network. In a case that the graph is formed from relationships established based on the proximity of the sensors in the ad hoc network, the graph would look much like conceptual illustration 1000, which shows each sensor in the ad hoc network as a node, which is connected to one or more nodes based on proximity. A bandwidth and cost profile comprising bandwidth and cost information can be established for each node to yield a bandwidth cost graph 214 corresponding to an ad hoc network. As discussed above, other information can be associated with each sensor in the graph.

It should be apparent that other techniques can be used to construct bandwidth cost graph 214 from sensors identified for an ad hoc network. By way of a non-limiting example, sensors can be interconnected to form segments, represented as nodes, of a path that can be used to exchange data, which path can comprise sensors that are communicatively connected. In accordance with one or more embodiments, the path can comprise one or more sensors that are not in proximity to other sensors in the path. In accordance with one or more embodiments, a segment in a data exchange path can be defined by two or more sensors that are communicatively coupled, or a sensor and another device having available bandwidth, e.g., a computing device communicatively coupled to a network, such as the Internet, local area network, wide area network, etc. A bandwidth cost graph can comprise a number of branches, each of which corresponds to an alternative data exchange segment/path that is available using one or more sensors. Each node of such a bandwidth cost graph 214 can have associated bandwidth and cost information, and optionally one or more other information items. The cost associated with a particular path can be determined by summing the costs associated with the nodes that form the path.

Regardless of the technique used to build/update a bandwidth cost graph, more than one bandwidth cost graph can be built, so that bandwidth cost graph 214 can comprise more than one graph.

D. Bandwidth Management for Ad Hoc Networks in Accordance with an Embodiment of the Present Disclosure As noted above, in an embodiment of the present disclosure, the sensors providing sensor data to BCO engine 102 may comprise sensors that have limited bandwidth. For example, these mobile sensors may be limited in the amount of time for accessing the network and/or the amount of data that can be exchanged via the network. By way of a non-limiting example, a sensor can use some amount of bandwidth each time the sensor communicates with BCO engine 102, such as each time the sensor provides sensor data.

Generally speaking, BCO engine 102 benefits from the frequent collection and reporting of sensor data by the sensors because this allows BCO engine 102 to construct or maintain a more up-to-date ad hoc network, which in turn facilitates better bandwidth and/or location tracking, and bandwidth resource allocation. However, the collection and reporting of sensor data can consume some portion of a sensor's available bandwidth, which may be limited. If a sensor consumes some portion of a limited bandwidth, it will be incapable of providing sensor data, and offering the bandwidth consumed as available bandwidth, which can be allocated by BCO engine 102, which may limit the ability of BCO engine 102 to perform its bandwidth tracking function and/or bandwidth resource allocation function. When the sensor consumes available bandwidth, it will be incapable of performing data exchanges that could otherwise be performed using the bandwidth, which is undesirable from the user perspective.

Thus, it would be beneficial if the need for frequent collection and reporting of sensor data by BCO engine 102 could somehow be balanced with the bandwidth requirements and constraints of each sensor in the ad hoc network.

Figure 13:
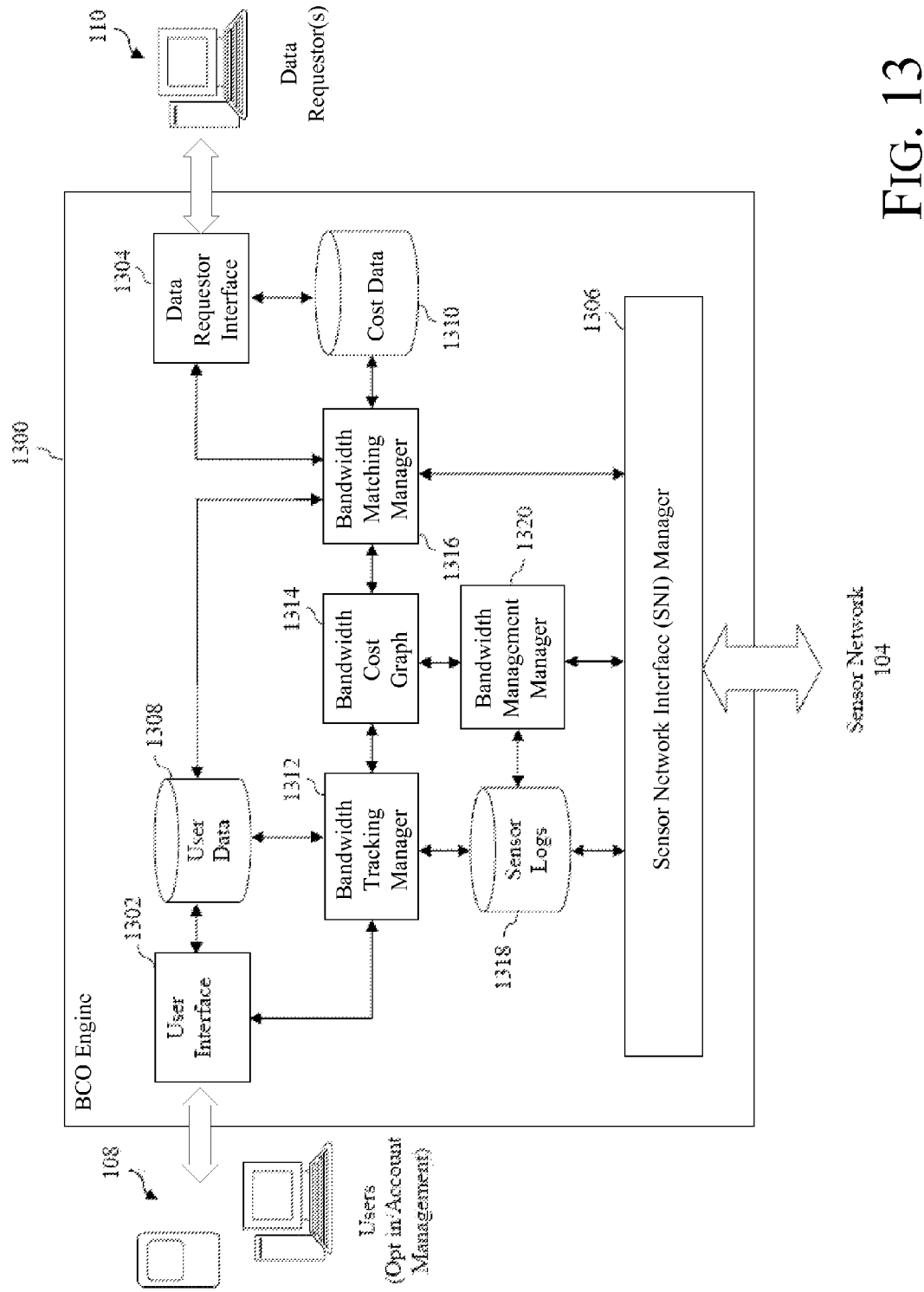
FIG. 13 is a block diagram of a ECO engine in accordance with an embodiment of the present disclosure that includes a bandwidth management manager.

FIG. 13 is a block diagram of a BCO engine 1300 that addresses the foregoing issue. In particular, and as will be described in more detail herein, BCO engine 1300 leverages information concerning the data collection requirements and bandwidth constraints of sensors in an ad hoc network to make decisions concerning bandwidth resource allocation to data collection on a sensor, group, or network level. By continuously monitoring the position and available bandwidth of sensors in the ad hoc network, BCO engine 1300 balances the need for updated sensor data with both sensor and user bandwidth requirements by dynamically and adaptively changing the manner in which each sensor collects and reports sensor data.

As shown in FIG. 13, BCO engine 1300 includes a number of communicatively-connected elements including a user interface 1302, a data requester interface 1304, an SNI manager 1306, a user data database 1308, a cost data database 1310, a tracking manager 1312, a bandwidth cost graph 1314, a bandwidth matching manager 1316, and a sensor logs database 1318. With the exception of certain functions to be described immediately below, each of these elements performs essentially the same functions as described above in reference to like-named elements of BCO engine 102.

As is also shown in FIG. 13, BCO engine 1300 further includes a cost manager 1320. Bandwidth management manager 1320 is configured to obtain bandwidth status information associated with each of a plurality of sensors currently reporting sensor data to BCO engine 1300. The bandwidth status information is reported by each of the plurality of sensors via sensor network 102. In an embodiment, the bandwidth status information is transmitted by each sensor as part of or along with sensor data transmitted to BCO engine 1300 and is stored by SNI manager 1306 in sensor logs database 1318. The bandwidth status information for a sensor may include, but is not limited to, a measure of a current or projected amount of bandwidth available to the sensor from any of a number of bandwidth resources, a measure of the cost associated with each bandwidth resource, and/or a measure of a current or projected amount of bandwidth required by the sensor.

Bandwidth management manager 1320 is further configured to obtain information concerning the spatial and temporal proximity of the sensors currently reporting to BCO engine 1300 from a bandwidth cost graph 1314 maintained by bandwidth tracking manager 1312. Bandwidth tracking manager 1312 is configured to construct and maintain bandwidth cost graph 1314 in the same manner as described above in reference to bandwidth tracking manager 112 and bandwidth cost graph 114 of BCO engine 102, and thus no further description of that process need be provided.

Bandwidth management manager 1320 is still further configured to use both the proximity and bandwidth status information associated with each of the plurality of sensors currently reporting to BCO engine 1300, e.g., with reference to bandwidth cost graph 1314, to make bandwidth management decisions, which can include cost management decisions, concerning those sensors. The manner in which these bandwidth management decisions are made will be described in more detail below. Bandwidth management manager 1320 may implement the management decisions by dynamically and adaptively controlling the manner in which available bandwidth of one or more of the sensors is allocated for use in a data exchange for one or more other sensors in the group. In accordance with one or more embodiments, bandwidth management manager 1320 can use bandwidth cost graph 1314 to allocate available bandwidth to one or more sensors for use in exchanging data. In addition, management decisions may be implemented to control the manner in which data is collected for BCO engine 102 and/or data is disseminated to one or more other sensors. Bandwidth management manager 1320 is configured to control sensor functions by sending configuration commands to each of the one or more sensors over sensor network 102 via SNI manager 1306.

Figure 14:
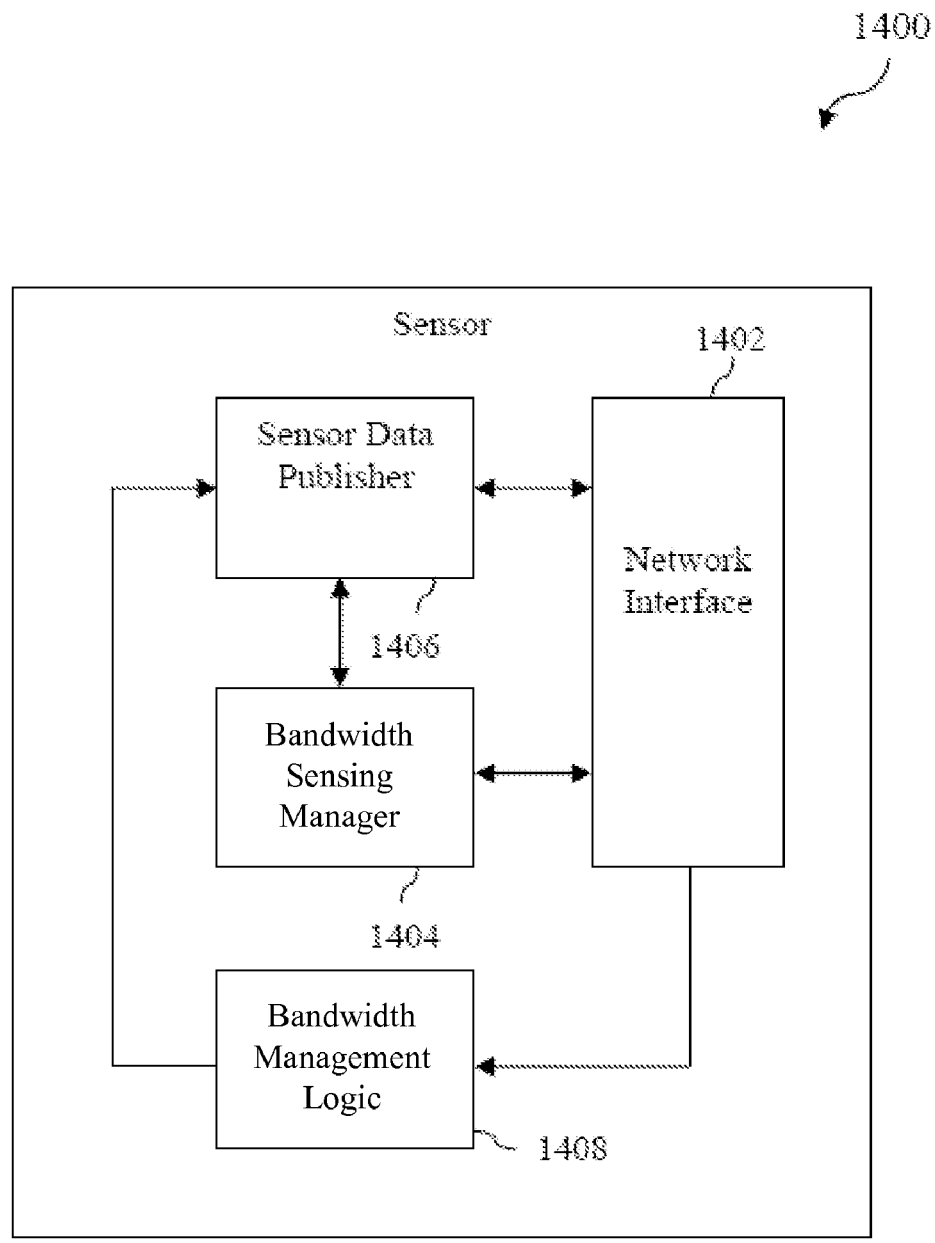
FIG. 14 is a block diagram of a sensor that includes bandwidth management logic, or code, in accordance with an embodiment of the present disclosure.

FIG. 14 is a block diagram of an example sensor 1400 that is configured to report bandwidth status information to BCO engine 1300 and to receive configuration commands related to bandwidth management from BCO engine 1300 in accordance with an embodiment of the present disclosure. As shown in FIG. 14, sensor 1400 includes a number of communicatively-connected components, including a network interface 1402, a bandwidth sensing manager 1404, and a sensor data publisher 1406. With the exception of certain functions to be described immediately below, each of these elements may perform essentially the same functions as described above in reference to like-named elements of sensor/beacon 502 or sensor/beacon 504 as depicted in FIG. 6.

As shown in FIG. 14, sensor 1400 also includes bandwidth management logic, or code, 1408. Bandwidth management logic 1408 is configured to provide bandwidth status information, e.g., bandwidth usage information, associated with sensor 1400 to sensor data publisher 1406 for transmission to BCO engine 1300. In an embodiment, sensor data publisher 1406 includes the bandwidth status information as part of or along with other sensor data that sensor data publisher 1406 periodically transmits to BCO engine 1300. In an alternate embodiment, sensor data publisher 1406 transmits the bandwidth status information separately from such sensor data. Depending upon the implementation, sensor data publisher 1406 may transmit the bandwidth status information at the same frequency or at a different frequency than the frequency with which it transmits the other sensor data. Sensor data publisher 1406 may also transmit the bandwidth status information with a time code that indicates at what time the bandwidth status information was generated.

In accordance with one or more embodiments, bandwidth management logic, or code, 1408 is configured to provide power status information associated with sensor 1400 to sensor data publisher 1406 for transmission to BCO engine 1406. In an embodiment, as discussed above with respect to bandwidth status information, sensor data publisher 1406 can include the power status information as part of or along with other sensor data that sensor data publisher 1406 periodically transmits to BCO engine 1400. Alternatively, sensor data publisher 1406 can transmit the power status information separately from such sensor data. Depending upon the implementation, sensor data publisher 1406 may transmit the power status information at the same frequency or at a different frequency than the frequency with which it transmits the other sensor data. Sensor data publisher 1406 may also transmit the power status information with a time code that indicates at what time the power status information was generated.

Bandwidth management logic 1408 is also configured to determine or modify the manner in which certain bandwidth-consuming, and optionally power-consuming, functions are performed by sensor 1400 responsive to configuration commands received from BCO engine 1300 over sensor network 104. The configuration commands are received by network interface 1402 and then passed to bandwidth management logic 1408 for processing.

As will be described in more detail herein, responsive to processing the configuration commands, bandwidth management logic 1408 may modify the manner in which sensor 1400 provides sensor data to BCO engine 1300. Responsive to processing the configuration commands, BCO management logic 1408 may also modify a manner in which sensor 1400 acts as a beacon if sensor 1400 includes beacon functionality, or cause sensor 1400 to stop reporting positioning information if sensor 1400 includes positioning logic.

In accordance with one or more embodiments, bandwidth management logic 1408 is configured to track bandwidth usage, which information can be provided to BCO engine 102 for purposes of tracking available bandwidth of the sensor 1400. By way of a non-limiting example, bandwidth management logic 1408 can track usage associated with limited bandwidth, such as voice and data limits imposed by cellular plan providers. The bandwidth usage information can be provided by sensor 1400 as part of, or separate from, other sensor data provided by sensor 1400.

The manner in which BCO engine 1300 manages bandwidth resource allocation among a plurality of sensors (such as sensor 1400) in an ad hoc network will now be described with reference to flowchart 1500 of FIG. 15. Although the steps of flowchart 1500 will be described with continued reference to components of BCO engine 1300 and sensor 1400, persons skilled in the relevant art(s) will readily appreciate that the method is not limited to those implementations and that other means may be used to carry out the method.

Figure 15:
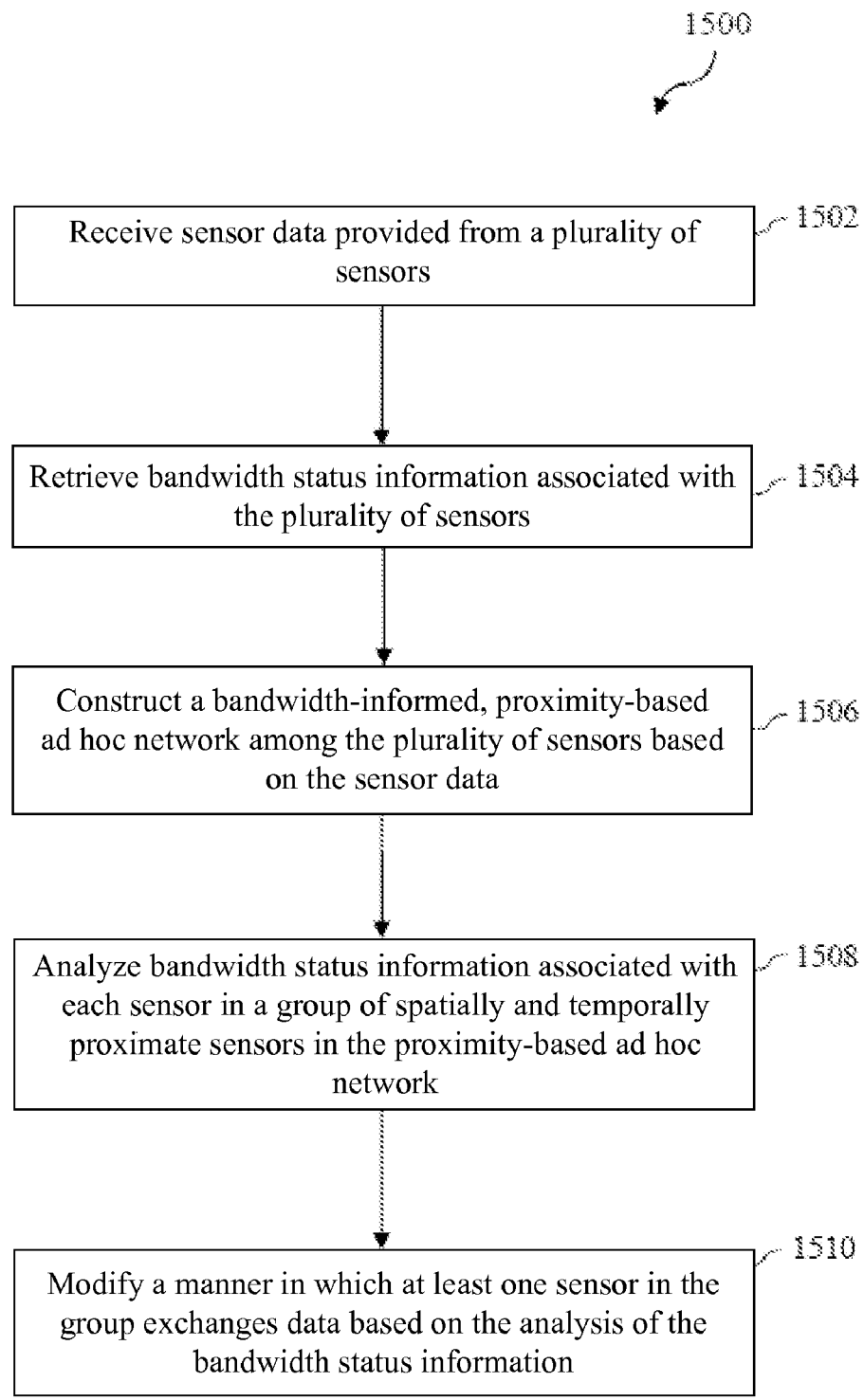
FIG. 15 is a flowchart of a method for managing bandwidth in an ad hoc network in accordance with an embodiment of the present disclosure.

As shown in FIG. 15, the method of flowchart 1500 begins at step 1502, in which SNI manager 1306 receives sensor data provided from a plurality of sensors. In addition to the sensor data discussed above, in accordance with one or more embodiments, sensor data may include bandwidth information, e.g., cost and usage information provided by bandwidth management logic 1408. In addition and in accordance with one or more embodiments, the sensor data can include power status information, which identifies the level of power available to the sensor. SNI manager 1306 stores this sensor data in sensor logs database 1318, where it is accessible by bandwidth tracking manager 1312.

In accordance with one or more embodiments, the bandwidth status information for a particular sensor may also be provided at the same frequency as the sensor data received from that sensor in step 1502 or at a different frequency. For example, in one example embodiment, the bandwidth status information for a particular sensor is provided more frequently than the sensor data associated with that sensor. This type of implementation may make sense where the bandwidth state of the sensor is anticipated to change more quickly than the location of the sensor. The bandwidth status information may also be received with a time code indicating when the sensor generated the bandwidth status information. The bandwidth status information received by SNI manager 1306 in step 1506 is stored in sensor logs database logs 1318.

At step 1504, bandwidth tracking manager 1312 retrieves stored bandwidth status information, e.g., from user data database 1308. By way of some non-limiting examples, bandwidth status information may include one or more of available bandwidth type, provider, limit, cost, usage, plan identification, etc. Thus, in accordance with one or more embodiments, bandwidth status information retrieved from one or more data stores may be included with the sensor data received in step 1502 or may be transmitted independently of that data.

At step 1506, bandwidth tracking manager 1312 constructs an ad hoc network among the plurality of sensors based on the received sensor data. One manner in which bandwidth tracking manager 1312 may construct the ad hoc network was described above in reference to bandwidth tracking manager 112 of BCO engine 102, and thus no further description of that process need be provided.

At step 1508, bandwidth management manager 1320 analyzes the bandwidth status information associated with each sensor in a group of spatially and temporally proximate sensors in the ad hoc network. This group comprises two or more sensors across which bandwidth management manager 1320 can implement a bandwidth and cost management scheme by virtue of their spatial and temporal proximity. As described herein, the bandwidth and cost management scheme may include assigning more bandwidth-consuming tasks relating to data exchange to certain sensors in a group as opposed to other sensors in the group based on the bandwidth state of each sensor in the group, and/or allocating bandwidth of one or more sensors to another sensor for using in exchanging data for the other sensor.

At step 1510, bandwidth management manager 1320 modifies the manner in which at least one sensor in the group of spatially and temporally proximate sensors reports sensor data and/or bandwidth information based on the analysis of the bandwidth status information. Performance of this step by bandwidth management manager 1320 includes sending one or more configuration commands to a sensor via sensor network 104. Responsive to receiving a configuration command, bandwidth management logic within the sensor (such as bandwidth management logic 1408 of sensor 1400) modifies the manner in which the sensor reports sensor data and/or bandwidth information using bandwidth that is available to the sensor.

One type of bandwidth management scheme that can be implemented by bandwidth management manager 1320 in accordance with the foregoing method involves requiring certain sensors in a group of spatially and temporally proximate sensors to act as a source of sensor data and/or bandwidth information reporting more often as compared to other sensors in the same group based on an analysis performed at the sensor, group or system, e.g., sensors outside the current group, level. In this way, sensors with more bandwidth, or less associated cost, can be required to carry more of the reporting burden as compared to other sensors in the group that have less bandwidth, or greater associated cost. This scheme can be premised on the insight that in a sufficiently dense group of temporally and spatially proximate sensors, sensor data need not be collected from each sensor at the same frequency in order to identify an ad hoc network. In addition, it is likely that a sensor that has limited available bandwidth, and/or the bandwidth that is available is costly, need not be included in a bandwidth cost graph constructed or updated from the ad hoc network. Thus, this bandwidth management scheme may also take into account the density of the group as well as the bandwidth and cost associated with the sensors in the group.

Changing the sensor data and/or bandwidth information polling frequency may involve sending a configuration command to a sensor, wherein the configuration command changes a parameter that is used by the sensor to determine a rate at which bandwidth management logic 1408 generates bandwidth and cost information. In accordance with one or more embodiments, bandwidth management manager 1320 can transmit a configuration command to alter the rate at which sensor 1400 reports sensor data and/or bandwidth information, and/or the rate at which bandwidth management logic 1408 generate cost data. The latter rate change can be performed to conserve available power of the sensor 1400, for example. In addition and if the rate at which bandwidth information is being generated is reduced, the rate at which the bandwidth information is reported can also be decreased to coincide. In addition, the change in polling frequency can involve sending a configuration command to a sensor, which results in a change in a parameter that is used by the sensor to determine the rate at which to scan for proximally-located beacons. Changing the sensor data and/or bandwidth information polling frequency may include temporarily turning off the polling frequency for a sensor. Likewise, changing the rate at which a sensor reports sensor data may include temporarily turning off the sensor data reporting functionality for a sensor.

Where the group of spatially and temporally proximate sensors is dense enough, bandwidth management manager 1320 may also change the manner in which at least one sensor in the group acts as a beacon. For example, bandwidth management manager 1320 may turn off beacon functionality in one or more sensors where providing such functionality is not necessary in order to obtain a reasonably up-to-date picture of the ad hoc network.

In accordance with one or more embodiments, available bandwidth may be needed for the sensors to report sensor data. In such a case, the BCO management manager 1320 may make determinations on whether and to what extent sensors in the group report sensor data. Such a determination can be made based on one or more criteria, e.g., sufficiency of the information already provided, the actual or estimated amount of available bandwidth, the ability to use a bandwidth resource that is less costly relative to other available bandwidths, etc. The BCO management manager 1320 can take into account whether bandwidth and/or location information currently being generated by a sensor in the group is useful or accurate. For example, where a first sensor is unable to contribute bandwidth and/or other devices in the group are providing useful bandwidth and/or location information, BCO management manager 1320 may cause the sensor to stop reporting such information, thereby saving bandwidth and costs associated with the first sensor, and/or saving power that would otherwise be consumed by the first sensor.

By way of another non-limiting example, the BCO management manager 1320 may also take into account the type of status information collected and/or frequency with which the data is collected on an ongoing basis. For example, if a sensor is stationary and/or the beacons in the proximity of the sensor are stationary, the frequency with which location information is reported by the sensor can be decreased. By way of another non-limiting example, in a case that there is little or no change in bandwidth usage being reported by a sensor, e.g., during late night or early morning hours, the frequency with which the sensor reports such usage information can be reduced to an extremely low level. In contrast, if a sensor is moving, the beacons in the proximity of the sensor are moving, and/or usage measures are changing, then the polling frequency may need to be relatively high in order to capture useful sensor data. BCO management manager 1320 may take such criteria into account when reducing or increasing the polling frequencies associated with different sensors in the group.

Bandwidth management manager 1320 may also take into account the amount of power that must be supplied to antennas associated with sensors in the group in order for those sensors to return useful sensor data. Thus, for example, bandwidth management manager 1320 may determine that increasing the gain of an antenna associated with a first type of sensor will yield more useful data than increasing the gain of an antenna associated with a second type of sensor in the same group. In this situation, bandwidth management manager 1320 may increase the power supplied to the antenna of the first type of sensor while maintaining or reducing the power supplied to the antenna of the second type of sensor, thereby conserving power in the second type of sensor.

In accordance with another BCO management scheme, BCO management manager 1320 may cause a selected sensor in the group to collect sensor data and/or bandwidth status information from one or more other sensors in the group over a local network connection and to provide the collected data to BCO engine 1300 on behalf of the other sensor(s). BCO management manager 1320 may also cause the selected sensor to receive data related to BCO services from BCO engine 1300 on behalf of the other sensor(s) and to disseminate this data to the other sensor(s). This allows the selected sensor, which may have more available bandwidth, and/or less costly communication capabilities, to act as a communication hub for other sensors that have less available bandwidth.

In accordance with another management scheme, bandwidth management manager 1320 may cause a selected sensor in the group to collect sensor data from one or more other sensors in the group over a local network connection and to provide the collected sensor data to BCO engine 1300 on behalf of the other sensor(s). Bandwidth management manager 1320 may also cause the selected sensor to receive data related to location based services from BCO engine 1300 on behalf of the other sensor(s) and to disseminate this data to the other sensor(s). This allows the selected sensor, which may have more available bandwidth, to act as a communication hub for other sensors that have less available power. This scheme can further take into account available power of the sensors in the group. By way of a non-limiting example, bandwidth management manager 1320 can select a sensor in the group that has ample available bandwidth and power to collect sensor data and report the data to BCO engine 1300, and/or to receive and disseminate data received from BCO engine 1300.

Figure 16:
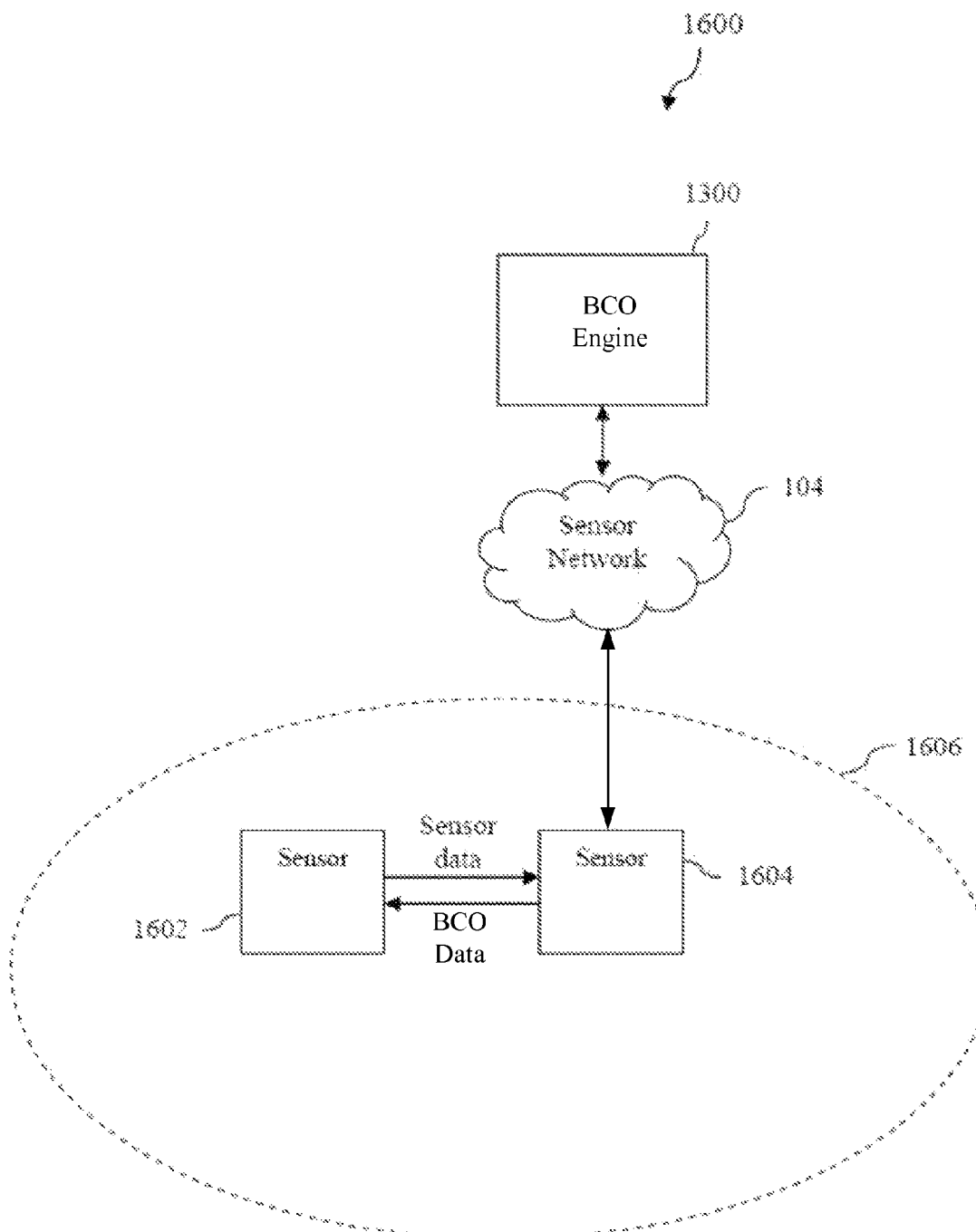
FIG. 16 is a block diagram of a bandwidth management scheme in which a first sensor uses a second sensor as a communication hub in an ad hoc network.

An example of a BCO management scheme in which a selected sensor is used to report sensor data and to disseminate received data is illustrated in block diagram 1600 of FIG. 16. It should be apparent that this BCO management scheme can be used to exchange any type of data using a selected sensor as a "hub" for one or more other sensors. In the example shown in FIG. 16, a first sensor 1602 and a second sensor 1604 in a group 1606 of spatially and temporally proximate sensors is shown. As illustrated, second sensor 1604 receives sensor data and/or bandwidth status information from first sensor 1602 over a local network connection and provides the received data on behalf of the first sensor 1602 to BCO engine 1600 over sensor network 104. As also shown in FIG. 16, second sensor 1604 receives BCO services data from BCO engine 1300 over sensor network 104 on behalf of first sensor 1602 and disseminates the BCO services data to first sensor 1602.

BCO management manager 1320 may automatically identify groups of spatially and temporally proximate sensors over which BCO management is to be performed. Such groups may be identified based on spatial and temporal proximity, bandwidth resources, or other factors. The size of such groups may vary depending upon the implementation or mode of operation. At one extreme, the group may encompass all of the sensors in the ad hoc network constricted by bandwidth tracking manager 1312. At the other extreme, the group may consist of only two sensors. Still further, BCO management manager 1320 may perform bandwidth management for individual sensors. For example, BCO management manager 1320 may apply any of the aforementioned methods for reducing bandwidth consumption in a sensor (such as a sensor that is reporting a low bandwidth availability condition)

without regard to the bandwidth state of any spatially and temporally proximate sensors.

An embodiment of the present disclosure also advantageously allows a user to override or control the manner in which BCO management manager 1320 performs the bandwidth management function. For example, in one embodiment, the user is allowed to reduce the frequency with which sensor data and/or bandwidth status information is collected and/or reported by a sensor, or to turn off the polling or reporting functionality entirely. In so doing, a user is permitted to conserve sensor bandwidth, and power that can then be dedicated to other functions if desired. Turning off these functions may also be desirable for reasons relating to protecting user privacy or conserving resources, such as available bandwidth and power, and/or costs associated with communicating with BCO engine 1300. Such user control mechanisms may be contained within the sensor itself or implemented through user communication with BCO engine 1300.

In an alternative embodiment, the user is allowed to fix the frequency with which sensor data and/or bandwidth status information is collected and/or reported by a sensor regardless of the bandwidth management functionality. This might be used, for example, by a parent to ensure that a sensor associated with a child continues to provide sensor data and/or bandwidth status information even when the sensor is in a low bandwidth state, thereby allowing the location of the child to be continuously tracked by BCO engine 1300.

In accordance with another embodiment, users may define groups of sensors over which bandwidth management manager 1320 should perform cost and bandwidth management functions. For example, a user may specify a group of sensors associated with the members of a family, the members of a business organization, or participants in an activity or event over which bandwidth management should be performed. This advantageously allows for bandwidth sharing and load and/or cost balancing among the sensors used by a particular group whose members need not be physically proximate with each other to share bandwidth.

In some embodiments, users may define persons, organizations, and/or entities with which to share bandwidth, e.g., excess bandwidth, or to regularly donate some portion of their bandwidth to an entity it considers deserving. For example, a user may donate ten percent of their bandwidth to a favorite non-profit organization. An aggregate bandwidth donation, e.g., comprising one or more donations from one or more users, could be sufficient to satisfy the bandwidth needs of a recipient, e.g., a non-profit organization. In so doing, the recipient's bandwidth needs can be completely provided for through donations. By way of some non-limiting examples, campaigns for bandwidth donation can originate from donating users, potential donation recipients, the BCO engine 1300 or one or more third-party bandwidth aggregation services.

In accordance with one or more embodiments, a potential recipient can register with the BCO engine 1300, e.g., as a data requester, and a user can register with the BCO engine 1300 as a potential donor. Alternatively, the BCO engine 1300 can be configured to identify a user as a potential donor, e.g., a user that has available bandwidth on a regular or irregular basis. The BCO engine 1300 can use other factors in identifying a potential donor such as, without limitation, the user's previous donation history, affiliations, etc. BCO engine 130, e.g., one or both of matching manager 1316 and bandwidth management manager 1320 of the BCO engine 1300, can be configured to match one or more potential donors with one or more potential donation recipients, so that available bandwidth of one or more user's can be shared with one or more recipients, e.g., persons, organizations, entities, etc. In accordance with one or more embodiments, bandwidth cost graph 1314 can include information to identify available bandwidth as an actual or potential bandwidth donation, which is for use by an actual or potential donation recipient.

In a further embodiment, a user may define a hierarchy associated with the sensors in the user-defined group, wherein the available bandwidth of the sensors at the bottom of the hierarchy is to be used prior to or at a greater rate than the available bandwidth of the sensors at the top of the hierarchy. This may involve, for example, increasing a priority associated with available bandwidth of one or more sensors at the bottom of the hierarchy or causing one or more sensors at the bottom of the hierarchy to act as a communication hub with BCO engine 1300. By way of a non-limiting example, available bandwidth associated with a sensor at the bottom of the hierarchy that has an associated limitation can be used to exchange data for another sensor higher up in the hierarchy.

In a further embodiment, a user may define a hierarchy associated with the possible networks for data exchange within a known or potential grouping of sensors. By way of a non-limiting example, a network can comprise a provider's data exchange network accessible by one or more sensors of the user. In accordance with such an embodiment, available bandwidth of the network at the top of the hierarchy is to be used prior to or at a greater rate than the available bandwidth of the networks at the bottom of the hierarchy. This may involve, for example, increasing a priority associated with available bandwidth of one or more networks at the top of the hierarchy or causing one or more networks at the top of the hierarchy to act as a communication hub with BCO engine 1300. By way of a non-limiting example, available bandwidth associated with a network at the top of the hierarchy that has an associated limitation can be used to exchange data in lieu of a network lower in the hierarchy.

As discussed above, bandwidth management manager 1320 analyzes bandwidth status information associated with each sensor in a group of spatially and temporally proximate sensors and then implements a cost and bandwidth management scheme based on the analysis. In one embodiment, bandwidth management manager 1320 uses the bandwidth status information to predict the future bandwidth usage of each of the sensors, the data exchange methods associated therewith, and the combination of all of these working in parallel in order to achieve a balance between optimized bandwidth allocation and minimal costs associated therewith.

In a further embodiment, bandwidth management manager 1320 takes into account an estimate of when a user's available bandwidth will be replenished, e.g., at the start of a new billing cycle such as every month, for a given sensor in determining a bandwidth management scheme for that sensor or for a group of sensors. This estimate may be based, for example, on information supplied by the user via user interface 1302, information obtained from a plan's provider, and/or information provided by the sensor. As yet another non-limiting example, the bandwidth management scheme can be based on historical information relating to bandwidth usage patterns of individual users, and/or a group of users, such as a cooperative or collective. Historical proximity information may also be used to predict future proximity information for one or more sensors. Over time the cyclical patterns among individual users as well as within individual cooperatives and/or collectives of users allow the BCO engine 1300 to more accurately forecast bandwidth needs and either automatically or interactively optimize data traffic including caching, synchronizing, disambiguating, etc.

To implement the foregoing approach to bandwidth management, an embodiment of the present disclosure may need to manage the CPU priority of the sensing software operating on a sensor. This may involve dynamically changing the standby mode settings for the sensor so that the sensor does not automatically enter into a state in which the collection and reporting of sensor data and/or bandwidth status information is disabled.

In one embodiment of the present disclosure, bandwidth management manager 1320 may change the priority or rate of collection of sensor data and/or bandwidth status information by a sensor based in part on a prediction of change. For example, the polling frequency of a sensor may be increased when new sensors or beacons are encountered and decreased if the surrounding sensors or beacons are more static, and/or when available bandwidth is being allocated, or bandwidth status information received from one or more sensors indicates an increased level of usage.

In a further embodiment of the present disclosure, a sensor may include an encounters management system that organizes collected sensor data and/or bandwidth status information based on encounters with other sensors or beacons. The encounters management system may manage or track certain information associated with each encounter such as a start time, end time, location, bandwidth status information, target device and source device. The encounters management system may include a store and forward mechanism to optimize outgoing sensor data and to manage the frequency with which such data is reported. Optimization of the reporting frequency may be performed on a per encounter basis. Prioritization may be performed based on device type, whether the encounter is a first encounter, updating an end time of the encounter (less urgent/frequent), contact type (e.g., friend or stranger), or the like.

E. Time Code Validation and Correction for Ad Hoc Networks

As discussed above, in one embodiment of the present disclosure, the sensor data provided from each sensor to the BCO engine includes at least a unique ID associated with the sensor, one or more unique IDs respectively associated with each of the beacons currently detected by the sensor, and one or more time codes indicating when each beacon was respectively sensed by the sensor. In accordance with one or more embodiments and as discussed above, the sensor data may also include bandwidth status information. The BCO engine uses the time codes included in this sensor data to determine which sensors are detecting which beacons at a given moment in time or during a given window of time. This ability of the BCO engine to correlate sensor data based on time codes is critical in building and maintaining an ad-hoc network that is useful for bandwidth tracking.

A problem arises however, when a sensor generates time codes using a notion of time that is different than the notion of time held by other sensors reporting sensor data to the BCO engine. When this occurs, the ability of the BCO engine to correctly correlate sensor data received from all the sensors based on time codes is impaired. This may occur, for example, when a sensor in a network uses a local clock to generate time codes while other sensors in the same network use a network clock to generate time codes, and the local clock and the network clock are not synchronized. This may also occur, for example, when a sensor in a first network uses a first network clock to generate time codes while a sensor in a second network users a second network clock to generate time codes, wherein the first network clock and the second network clock are not synchronized.

Figure 17:
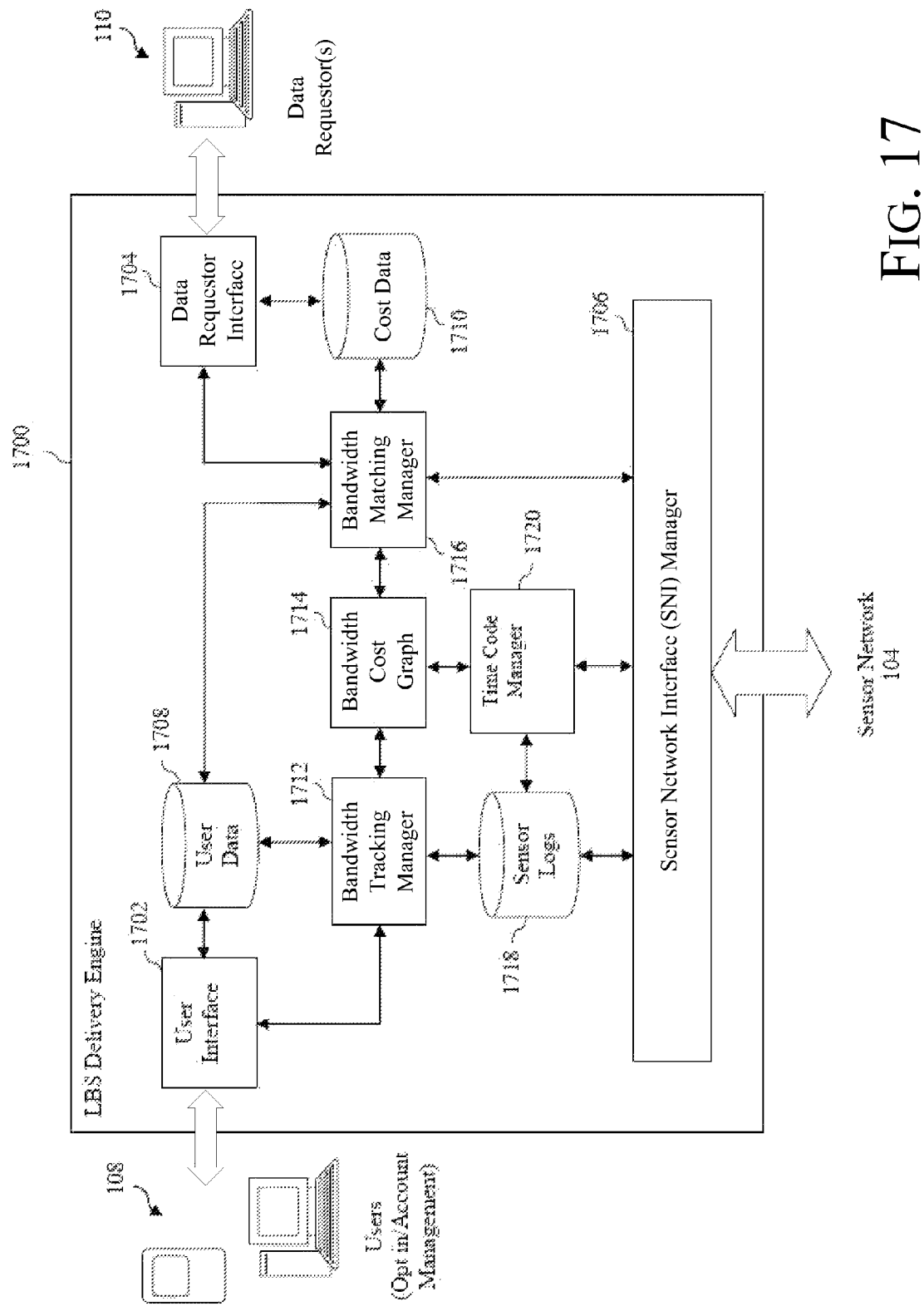
FIG. 17 is a block diagram of a BCO engine in accordance with an embodiment of the present disclosure that includes a time code manager.

FIG. 17 is a block diagram of a BCO engine 1700 that addresses the foregoing issue. In particular, and as will be described in more detail herein, BCO engine 1700 leverages information concerning the temporal and spatial proximity of sensors in an ad hoc network to validate and/or correct time codes generated by those sensors. In one embodiment, BCO engine 1700 applies collaborative filtering to time codes generated by co-located sensors in the ad hoc network to validate and/or correct the time codes generated by those sensors. In another embodiment, BCO engine 1700 uses geographic location information associated with or propagated among certain proximally-located sensors in the ad hoc network to obtain a local time that can then be used to correct and validate time codes generated by co-located sensors. In either embodiment, BCO engine 1700 may address the detection of an incorrect time code by implementing a time code offset for a particular sensor, by causing a state of a clock associated with the sensor to be automatically modified, or by notifying a user of the sensor that the a state of a clock associated with the sensor should be manually modified.

As shown in FIG. 17, BCO engine 1700 includes a number of communicatively-connected elements including a user interface 1702, a data requester interface 1704, an SNI manager 1706, a user data database 1708, a cost data database 1710, a bandwidth tracking manager 1712, a bandwidth cost graph 1714, a bandwidth matching manager 1716, and a sensor logs database 1718. With the exception of certain functions to be described immediately below, each of these elements performs essentially the same functions as described above in reference to like-named elements of BCO engine 102.

As also shown in FIG. 17, BCO engine 1700 further includes a time code manager 1720. Time code manager 1720 is configured to obtain time codes generated by each of a plurality of sensors currently reporting sensor data to BCO engine 1700. As discussed above, these time codes comprise part of sensor data that is periodically transmitted by each of the plurality of sensors to BCO engine 1700 via sensor network 104 and that is stored by SNI manager 1706 in sensor logs database 1718. Depending upon the implementation, time code manager 1720 may obtain time codes by extracting them from sensor logs database 1718 or from bandwidth cost graph 1714 in an embodiment in which time codes are maintained in association with sensors mapped to bandwidth cost graph 1714 by bandwidth tracking manager 1712.

Time code manager 1720 is further configured to obtain information concerning the spatial and temporal proximity of the sensors currently reporting sensor data to BCO engine 1700 from bandwidth cost graph 1714 maintained by bandwidth tracking manager 1712. Bandwidth tracking manager 1712 is configured to construct and maintain bandwidth cost graph 1714 in the same manner as described above in reference to bandwidth tracking manager 112 and bandwidth cost graph 214 of BCO engine 102.

Time code manager 1720 is still further configured to use both the proximity information and time codes associated with each of the plurality of sensors currently reporting sensor data to BCO engine 1700 to automatically validate and/or correct the time codes generated by those sensors. The manner in which these functions are performed by time code manager 1720 will now described with reference to flowcharts depicted in FIGS. 18 and 20.

Figure 18:
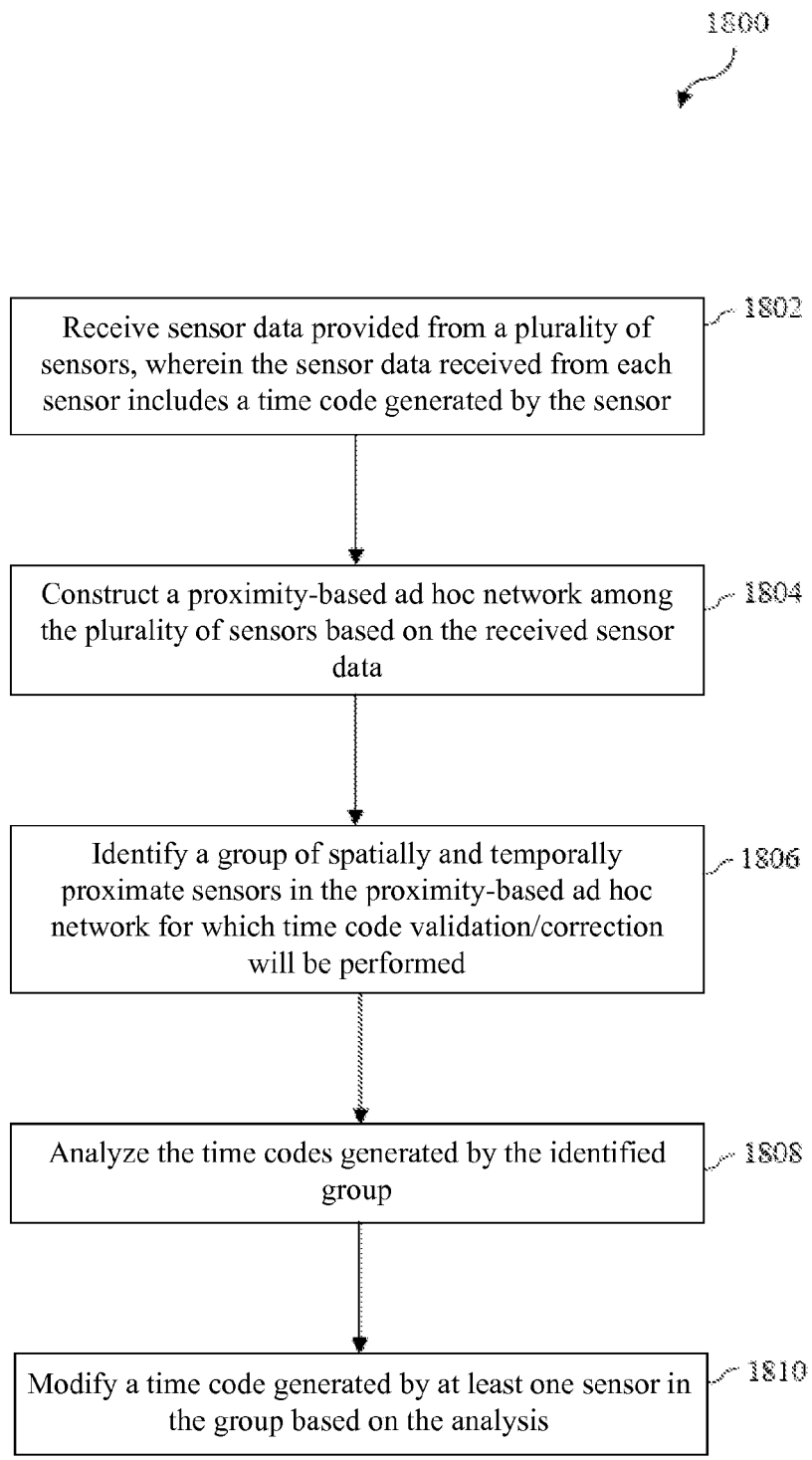
FIG. 18 depicts a flowchart of a first method for validating and correcting time codes generated by a plurality of sensors in accordance with an embodiment of the present disclosure.

In particular, FIG. 18 depicts a flowchart 1800 of a first method by which BCO engine 1700 validates and corrects time codes generated by a plurality of sensors in accordance with an embodiment of the present disclosure. Although the steps of flowchart 1800 will be described with continued reference to components of BCO engine 1700, persons skilled in the relevant art(s) will readily appreciate that the method is not limited to those implementations and that other means may be used to carry out the method.

As shown in FIG. 18, the method of flowchart 1800 begins at step 1802, in which SNI manager 1706 receives sensor data provided from a plurality of sensors, wherein the sensor data received from each sensor includes a time code generated by the sensor. SNI manager 1706 stores this sensor data in sensor logs database 1718, where it is accessible by bandwidth tracking manager 1712. At step 1704, bandwidth tracking manager 1712 constructs an ad hoc network among the plurality of sensors based on the received sensor data. One manner in which bandwidth tracking manager 1712 may construct an ad hoc network based on the received sensor data was described above in reference to bandwidth tracking manager 112 of BCO engine 102, and thus no further description of that process need be provided.

At step 1806, time code manager 1720 identifies a group of two or more spatially and temporally proximate sensors in the ad hoc network for which time code validation and/or correction will be performed. The manner in which time code manager 1720 identifies the group of sensors may vary depending upon the implementation and mode of operation of time code manager 1720. For example, time code manager 1720 may identify a group based on a physical or logical partitioning of the sensors in the ad hoc network, wherein such partitioning may be based on, for example, a predefined group size or group density or on the relative or actual location of sensors within the ad hoc network. Time code manager 1720 may also identify a group based on a perceived discrepancy between time codes generated by sensors in the group or by a measure of the degree of such discrepancy.

Figure 19:
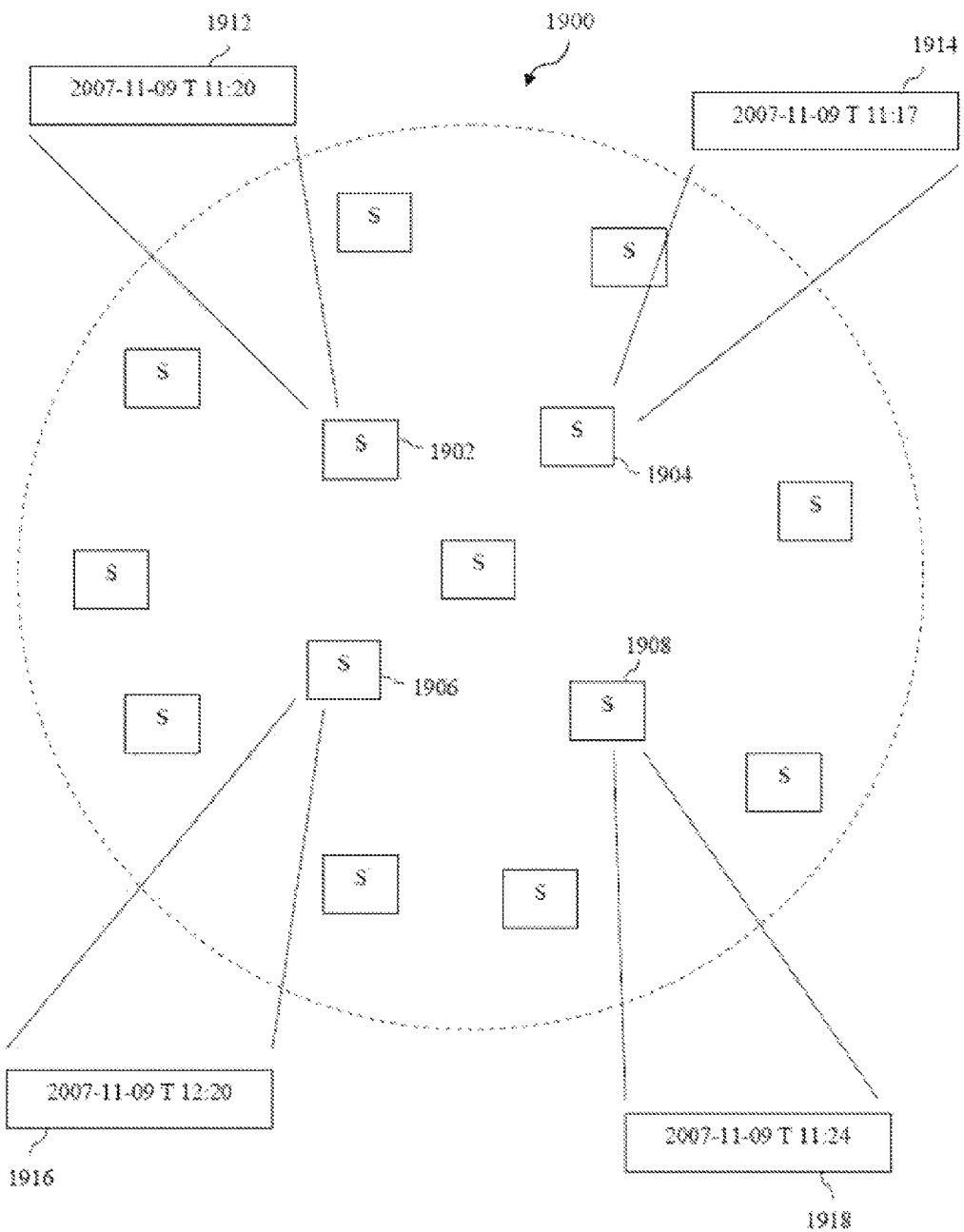
FIG. 19 is a block diagram of a group of sensors, e.g., spatially and temporally proximate sensors, in an ad hoc network for which time code validation and/or correction may be performed in accordance with an embodiment of the present disclosure.

FIG. 19 is a block diagram that illustrates an exemplary group 1900 of spatially and temporally proximate sensors that may be identified by time code manager 1720 in accordance with step 1806 of flowchart 1800. As shown in FIG. 19, group 1900 includes four sensors (sensors 1902, 1904, 1906 and 1908 respectively) each of which has been determined to be spatially proximate to the other at a particular time or during a particular time period by bandwidth tracking manager 1712 and each of which generated sensor data that included a different time code at that time or during that time period. In particular, as shown in FIG. 19, sensor 1902 generated a first time code 1912, sensor 1904 generated a second time code 1914, sensor 1906 generated a third time code 1916 and sensor 1908 generated a fourth time code 1918. For the purposes of this example, it is to be assumed that the time codes generated by each of sensors 1902, 1904, 1906 and 1908 should have been identical or within the same range of values because each of these sensors obtained polling data associated with these time codes at approximately the same time or during the same time period. It is to be further assumed that the time codes are not identical or not within the same range of values because the clocks used by each of the sensors to generate the time codes are not synchronized.

Despite the discrepancies between these time codes, bandwidth tracking manager 1712 is capable of determining that sensors 1902, 1904, 1906 and 1908 are co-located by virtue of the sensor data reported by those sensors and the sensors surrounding them. For example, bandwidth tracking manager 1712 may determine that sensors 1902, 1904, 1906 and 1908 are co-located at a particular time or during a particular time period because other spatially-proximate sensors in group 1900 reported detecting those sensors at the same time or during the same time period. As another example, bandwidth tracking manager 1712 may determine that sensors 1902, 1904, 1906 and 1908 are co-located at a particular time or during a particular time period because each of these sensors reported detecting the same stationary beacon within a particular time interval. However, these examples are not intended to be limiting and other methods of identifying co-located sensors reporting different time codes may also be used.

Although bandwidth tracking manager 1712 is capable of determining that sensors 1902, 1904, 1906 and 1908 are co-located even when such sensors are reporting different time codes, it would be advantageous to validate and, when appropriate, correct the time codes generated by these sensors. By performing this function, time code manager 1720 can improve the integrity of sensor data subsequently received from these sensors, which in turn improves the ability of bandwidth tracking manager 1712 to correlate sensor data based on time codes and to identify with greater ease and precision the time periods during which sensors are co-located. Furthermore, by performing this function, time code manager 1720 enables clocks associated with the sensors to be automatically or manually reset to correct future time code generation when appropriate.

Returning now to the method of flowchart 1800, after time code manager 1720 has identified a group of spatially and temporally proximate sensors for which time code validation and/or correction will be performed, time code manager 1720 analyzes the time codes generated by the identified group as shown at step 1808. In one embodiment, this step comprises assigning a confidence value to each of the time codes generated by the group. The confidence value assigned to a time code is essentially a measure of the likelihood that the time code is the most accurate among all the time codes being analyzed. Accuracy may be measured relative to a notion of time maintained by other sensors in the ad hoc network or to a notion of time maintained by BCO engine 1700.

Time code manager 1720 may take into account a variety of factors in assigning a confidence value to a particular time code. For example, time code manager 1720 may assign a confidence value to a time code based at least in part on the number of sensors in the group that generated that time code, wherein the more sensors that generated the time code, the higher the confidence value. Time code manager 1720 may construct a histogram of the time codes generated by the group in order to perform this function.

Time code manager 1720 may assign a confidence value to a time code based at least in part on an indicator of the reliability of a sensor or sensors that generated that time code. Thus, for example, time code manager 1720 may assign a lower confidence value to a time code when that time code was generated by a sensor operating under adverse sensing conditions (e.g., a sensor detecting beacons over a channel experiencing interference, or a sensor moving at a high velocity) or when that time code was generated by a sensor that has historically generated inaccurate time codes or poor sensor data.

At step 1810, time code manager 1720 modifies a time code generated by at least one sensor in the group based on the analysis performed in step 1808. This step may include, for example, selecting one of the time codes generated by the group based on confidence values assigned to the time codes and/or on some other factor(s) and then replacing a time code generated by at least one sensor in the group by the selected time code. In another embodiment, this step may comprise combining or averaging one or more time codes generated by the group based on the confidence values assigned to the time codes and/or on some other factor(s) to generate a combined time code and then replacing a time code generated by at least one sensor in the group by the combined time code. This step may also comprise adding or subtracting a time offset to a time code generated by at least one sensor in the group.

The foregoing method advantageously applies collaborative filtering to time codes generated by co-located sensors to validate and/or correct the time codes generated by those sensors. In further accordance with this embodiment, once time code manager 1720 has identified a sensor that has generated an inaccurate time code, it can take steps to ensure that future time codes provided by the same sensor are more accurate. For example, time code manager 1720 can apply a predetermined offset to subsequently-received time codes generating by the same sensor to ensure that such time codes are more accurate. Alternatively, time code manager 1720 can send a command to the sensor, wherein the command causes the state of a clock used by the sensor to generate time codes to be modified automatically. Still further, time code manager 1720 can send a notification to a user of the sensor indicating that a state of a clock associated with the sensor should be modified, so that the user can modify the clock manually.

Figure 20:
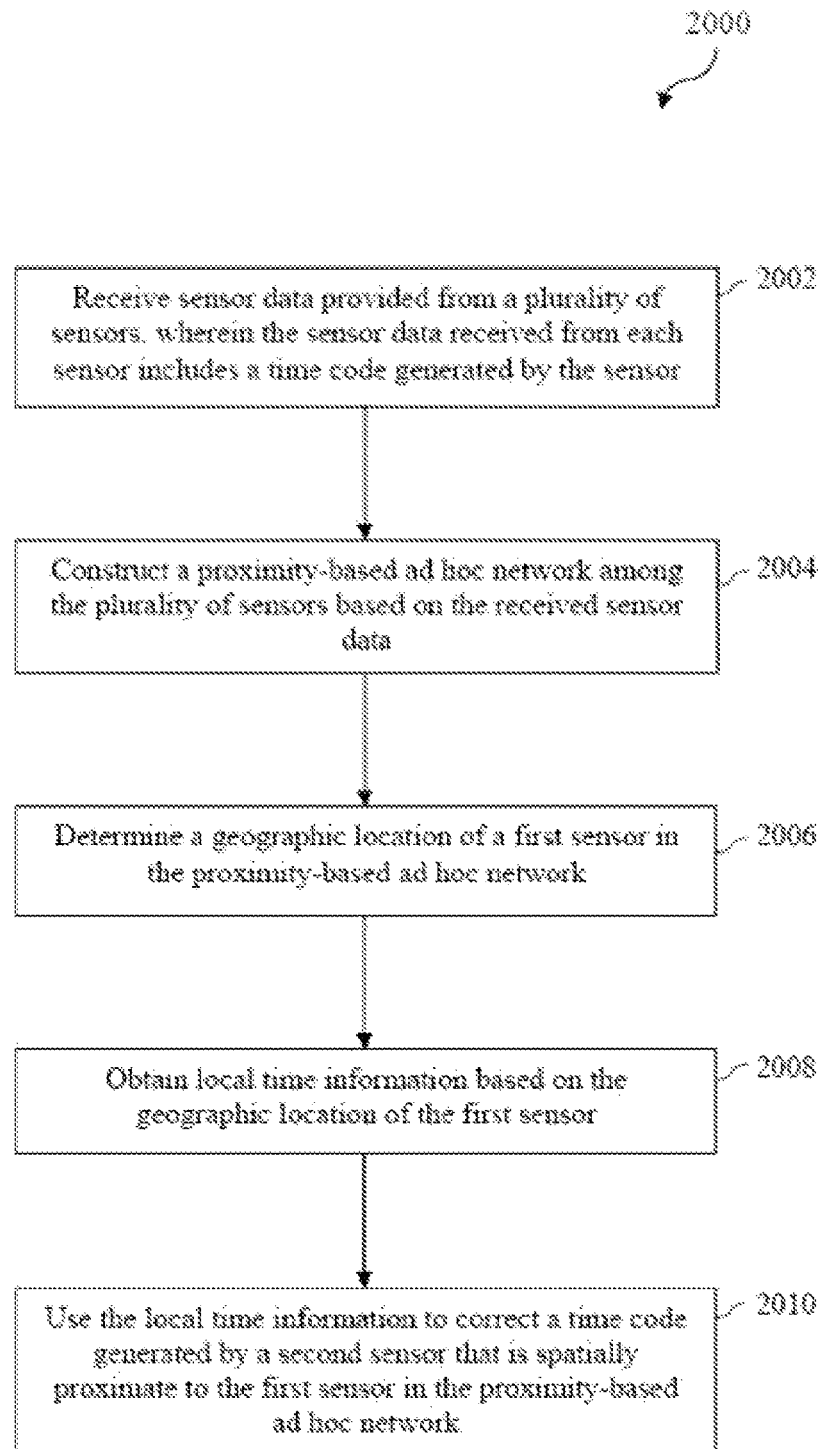
FIG. 20 depicts a flowchart of a second method for validating and correcting time codes generated by a plurality of sensors in accordance with an embodiment of the present disclosure.

FIG. 20 depicts a flowchart 2000 of a second method for validating and correcting time codes generated by a plurality of sensors in accordance with an embodiment of the present disclosure. The method of flowchart 2000 may be used as an alternative to or in conjunction with the method of flowchart 1800 to improve the integrity of such time codes. Like flowchart 1800, the steps of flowchart 2000 will be described with continued reference to components of BCO engine 1700, persons skilled in the relevant art(s) will readily appreciate that the method is not limited to those implementations and that other means may be used to carry out the method.

As shown in FIG. 20, the method of flowchart 2000 begins at step 2002, in which SNI manager 1706 receives sensor data provided from a plurality of sensors, wherein the sensor data received from each sensor includes a time code generated by the sensor. SNI manager 1706 stores this sensor data in sensor logs database 1718, where it is accessible by bandwidth tracking manager 1712. At step 2004, bandwidth tracking manager 1712 constructs an ad hoc network among the plurality of sensors based on the received sensor data. One manner in which bandwidth tracking manager 1712 may construct an ad hoc network based on the received sensor data was described above in reference to bandwidth tracking manager 112 of BCO engine 102, and thus no further description of that process need be provided.

At step 2006, bandwidth tracking manager 1712 determines a geographic location of a first sensor in the ad hoc network. Bandwidth tracking manager 1712 may determine the geographic location of the first sensor by analyzing location information that is provided by the first sensor to BCO engine 1700 along with other sensor data. Such location information may include, for example, location information provided by a GPS module or other positioning module within the first sensor or location information (e.g., a zip code, street address, or the like) provided by a user of the first sensor. Alternatively, bandwidth tracking manager 1712 may determine the geographic location of the first sensor by propagating location information from a spatially and temporally proximate sensor to the first sensor in a like manner to that described above in reference to flowchart 1100 of FIG. 11.

At step 2008, time code manager 1720 obtains local time information based on the geographic location of the first sensor. For example, time code manager 1720 may use the geographic location of the first sensor to determine the time zone in which the first sensor is currently located and to determine a local time associated with the time zone.

At step 2010, time code manager 1720 uses the local time information to correct a time code generated by a second sensor that is spatially proximate to the first sensor in the ad hoc network. For example, time code manager 1720 may compare the time code generated by the second sensor to the local time determined in step 2008 and correct the time code responsive to detecting a discrepancy.

The foregoing method advantageously uses geographic location information associated with or propagated among certain sensors in the ad hoc network to obtain a local time that can then be used to validate and correct time codes generated by co-located sensors. In further accordance with this embodiment, once time code manager 1720 has identified a sensor that has generated an inaccurate time code, it can take steps to ensure that future time codes provided by the same sensor are more accurate. For example, time code manager 1720 can apply a predetermined offset to subsequently-received time codes generating by the same sensor to ensure that such time codes are more accurate. Alternatively, time code manager 1720 can send a command to the sensor, wherein the command causes the state of a clock used by the sensor to generate time codes to be modified automatically. Still further, time code manager 1720 can send a notification to a user of the sensor indicating that a state of a clock associated with the sensor should be modified, so that the user can modify the clock manually.

F. Data Sharing Based on Ad Hoc Network

It would be advantageous if users of portable electronic devices could easily exchange data between such devices. However, conventional protocols for establishing a communication link between compatible devices can be time consuming. For example, in order to pair two Bluetooth™ devices together, at least one of the two devices must be placed in a mode in which it can discover the other device. Once the other device has been discovered and if authentication is required, the same passkey must be entered into each of the two devices. Only after this process is complete can data be shared between the two devices. This is a cumbersome process. Furthermore, where user devices are not compatible (e.g., where one device supports only Bluetooth™ communication and the other supports only WiFi communication), direct data transfer between the devices is simply not possible.

It would also be beneficial if information could be automatically exchanged between user devices responsive to co-location of those devices. Such a system could advantageously be used, for example, to exchange information or notifications among users who are personally and/or professionally related (or users who are likely to form such a relationship) at a point in time when such users are proximally located. Such a system could also advantageously be used to distribute marketing information or other commercial information to and among proximally-located users. These are only a few examples of the benefits of such a system. However, such automatic data exchange should be carried out in a manner that protects user privacy.

Figure 21:
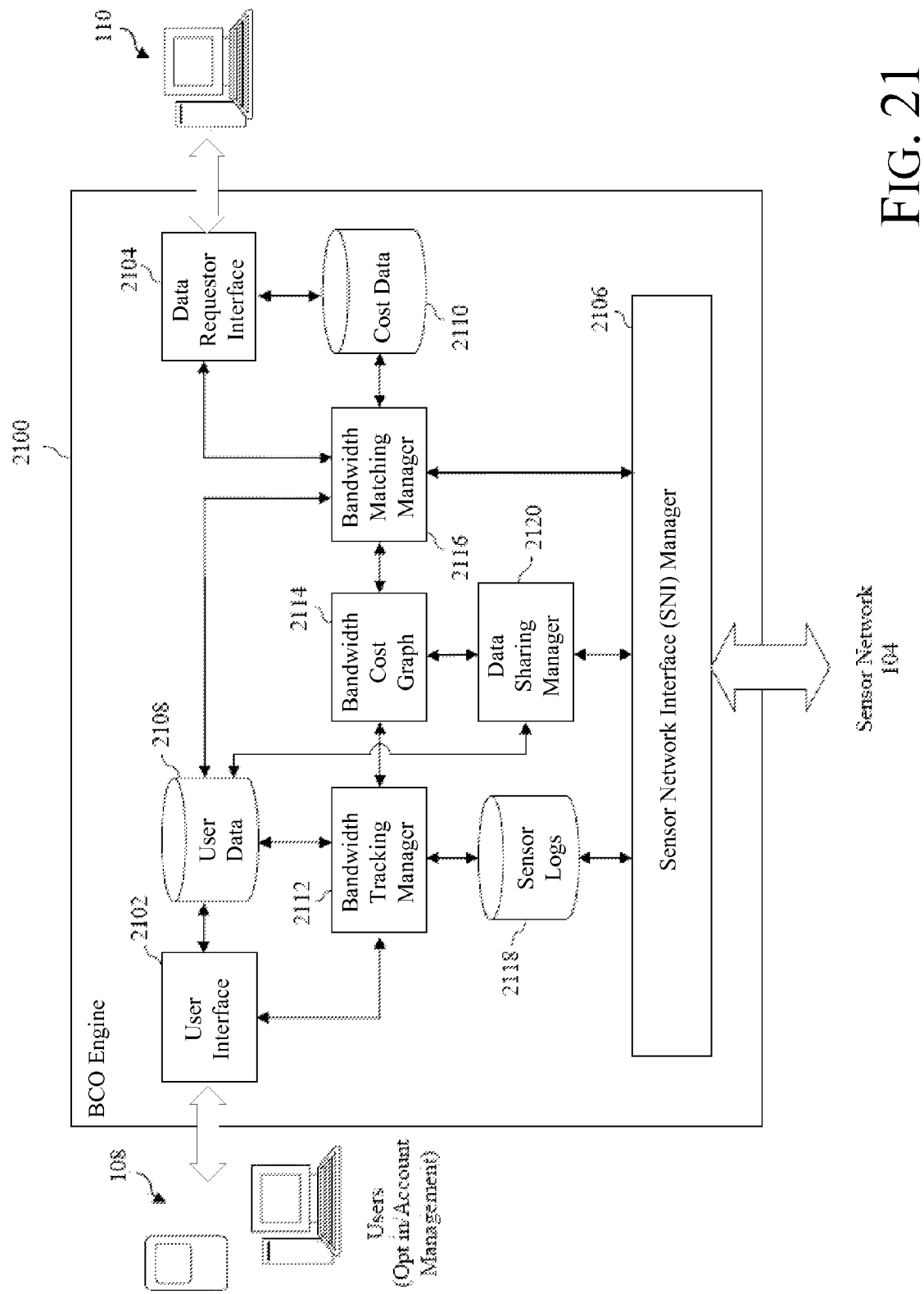
FIG. 21 is a block diagram of a BCO engine in accordance with an embodiment of the present disclosure that includes a data sharing manager.

FIG. 21 is a block diagram of a BCO engine 2100 that addresses the foregoing issues. In particular, and as will be described in more detail herein, BCO engine 2100 advantageously enables data to be shared among co-located sensors in a manner that does not require local connections or communication among those sensors and that protects user privacy. BCO engine 2100 also beneficially enables data to be transferred among heterogeneous sensor types that would otherwise be incapable of detecting and/or communicating with each other. BCO engine 2100 may perform user-initiated data transfer as well as automatic data transfer responsive to sensor proximity and other factors, such as commonality of user interests and/or activities or membership in a social network.

As shown in FIG. 21, BCO engine 2100 includes a number of communicatively-connected elements including a user interface 2102, a data requestor interface 2104, an SNI manager 2106, a user data database 2108, an cost data database 2110, a bandwidth tracking manager 2112, a bandwidth cost graph 2114, a bandwidth matching manager 2116, and a sensor logs database 2118. With the exception of certain functions to be described immediately below, each of these elements performs essentially the same functions as described above in reference to like-named elements of BCO engine 102.

Figure 22:
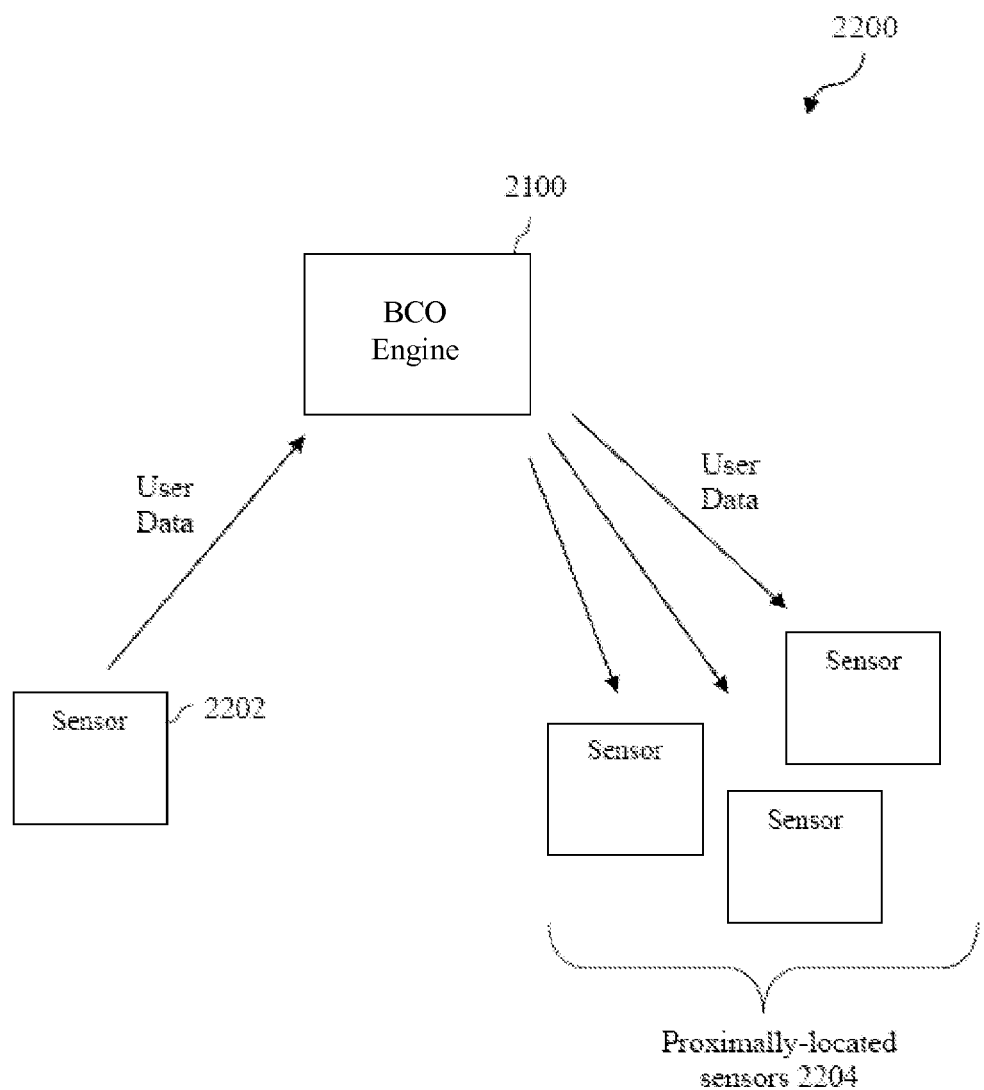
FIG. 22 is a block diagram of a system in which a BCO engine transfers user data from a first sensor to one or more sensors in accordance with an embodiment of the present disclosure.

As also shown in FIG. 21, BCO engine 2100 further includes a data sharing manager 2120. Data sharing manager 2120 is configured to facilitate the exchange of data between and among proximally-located sensors by receiving data from a first sensor and then transferring such data to one or more other sensors when such other sensor(s) is/are temporally and spatially proximate to the first sensor. Thus, data sharing manager 2120 allows BCO engine 2100 to act as an intermediary between the first sensor and the other sensor(s) for the purposes of such data exchange. This is illustrated in FIG. 22, which shows a system 2200 in which a first sensor 2202 transfers user data to BCO engine 2100 and in which BCO engine 2100 transfers copies of the user data to, in the case of the example, each of a plurality of proximally-located sensors 2204.

To perform this function, data sharing manager 2120 is configured to determine which sensors are proximally-located by accessing the current graph 2114, which provides sensor locations, and which is maintained by bandwidth tracking manager 2112 in a manner described in detail above. Data sharing manager 2120 is also configured to determine whether other conditions beyond sensor proximity have been satisfied prior to performing a data transfer. These conditions may include user-specified conditions or preferences relating to privacy, to eligible data transfer sources or targets, or to other aspects of data transfer that are stored in user data database 2108. These user-specified conditions or preferences may be provided or set by a user via user interface 2102.

Depending upon the implementation, user data eligible for transfer is provided to data sharing manager 2120 from a user device via sensor network 104 and/or via user interface 2102. Such user data may be directly provided to data sharing manager 2120 or may be stored in user data database 2108 and accessed by data sharing manager 2120 when certain conditions for data transfer are satisfied. Such user data can be data transferred to a sensor, e.g., sensor 2202, using available bandwidth of sensor 2202, which is ultimately intended for one or more of the plurality of sensors 2204. In accordance with one or more embodiments, allocation of available bandwidth resources associated with sensor 2202 and/or sensors 2402 is performed by BCO engine 2100, as discussed herein.

By acting as an intermediary between co-located sensors for the purposes of data transfer, data sharing manager 2120 facilitates data sharing and/or exchange in a manner that does not require a local link to be established between or among those sensors. As noted above, establishing such a link can be time consuming and burdensome for users. Furthermore, in instances where such local links are more bandwidth-constrained than links to BCO engine 2100, data transfer via BCO engine 2100 may be significantly more efficient than a transfer between sensors over a local communication link.

Also, by acting as an intermediary between co-located sensors for the purposes of data transfer, data sharing manager 2120 allows data to be shared between sensors that would otherwise be incapable of detecting and/or communicating with each other. For example, data sharing manager 2120 can transfer data between and among WiFi devices, cellular telephones and Bluetooth™ devices that would not normally be able to detect or communicate with each other.

Furthermore, by acting as an intermediary between co-located sensors for the purposes of data transfer, data sharing manager 2120 can automatically cause data to be transferred and/or exchanged between such devices based on proximity and any of a variety of other factors, such as commonality of user interests and/or activities or membership in a social network. However, because data sharing manager 2120 acts as the intermediary in brokering such transfers it can advantageously implement filters to validate user data and protect user privacy.

One manner by which BCO engine 2100 transfers data between and among sensors in accordance with an embodiment of the present disclosure will now be described in reference to flowchart 2300 of FIG. 23. Although the steps of flowchart 2300 will be described with continued reference to components of BCO engine 2100, persons skilled in the relevant art(s) will readily appreciate that the method is not limited to those implementations and that other means may be used to carry out the method.

Figure 23:
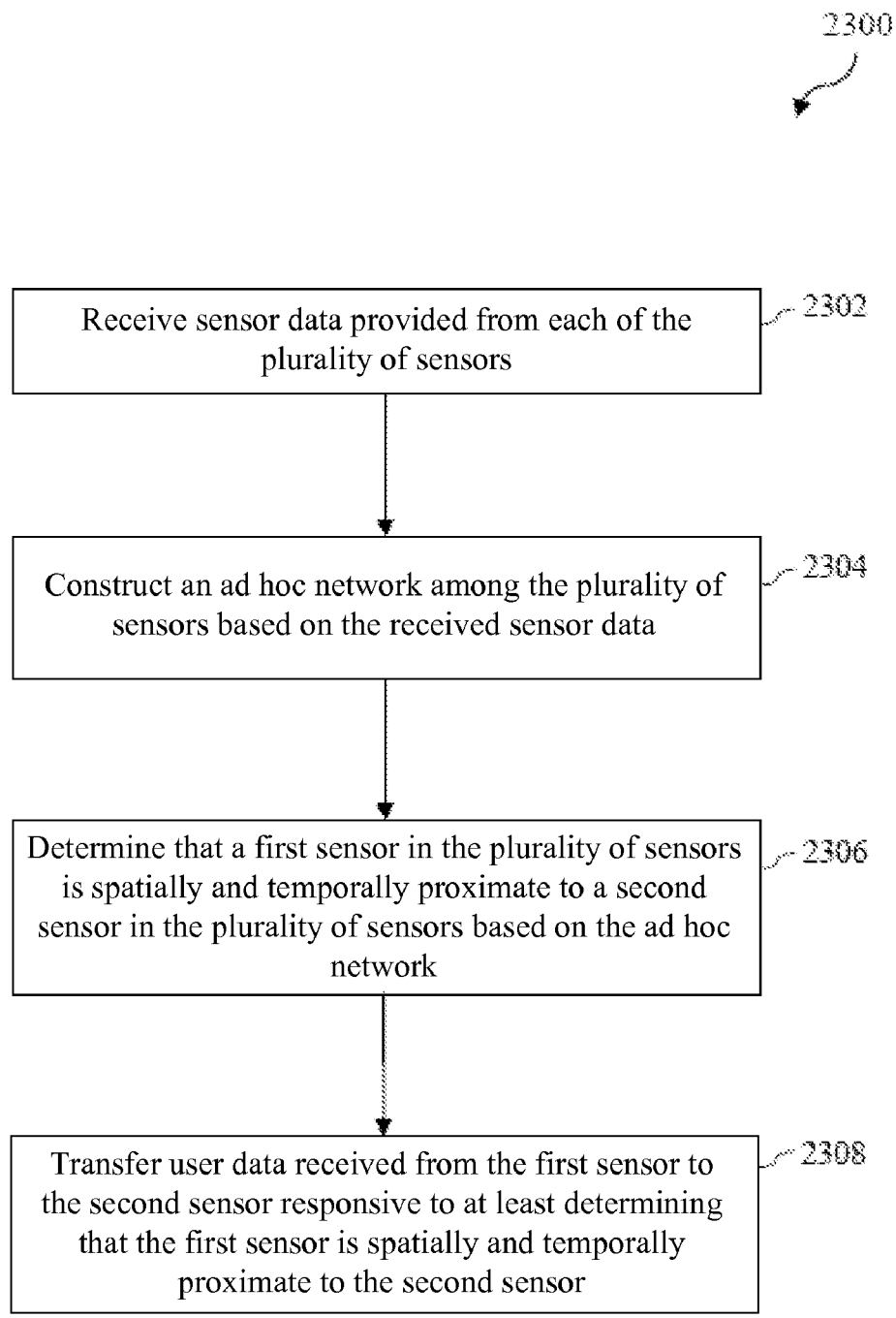
FIG. 23 is a flowchart of a method by which a BCO engine transfers data between and among sensors in accordance with an embodiment of the present disclosure.

As shown in FIG. 23, the method of flowchart 2300 begins at step 2302, in which SNI manager 2106 receives sensor data provided from each of a plurality of sensors. SNI manager 2106 stores this sensor data in sensor logs database 2118, where it is accessible by bandwidth tracking manager 2112. At step 2304, bandwidth tracking manager 2112 constructs an ad hoc network among the plurality of sensors based on the received sensor data. One manner in which bandwidth tracking manager 2112 may construct such an ad hoc network based on the received sensor data was described above in reference to bandwidth tracking manager 112 of BCO engine 102, and thus no further description of that process need be provided.

At step 2306, data sharing manager 2120 determines that a first sensor in the plurality of sensors is spatially and temporally proximate to a second sensor in the plurality of sensors based on the ad hoc network. In one embodiment, data sharing manager 2120 performs this function by accessing the current graph 2114, which is maintained by bandwidth tracking manager 2112 in a manner described above.

At step 2308, data sharing manager 2120 transfers user data received from the first sensor to the second sensor responsive to at least determining that the first sensor is spatially and temporally proximate to the second sensor. The user data is transferred to the second sensor via sensor network 104.

The user data that is received from the first sensor may be any type of user data including but not limited to any type of text, graphics, audio and/or video content or files. The user data may also include a link or permission to access and optionally modify network-accessible multimedia content or data. The user data may be intended for delivery to a single individual or entity or for broadcast to a plurality of individuals or entities. Where the data transfer functionality of BCO engine 2100 is used to introduce proximally-located users for the purposes of building a personal or business relationship, the user data may comprise a user profile, a business card, a classified advertisement, a personals advertisement, a resume, or a help wanted posting. Other examples of user data in the nature of "personal broadcasts" are described in coowned and commonly pending U.S. patent application Ser. No. 11/957,052, entitled "Personal Broadcast Engine and Network" and filed on Dec. 14, 2007, the entirety of which is incorporated by reference herein.

In accordance with one or more embodiments, a user profile can comprise information provided by the user via a user interface, such as user interface 2102, and/or information provided as part of the sensor data provided by a sensor associated with the user. By way of a non-limiting example, the sensor can provide physical location information, which over time can provide a physical, or spatial, path taken by the user. In accordance with one or more embodiments, user profile information can include information provided by a third-party provider/partner. By way of a non-limiting example, location information can be determined based on a network address, e.g., an IP address, and user login associated with the third-party provider/partner.

The user data that is received from the first sensor may be received by SNI manager 2106 from sensor network 104 and then provided directly to data sharing manager 2120 for transfer to the second sensor. Alternatively, the user data that is received from the first sensor may be received via user interface 2102 and then stored in user data database 2108. In this case, data sharing manager 2120 accesses the user data stored in user data database 2108 when certain conditions for data transfer are satisfied. The data transfer process may be initiated by a user or a process running on a sensor or BCO engine 2100.

As noted above, data sharing manager 2120 is capable of transferring data between individual sensors as well as broadcasting data from a first sensor to a plurality of other sensors. Thus, in step 2308, transferring the user data received from the first sensor to the second sensor may include transferring the user data to a plurality of sensors that are spatially and temporally proximate to the first sensor.

As also noted above, by acting as an intermediary between co-located sensors for the purposes of data transfer, data sharing manager 2120 allows data to be shared between sensors that would otherwise be incapable of detecting and/or communicating with each other. Thus, in accordance with the method of flowchart 2300, the first sensor may be of a first device type and the second sensor may be of a second device type that is incapable of directly communicating with the first device type. Such device types may include WiFi devices, cellular telephones, and Bluetooth™ devices.

The foregoing method also allows the first and second sensor to share data even when those sensors are not currently capable of detecting each other. For example, bandwidth tracking manager 2112 may determine that the first and second sensors are proximally-located by determining that each sensor is proximally-located to a third sensor in the plurality of sensors. This third sensor may be sensed by both the first or second sensors or by sensors that are proximally-located to those sensors. Thus, BCO engine 2100 allows data to be transferred between sensors that are only indirectly connected through a number of intermediate nodes (e.g., sensors or beacons) in the ad hoc network constructed and maintained by bandwidth tracking manager 2112.

The data transfer between the first sensor and the second sensor in step 2308 may advantageously be conditioned on the identification of relationship between a user of the first sensor and a user of the second sensor. This relationship may be based on user data relating to one or more activities, interests, preferences, and/or social networks associated with each user. Where data transfer is automatic, such filtering allows data to be transferred only to users that share some sort of commonality with the source of the data.

The data transfer between the first sensor and the second sensor in step 2308 may also be conditioned on a determination as to whether the transfer is authorized. This ensures that user privacy is protected. Data sharing manager 2120 may make this determination, for example, based on permissioning rules associated with a user of the first sensor and/or a user of the second sensor. Such permissioning rules may be stored in user data database 2102 and accessed when required by data sharing manager 2120.

Although the foregoing section describes a method for sharing data between proximally-located sensors in an ad hoc network, it is noted that the foregoing approach can advantageously be used to share data with or between devices and objects that are configured to or capable of acting as beacons only. So long as such beacons are detected by at least one sensor that is currently reporting sensor data to BCO engine 102, those beacons can also be located within the ad hoc network by bandwidth tracking manager 212. Consequently, such beacons can then also participate in data sharing activities with other sensors or beacons in the ad hoc network in a like manner to that described above.

Although the foregoing section describes a method for sharing data between proximally-located sensors in an ad hoc network, it is noted that the foregoing approach can advantageously be used to exchange data between sensors. For example, two sensors that cannot, or are not, communicatively coupled, can exchange data via BCO engine 102. In accordance with one or more embodiments, the sensors need not be proximally-located. By way of another non-limiting example, BCO engine 102 can be used to exchange data between two sensors that are, or can be, communicatively connected, such as in the case that use of BCO engine 102 to exchange data maximizes available bandwidth and/or minimizes cost.

The foregoing data sharing method can beneficially be used to easily share information with proximally-located users. For example, the foregoing data sharing method can be used to easily share data prepared for or generated during a meeting among the meeting participants, such as meeting notes, audio and/or video recordings, photos, follow-up meeting information, or other data. The method can also be used, for example, to generate invitations or requests to other proximally-located users to connect on any online social network, event, meeting, trip, or the like.

The foregoing data sharing method can advantageously provide users with real-time information about proximally-located people. As a result, the foregoing data sharing method can advantageously be used to obtain information about a person that a user is currently meeting in real time. This may include querying a person's CV online or performing a web search about a person. The foregoing data sharing method can also be used to maintain a history of people encountered by a user over time and to display history information to the user. For example, the history information for a given encounter may include such information as a time, place, duration, event name, event type, or the like.

In accordance with one embodiment of the present disclosure, the sharing of data with proximally-located users facilitates the creation of a graph of user encounters. For example, a sensor can create a mesh of encounters or connections between all discoverable devices in range. Such encounter information can be used, for example, to provide users with notifications concerning current or past user encounters and/or to build a social graph based on accumulated real world encounters.

In a further embodiment of the present disclosure, a user may create a tag for a proximally-located person. This tag may then be displayed on a public profile associated with that person. In one implementation, the person must approve of the tag before it is displayed on the public profile.

G. Example Computer System Implementation

Each of the components of the BCO engines and sensors described herein may be implemented alone or in combination by any well-known processor-based computer system. An example of such a computer system 2400 is depicted in FIG. 24.

Figure 24:
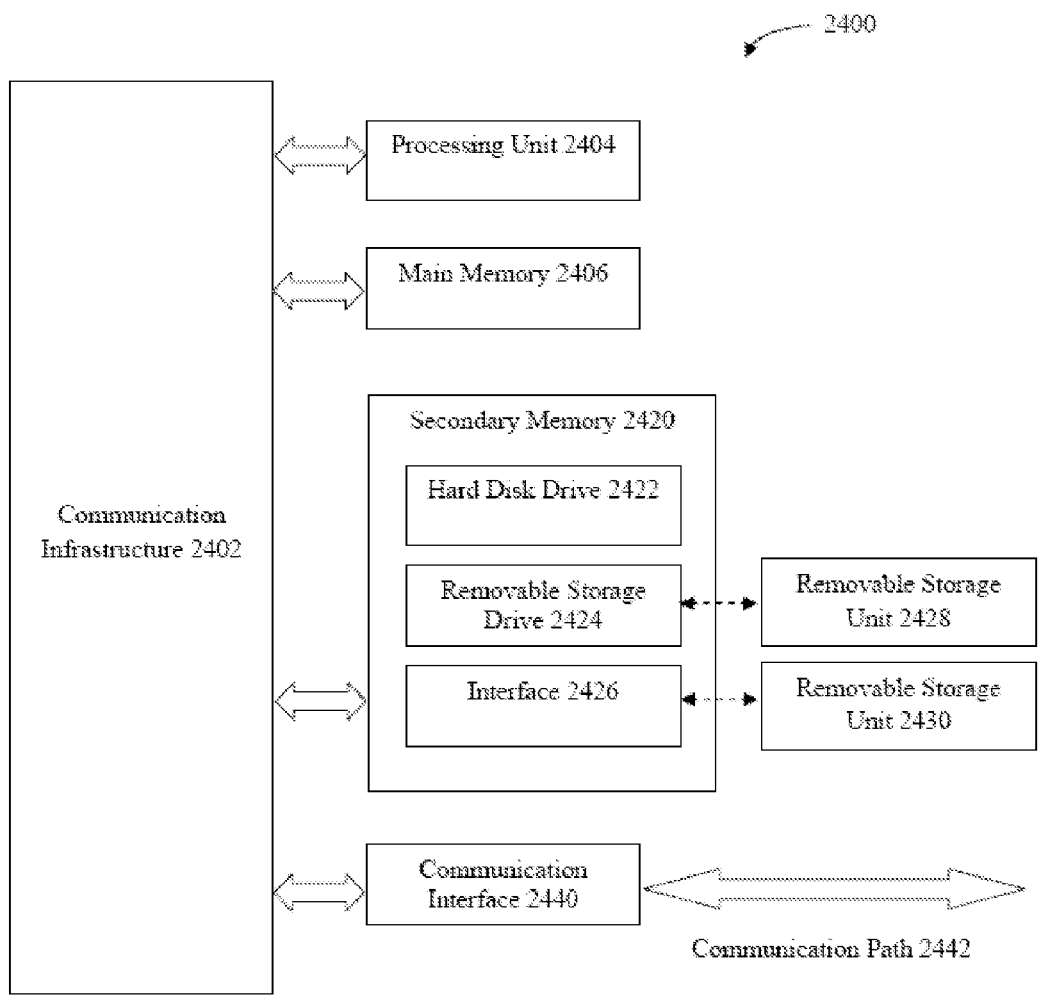
FIG. 24 is a block diagram of an example computer system that may be used to implement aspects of the present disclosure.

As shown in FIG. 24, computer system 2400 includes a processing unit 2404 that includes one or more processors. Processor unit 2404 is connected to a communication infrastructure 2402, which may comprise, for example, a bus or a network.

Computer system 2400 also includes a main memory 2406, preferably random access memory (RAM), and may also include a secondary memory 2420. Secondary memory 2420 may include, for example, a hard disk drive 2422, a removable storage drive 2424, and/or a memory stick. Removable storage drive 2424 may comprise a floppy disk drive, a magnetic tape drive, an optical disk drive, a flash memory, or the like. Removable storage drive 2424 reads from and/or writes to a removable storage unit 2428 in a well-known manner. Removable storage unit 2428 may comprise a floppy disk, magnetic tape, optical disk, or the like, which is read by and written to by removable storage drive 2424. As will be appreciated by persons skilled in the relevant art(s), removable storage unit 2428 includes a computer usable storage medium having stored therein computer software and/or data.

In alternative implementations, secondary memory 2420 may include other similar means for allowing computer programs or other instructions to be loaded into computer system 2400. Such means may include, for example, a removable storage unit 2430 and an interface 2426. Examples of such means may include a program cartridge and cartridge interface (such as that found in video game devices), a removable memory chip (such as an EPROM, or PROM) and associated socket, and other removable storage units 2430 and interfaces 2426 which allow software and data to be transferred from the removable storage unit 2430 to computer system 2400.

Computer system 2400 may also include a communications interface 2140. Communications interface 2440 allows software and data to be transferred between computer system 2400 and external devices. Examples of communications interface 2440 may include a modem, a network interface (such as an Ethernet card), a communications port, a PCM-CIA slot and card, or the like. Software and data transferred via communications interface 2440 are in the form of signals which may be electronic, electromagnetic, optical, or other signals capable of being received by communications interface 2440. These signals are provided to communications interface 2440 via a communications path 2442. Communications path 2442 carries signals and may be implemented using wire or cable, fiber optics, a phone line, a cellular phone link, an RF link and other communications channels.

As used herein, the terms "computer program medium" and "computer usable medium" are used to generally refer to media such as removable storage unit 2428, removable storage unit 2430, a hard disk installed in hard disk drive 2422, and signals received by communications interface 2440. Computer program medium and computer useable medium can also refer to memories, such as main memory 2406 and secondary memory 2420, which can be semiconductor devices (e.g., DRAMs, etc.). These computer program products are means for providing software to computer system 2400.

Computer programs (also called computer control logic, programming logic, or logic) are stored in main memory 2406 and/or secondary memory 2420. Computer programs may also be received via communications interface 2440. Such computer programs, when executed, enable the computer system 2400 to implement features of one or more embodiments of the present disclosure as discussed herein. Accordingly, such computer programs represent controllers of the computer system 2400. Where one or more embodiments are implemented using software, the software may be stored in a computer program product and loaded into computer system 2400 using removable storage drive 2424, interface 2426, or communications interface 2440.

At least one embodiment is directed to computer program products comprising software stored on any computer useable medium. Such software, when executed in one or more data processing devices, causes a data processing device(s) to operate as described herein. Embodiments of the present disclosure employ any computer useable or readable medium, known now or in the future. Examples of computer useable mediums include, but are not limited to, primary storage devices (e.g., any type of random access memory), secondary storage devices (e.g., hard drives, floppy disks, CD ROMS, zip disks, tapes, magnetic storage devices, optical storage devices, MEMs, nanotechnology-based storage device, etc.), and communication mediums (e.g., wired and wireless communication networks, local area networks, wide area networks, intranets, etc.).

H. Conclusion

While various embodiments of the present disclosure have been described above, it should be understood that they have been presented by way of example only, and not limitation. It will be understood by those skilled in the relevant art(s) that various changes in form and details may be made therein without departing from the spirit and scope of embodiments of the present disclosure as defined in the appended claims. Accordingly, the breadth and scope of the present disclosure should not be limited by any of the above-described exemplary embodiments, but should be defined only in accordance with the following claims and their equivalents.

The invention claimed is:

1. A method comprising:
receiving, by at least one computer system, sensor data provided from a plurality of sensors;
constructing, by the at least one computer system, an ad hoc network among the plurality of sensors based on at least a portion of the received sensor data;
performing, by the at least one computer system, an analysis of bandwidth information associated with each sensor in a group of sensors in the ad hoc network; and
determining the at least one computer system, a manner in which at least one sensor in the group exchanges data based on the analysis of the bandwidth information.

2. The method of claim 1, wherein determining a manner in which at least one sensor in the group exchanges data comprises:
determining, by the at least one computer system, a route by which at least one sensor in the group exchanges data.

3. The method of claim 1, wherein determining a manner in which at least one sensor in the group exchanges data comprises:

determining, by the at least one computer system, a rate at which at least one sensor in the group exchanges data.

4. The method of claim 1, wherein determining a manner in which at least one sensor in the group exchanges data comprises:
allocating, by the at least one computer system, an amount of bandwidth of one sensor in the group to another one of the sensors in the group, wherein the allocated bandwidth of the one sensor is used in a data exchange for the other sensor in the group.

5. The method of claim 1, wherein determining a manner in which at least one sensor in the group exchanges data comprises:
causing, by the at least one computer system, a first sensor in the group to collect data from a second sensor in the group over a local network connection and to provide the collected data on behalf of the second sensor.

6. The method of claim 1, further comprising:
causing, by the at least one computer system, a first sensor in the group to disseminate data received from a bandwidth and cost optimization system to a second sensor in the group over a local network connection based on the analysis of the bandwidth information.

7. The method of claim 1, further comprising:
modifying, by the at least one computer system, a frequency in which at least one sensor in the group provides bandwidth information based on the analysis of the bandwidth information.

8. The method of claim 7, wherein modifying a frequency in which at least one sensor in the group provides bandwidth information is further based on an analysis of power consumption information associated with the at least one sensor.

9. The method of claim 1, wherein determining a manner in which at least one sensor in the group exchanges data based on the analysis of the bandwidth information comprises:
determining, by the at least one computer system, a manner in which at least one sensor in the group exchanges data based on an analysis of the bandwidth information and a capacity of each of the sensors in the group to provide available bandwidth.

10. The method of claim 1, wherein determining a manner in which at least one sensor in the group exchanges data based on the analysis of the bandwidth information comprises:
determining, by the at least one computer system, a manner in which at least one sensor in the group exchanges data based on an analysis of the bandwidth information, a capacity of each of the sensors in the group to provide available bandwidth, and a cost associated with the available bandwidth.

11. The method of claim 1, wherein the determined manner in which at least one sensor in the group exchanges data comprises a least cost and fastest route given available bandwidth.

12. The method of claim 1, wherein determining a manner in which at least one sensor in the group exchanges data based on the analysis of the bandwidth information comprises:
determining, by the at least one computer system, a manner in which at least one sensor in the group exchanges data based on the analysis of the bandwidth information and based on a user-defined hierarchy associated with the sensors in the group.

13. The method of claim 1, wherein determining a manner in which at least one sensor in the group exchanges data based on the analysis of the bandwidth information comprises:
determining, by the at least one computer system, a manner in which at least one sensor in the group exchanges data based on the analysis of the bandwidth information and based on a user-defined hierarchy of data exchange networks.

14. The method of claim 1, wherein determining a manner in which at least one sensor in the group exchanges data based on the analysis of the bandwidth information comprises:
determining, by the at least one computer system, a manner in which at least one sensor in the group exchanges data based on the analysis of the bandwidth information and based on a donation of bandwidth for use by a donation recipient for data exchange.

15. The method of claim 14, wherein a donor of the bandwidth donation identifies the donation recipient.

16. The method of claim 1, wherein constructing an ad hoc network among the plurality of sensors based on at least a portion of the received sensor data further comprises:
constructing, by the at least one computer system, an ad hoc network among the plurality of sensors based on at least a portion of the received sensor data and based on user-specified preferences and requirements.

17. A system, comprising:
at least one computing system providing:
a communications manager configured to receive sensor data provided from a plurality of sensors;
a bandwidth tracking manager configured to construct an ad hoc network among the plurality of sensors based on at least a portion of the received sensor data; and
a bandwidth management manager configured to perform an analysis of bandwidth information associated with each sensor in a group of sensors in the ad hoc network and to determine a manner in which at least one sensor in the group exchanges data based on the analysis of the bandwidth information.

18. The system of claim 17, wherein the bandwidth management manager configured to determine a manner in which at least one sensor in the group exchanges data is further configured to determine a route by which at least one sensor in the group exchanges data.

19. The system of claim 17, wherein the bandwidth management manager configured to determine a manner in which at least one sensor in the group exchanges data is further configured to determine a rate at which at least one sensor in the group exchanges data.

20. The system of claim 17, wherein the bandwidth management manager configured to determine a manner in which at least one sensor in the group exchanges data is further configured to allocate an amount of bandwidth of one sensor in the group to another one of the sensors in the group, wherein the allocated bandwidth of the one sensor is used in a data exchange for the other sensor in the group.

21. The system of claim 17, wherein the bandwidth management manager configured to determine a manner in which at least one sensor in the group exchanges data is further configured to cause a first sensor in the group to collect data from a second sensor in the group over a local network connection and to provide the collected data on behalf of the second sensor.

22. The system of claim 17, wherein the bandwidth management manager configured to determine a manner in which at least one sensor in the group exchanges data is further configured to cause a first sensor in the group to disseminate data received from a bandwidth and cost optimization system to a second sensor in the group over a local network connection based on the analysis of the bandwidth information.

23. The system of claim 17, wherein the bandwidth management manager is configured to modify a frequency in which at least one sensor in the group provides bandwidth information based on the analysis of the bandwidth information.

24. The system of claim 23, wherein the bandwidth management manager is configured to modify a frequency in which at least one sensor in the group provides bandwidth information based on the analysis of the bandwidth information and further based on an analysis of power consumption information associated with the at least one sensor.

25. The system of claim 17, wherein the bandwidth management manager configured to determine a manner in which at least one sensor in the group exchanges data is further configured to determine a manner in which at least one sensor in the group exchanges data based on an analysis of the bandwidth information and a capacity of each of the sensors in the group to provide available bandwidth.

26. The system of claim 17, wherein the bandwidth management manager configured to determine a manner in which at least one sensor in the group exchanges data is further configured to determine a manner in which at least one sensor in the group exchanges data based on an analysis of the bandwidth information, a capacity of each of the sensors in the group to provide available bandwidth and a cost associated with the available bandwidth.

27. The system of claim 17, wherein the determined manner in which at least one sensor in the group exchanges data comprises a least cost and fastest route given available bandwidth.

28. The system of claim 17, wherein the bandwidth management manager configured to determine a manner in which at least one sensor in the group exchanges data is further configured to determine a manner in which at least one sensor in the group exchanges data based on the analysis of the bandwidth information and based on a user-defined hierarchy associated with the sensors in the group.

29. The system of claim 17, wherein the bandwidth management manager configured to determine a manner in which at least one sensor in the group exchanges data is further configured to determine a manner in which at least one sensor in the group exchanges data based on the analysis of the bandwidth information and based on a user-defined hierarchy of data exchange networks.

30. The system of claim 17, wherein the bandwidth management manager configured to determine a manner in which at least one sensor in the group exchanges data is further configured to determine a manner in which at least one sensor in the group exchanges data based on the analysis of the bandwidth information and based on a donation of bandwidth for use by a donation recipient for data exchange.

31. The system of claim 30, wherein a donor of the bandwidth donation identifies the donation recipient.

32. The system of claim 30, wherein the bandwidth management manager is further configured to identify the donation recipient.

33. The system of claim 17, wherein the bandwidth tracking manager configured to construct an ad hoc network is configured to construct an ad hoc among the plurality of sensors based on at least a portion of the received sensor data and based on user-specified preferences and requirements.

34. A computer program product comprising a computer-readable non-transitory storage medium having computer program code tangibly recorded thereon for enabling a processing unit to manage bandwidth in an ad hoc network, the computer program code comprising:

code to enable the processing unit to receive sensor data provided from a plurality of sensors;

code to enable the processing unit to construct an ad hoc network among the plurality of sensors based on at least a portion of the received sensor data; and code to enable the processing unit to perform an analysis of bandwidth information associated with each sensor in a group of sensors in the ad hoc network; and code to enable the processing unit to determine a manner in which at least one sensor in the group exchanges data based on the analysis of the bandwidth information.

35. The computer program product of claim 34, wherein the code to enable the processing unit to determine a manner in which at least one sensor in the group exchanges data based on the analysis of the bandwidth information comprises code to enable the processing unit to determine a route by which at least one sensor in the group exchanges data.

36. The computer program product of claim 34, wherein the code to enable the processing unit to determine a manner in which at least one sensor in the group exchanges data based on the analysis of the bandwidth information comprises code to enable the processing unit to determine a rate at which at least one sensor in the group exchanges data.

37. The computer program product of claim 34, wherein the code to enable the processing unit to determine a manner in which at least one sensor in the group exchanges data based on the analysis of the bandwidth information comprises code to enable the processing unit to allocate an amount of bandwidth of one sensor in the group to another one of the sensors in the group, wherein the allocated bandwidth of the one sensor is used in a data exchange for the other sensor in the group.

38. The computer program product of claim 34, wherein the code to enable the processing unit to determine a manner in which at least one sensor in the group exchanges data based on the analysis of the bandwidth information comprises code to enable the processing unit to cause a first sensor in the group to collect data from a second sensor in the group over a local network connection and to provide the collected data on behalf of the second sensor.

39. The computer program product of claim 34, wherein the computer program code further comprises code to enable the processing unit to cause a first sensor in the group to disseminate data received from a bandwidth and cost optimization system to a second sensor in the group over a local network connection based on the analysis of the bandwidth information.

40. The computer program product of claim 34, wherein the computer program code further comprises code to enable the processing unit to modify a frequency in which at least one sensor in the group provides bandwidth information based on the analysis of the bandwidth information.

41. The computer program product of claim 40, wherein the computer program code to enable the processing unit to modify a frequency in which at least one sensor in the group provides bandwidth information based on the analysis of the bandwidth information further comprises program code to enable a processing unit to modify a frequency in which at least one sensor in the group provides bandwidth information is based on the analysis of the bandwidth information and an analysis of power consumption information associated with the at least one sensor.

42. The computer program product of claim 34, wherein the code to enable the processing unit to determine a manner in which at least one sensor in the group exchanges data based on the analysis of the bandwidth information comprises code to enable the processing unit to determine a manner in which at least one sensor in the group exchanges data based on an analysis of the bandwidth information and a capacity of each of the sensors in the group to provide available bandwidth.

43. The computer program product of claim 34, wherein the code to enable the processing unit to determine a manner in which at least one sensor in the group exchanges data based on the analysis of the bandwidth information comprises code to enable the processing unit to determine a manner in which at least one sensor in the group exchanges data based on an analysis of the bandwidth information, a capacity of each of the sensors in the group to provide available bandwidth and a cost associated with the available bandwidth.

44. The computer program product of claim 34, wherein the determined manner in which at least one sensor in the group exchanges data comprises a least cost and fastest route given available bandwidth.

45. The computer program product of claim 34, wherein the code to enable the processing unit to determine a manner in which at least one sensor in the group exchanges data based on the analysis of the bandwidth information comprises code to enable the processing unit to determine a manner in which at least one sensor in the group exchanges data based on the analysis of the bandwidth information and based on a user-defined hierarchy associated with the sensors in the group.

46. The computer program product of claim 34, wherein the code to enable the processing unit to determine a manner in which at least one sensor in the group exchanges data based on the analysis of the bandwidth information comprises code to enable the processing unit to determine a manner in which at least one sensor in the group exchanges data based on the analysis of the bandwidth information and based on a user-defined hierarchy of data exchange networks.

47. The computer program product of claim 34, wherein the code to enable the processing unit to determine a manner in which at least one sensor in the group exchanges data based on the analysis of the bandwidth information comprises code to enable the processing unit to determine a manner in which at least one sensor in the group exchanges data based on the analysis of the bandwidth information and based on a donation of bandwidth for use by a donation recipient for data exchange.

48. The computer program product of claim 47, wherein a donor of the bandwidth donation identifies the donation recipient.

49. The computer program product of claim 34, wherein the code to enable the processing unit to construct an ad hoc network among the plurality of sensors based on at least a portion of the received sensor data comprises code to enable the processing unit to construct an ad hoc network among the plurality of sensors based on at least a portion of the received sensor data and based on user-specified preferences and requirements.

* * * * *